United States Patent
Kagimura et al.

(10) Patent No.: US 9,001,536 B2
(45) Date of Patent: Apr. 7, 2015

(54) VOLTAGE SMOOTHING CIRCUIT FOR SMOOTHING VOLTAGE FROM POWER SUPPLY

(75) Inventors: Sumio Kagimura, Sakai (JP); Masafumi Hashimoto, Sakai (JP); Hiroshi Dohmae, Sakai (JP); Hirotaka Doi, Sakai (JP); Toshiaki Sato, Kusatsu (JP); Shinichi Ishizeki, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 573 days.

(21) Appl. No.: 13/388,038

(22) PCT Filed: Aug. 5, 2010

(86) PCT No.: PCT/JP2010/063286
§ 371 (c)(1),
(2), (4) Date: Jan. 30, 2012

(87) PCT Pub. No.: WO2011/016517
PCT Pub. Date: Feb. 10, 2011

(65) Prior Publication Data
US 2012/0126776 A1    May 24, 2012

(30) Foreign Application Priority Data

Aug. 7, 2009  (JP) .................................. 2009-184413
Apr. 13, 2010  (JP) .................................. 2010-091946

(51) Int. Cl.
*H02M 1/14*   (2006.01)
*H02M 5/458*  (2006.01)

(52) U.S. Cl.
CPC .................................... *H02M 5/458* (2013.01)

(58) Field of Classification Search
USPC ........................ 363/39, 44, 45, 47, 48, 52, 53
See application file for complete search history.

(56) References Cited

U.S. PATENT DOCUMENTS

| 4,568,871 A | * | 2/1986 | Bauman ........................ 323/364 |
| 5,446,392 A | | 8/1995 | Inoue et al. |
| 2012/0126776 A1 | * | 5/2012 | Kagimura et al. ............ 323/304 |

FOREIGN PATENT DOCUMENTS

| JP | 1-110060 A | 4/1989 |
| JP | 1-169516 A | 7/1989 |
| JP | 5-23527 U | 3/1993 |
| JP | 6-237193 A | 8/1994 |

(Continued)

OTHER PUBLICATIONS

International Search Report of corresponding PCT Application No. PCT/JP2010/063286.

*Primary Examiner* — Jeffrey Sterrett
(74) *Attorney, Agent, or Firm* — Global IP Counselors

(57) ABSTRACT

A voltage smoothing circuit is configured to smooth a voltage outputted from a power supply portion. The voltage smoothing circuit includes first and second smoothing capacitors, a first balancing resistor, and a second conduction regulating portion. The first smoothing capacitor and the second smoothing capacitor are connected in series to each other and are connected in parallel to the power supply portion. The first balancing resistor is connected in parallel to the first smoothing capacitor. The second conduction regulating portion is connected on a current path in parallel with the second smoothing capacitor and conducts current in one direction on the current path in a case where a voltage equal to or greater than a second predetermined voltage has been applied.

16 Claims, 25 Drawing Sheets

(56) References Cited

FOREIGN PATENT DOCUMENTS

| JP | 6-276675 A | 9/1994 |
|---|---|---|
| JP | 7-322491 A | 12/1995 |
| JP | 10-323042 A | 12/1998 |
| JP | 2001-333592 A | 11/2001 |
| JP | 2003-88144 A | 3/2003 |
| JP | 2004-166334 A | 6/2004 |
| JP | 2005-323440 A | 11/2005 |
| JP | 2006-333622 A | 12/2006 |
| JP | 2008-54363 A | 3/2008 |

\* cited by examiner

VOLTAGE SMOOTHING CIRCUIT FOR SMOOTHING VOLTAGE FROM POWER SUPPLY

CROSS-REFERENCE TO RELATED APPLICATIONS

This U.S. National stage application claims priority under 35 U.S.C. §119(a) to Japanese Patent Application Nos. 2009-184413, filed in Japan on Aug. 7, 2009 and 2010-091946, filed in Japan on Apr. 13, 2010, the entire contents of which are hereby incorporated herein by reference.

TECHNICAL FIELD

The present invention relates to a voltage smoothing circuit and in particular to a circuit that smoothes a voltage outputted from a power supply portion.

BACKGROUND ART

A motor driver for driving a motor generates a motor drive voltage in an inverter portion and supplies the motor drive voltage to the motor. Generally, an AC voltage outputted from a power supply is smoothed and is thereafter supplied to the inverter portion.

As a technique for smoothing the voltage from the power source, a technique that utilizes smoothing capacitors that are connected in parallel to the power supply is often used as disclosed in Japanese Laid-open Patent Application Publication No. 2003-8814499, for example. Specifically, in the technique pertaining to Patent Document 1, two smoothing capacitors are connected in series to each other and are connected in parallel to the power supply. Moreover, a balancing resistor whose resistance value is smaller than those of internal resistors of the smoothing capacitors is connected in parallel to the smoothing capacitors. The balancing resistor is a resistor for maintaining a balance between the voltages applied to the smoothing capacitors so that the voltages applied to the smoothing capacitors fall within the rated voltage of the capacitors.

Further, as a related technology other than Japanese Laid-open Patent Application Publication No. 2003-8814499, there is the technology disclosed in Japanese Laid-open Patent Application Publication No. 1-169516.

SUMMARY OF THE INVENTION

Technical Problem

In the technique pertaining to Japanese Laid-open Patent Application Publication No. 2003-8814499, a relatively large current always flows to the balancing resistor, so the need to use a resistor of a specification able to withstand that current as the balancing resistor arises. As such a resistor, a resistor whose dimensions are relatively large, like a cement resistor for example, is predominantly utilized, and the size of the printed board on which the balancing resistor and so forth are mounted inevitably ends up becoming large. Further, in the technique pertaining to Japanese Laid-open Patent Application Publication No. 2003-8814499, because a large current always flows to the balancing resistor, the amount of heat emitted in the balancing resistor is also large and there is the concern that this will have adverse effects on electronic parts near the balancing resistor.

In particular, there are individual differences in the values of internal resistors of smoothing capacitors. For that reason, for example, even if two of the same type of smoothing capacitors whose capacitance value is 2880 µF are used, the internal resistors of the smoothing capacitors do not become exactly the same value but vary in the range of 420 kΩ to 1075 kΩ. In the technique of Japanese Laid-open Patent Application Publication No. 2003-8814499, even in light of variations between the internal resistors of the smoothing capacitors, a balancing resistor with a relatively large resistance value ends up becoming necessary.

Further, in Japanese Laid-open Patent Application Publication No. 1-169516, by using an op-amp or the like to increase and decrease the amount of current flowing to the balancing resistor, the amount of current flowing to the balancing resistor is alleviated compared to Japanese Laid-open Patent Application Publication No. 2003-8814499. However, in this technique, the number of elements configuring a circuit for maintaining a balance between the voltages of the smoothing capacitors and making the voltages applied to the smoothing capacitors fall within the rated voltages of those capacitors is many, and the circuit is also complicated.

Therefore, it is a problem of the present invention to provide a voltage smoothing circuit which, even if there are variations between internal resistors of smoothing capacitors, can with a simple configuration prevent a voltage equal to or greater than the rated voltage of a smoothing capacitor from being applied to that capacitor. It is also a problem of the present invention to provide a voltage smoothing circuit that can with a simple configuration maintain a balance between voltages applied to smoothing capacitors.

Solution to Problem

A voltage smoothing circuit pertaining to a first aspect of the invention is a circuit that smoothes a voltage outputted from a power supply portion. The voltage smoothing circuit comprises a first smoothing capacitor, a second smoothing capacitor, a first balancing resistor, and a second conduction regulating portion. The first smoothing capacitor and the second smoothing capacitor are connected in series to each other and are connected in parallel to the power supply portion. The first balancing resistor is connected in parallel to the first smoothing capacitor. The second conduction regulating portion is connected on a current path in parallel with the second smoothing capacitor. The second conduction regulating portion conducts current in one direction on the current path in a case where a voltage equal to or greater than a second predetermined voltage has been applied.

Examples of the second conduction regulating portion include a Zener diode. When a voltage equal to or greater than a predetermined voltage is applied to the second conduction regulating portion, currents flow from the power supply portion to the first smoothing capacitor and the first balancing resistor. The currents thereafter flow mainly on a current path (the second conduction regulating portion) whose impedance is lower than that on an internal resistor of the second smoothing capacitor, for example. Consequently, the end-to-end voltage of the second smoothing capacitor can be lowered with a simple configuration regardless of variations between the internal resistors of the smoothing capacitors, and a voltage equal to or greater than the rated voltage can be prevented from being applied to the second smoothing capacitor, for example.

A voltage smoothing circuit pertaining to a second aspect of the invention is the voltage smoothing circuit pertaining to the first aspect, wherein the second predetermined voltage is lower than the rated voltage of the second smoothing capacitor. The second conduction regulating portion maintains its inter-terminal voltage at the second predetermined voltage in a case where a voltage equal to or greater than the second predetermined voltage has been applied.

In this voltage smoothing circuit, in a state where a voltage equal to or greater than the second predetermined voltage is not being applied to the second conduction regulating portion, the second conduction regulating portion does not operate and, for example, the currents flowing from the power supply portion to the first smoothing capacitor (specifically, the internal resistor of the first smoothing capacitor) and the first balancing resistor merge and flow to the second smoothing capacitor. When a voltage equal to or greater than the second predetermined voltage is applied to the second conduction regulating portion, the second conduction regulating portion operates, its inter-terminal voltage is maintained at the second predetermined voltage, and the current that had flowed to the second smoothing capacitor at the time when the second conduction regulating portion was not operating branches and flows to the second smoothing capacitor and the second conduction regulating portion connected in parallel to that capacitor. Additionally, the end-to-end voltage of the second smoothing capacitor is maintained (clipped) at the second predetermined voltage that is lower than the rated voltage of the second smoothing capacitor. Consequently, at least the end-to-end voltage of the second smoothing capacitor can be prevented from becoming equal to or greater than the rated voltage of the second smoothing capacitor.

A voltage smoothing circuit pertaining to a third aspect of the invention is the voltage smoothing circuit pertaining to the second aspect, further comprising a second balancing resistor. The second balancing resistor connected on the current path in such a way as to become in parallel with the second smoothing capacitor and in series with the second conduction regulating portion. The current flows in one direction to the second balancing resistor in a case where a voltage equal to or greater than the second predetermined voltage has been applied to the second conduction regulating portion.

According to this voltage smoothing circuit, the second balancing resistor in parallel with the second smoothing capacitor and in series with the second conduction regulating portion is disposed on the current path, so when a voltage equal to or greater than the second predetermined voltage is applied to the second conduction regulating portion, current flows also to the second balancing resistor. Because of this, adverse effects resulting from power loss in the second conduction regulating portion configured by a Zener diode, for example, ending up exceeding the rating and heat being emitted to parts near the second conduction regulating portion can be controlled.

Further, supposing that the second conduction regulating portion is configured by a Zener diode, for example, it is not always the case that a Zener diode where the second predetermined voltage is the desired value is commercially available. Depending on the value of the second predetermined voltage, sometimes cases arise where the voltage applied to the second smoothing capacitor connected in parallel to the Zener diode becomes lower and the voltage applied to the first smoothing capacitor becomes higher or where, conversely, the voltage applied to the second smoothing capacitor becomes higher than the desired value. However, according to this voltage smoothing circuit, the value of the voltage applied to the second smoothing capacitor is, in terms of the circuit configuration, equal to the sum of the voltage applied to the second balancing resistor and the voltage applied to the Zener diode. For this reason, the second predetermined voltage can be set while considering the voltage applied to the second balancing resistor, and in correspondence thereto the range of options for the Zener diode expands. Thus, the second predetermined voltage can be freely set, and it becomes possible to adjust the voltages applied to the first and second smoothing capacitors. Consequently, even if inexpensive capacitors whose rated voltages are low, for example, are used for the first and second smoothing capacitors, this voltage smoothing circuit is applicable also to devices where the operating range of the voltage from the power supply portion is relatively large. Moreover, by setting the second predetermined voltage to an optimum value, it also becomes possible to make the heat emission amounts of configural parts of the voltage smoothing circuit other than the second conduction regulating portion smaller and to make the power loss lower.

A voltage smoothing circuit pertaining to a fourth aspect of the invention is the voltage smoothing circuit pertaining to the third aspect, wherein the resistance value of at least one of the first balancing resistor and the second balancing resistor is decided in such a way as to satisfy a condition where a first end-to-end voltage representing the end-to-end voltage of the first smoothing capacitor becomes lower than the rated voltage of the first smoothing capacitor and a second end-to-end voltage representing the end-to-end voltage of the second smoothing capacitor becomes tower than the rated voltage of the second smoothing capacitor. Additionally, the second predetermined voltage is substantially the same as or less than the second end-to-end voltage.

For the sake of simplifying the description, as an example, a circuit configuration where the second conduction regulating portion is configured by a Zener diode, the second balancing resistor is not disposed on the current path, and only the second conduction regulating portion is disposed on the current path will be taken as an example. In this circuit configuration, the second end-to-end voltage of the second smoothing capacitor is equal to the inter-terminal voltage of the second conduction regulating portion, so when a voltage equal to or greater than the second predetermined voltage is applied to the second conduction regulating portion and current flows on the current path, the second end-to-end voltage becomes the inter-terminal voltage of the second conduction regulating portion that has been clipped—that is, the second predetermined voltage. In this state, when the voltage from the power supply portion rises, in terms of the circuit configuration there is the concern that the first end-to-end voltage of the first smoothing capacitor will rise and end up exceeding the rated voltage of the first smoothing capacitor.

However, in this voltage smoothing circuit, the balancing resistors are decided in such a way that the first end-to-end voltage becomes lower than the rated voltage of the first smoothing capacitor and the second end-to-end voltage becomes lower than the rated voltage of the second smoothing capacitor. Additionally, the second predetermined voltage is substantially the same as or less than the second end-to-end voltage. Consequently, even if the first end-to-end voltage rises due to a rise in the voltage from the power supply portion, the first end-to-end voltage does not exceed the rated voltage of the first smoothing capacitor.

A voltage smoothing circuit pertaining to a fifth aspect of the invention is the voltage smoothing circuit pertaining to any of the second aspect to the fourth aspect, wherein the resistance value of the first balancing resistor is decided in such a way as to satisfy a condition where a first end-to-end voltage representing the end-to-end voltage of the first smoothing capacitor becomes equal to or less than a second end-to-end voltage representing the end-to-end voltage of the second smoothing capacitor and the second end-to-end voltage is lower than the rated voltage of the second smoothing capacitor.

For the sake of simplifying the description, as an example, a circuit configuration where the second conduction regulating portion is configured by a Zener diode, the second balancing resistor is not disposed on the current path, and only the second conduction regulating portion is disposed on the current path will be taken as an example. A case will be considered where, in this circuit configuration, the second predetermined voltage is not applied to the second conduction regulating portion and the second conduction regulating portion does not operate due to a factor such as the difference between the internal resistors of the smoothing capacitors being large or the voltage from the power supply portion being low, for example. In this case, the end-to-end voltage of the second smoothing capacitor connected in parallel to the second conduction regulating portion is always kept equal to or less than the second predetermined voltage. However, in terms of the circuit configuration, the first end-to-end voltage of the first smoothing capacitor becomes a voltage obtained by subtracting the second end-to-end voltage of the second smoothing capacitor from the voltage from the power supply portion, and depending on the case the concern that the first end-to-end voltage of the first smoothing capacitor will reach a voltage equal to or greater than the rated voltage of the first smoothing capacitor is also not inconceivable.

However, according to this voltage smoothing circuit, the resistance value of the first balancing resistor is decided in such a way that the first end-to-end voltage of the first smoothing capacitor to which the second conduction regulating portion is not connected in parallel becomes equal to or less than the second end-to-end voltage of the second smoothing capacitor to which the second conduction regulating portion is connected in parallel. For that reason, the first end-to-end voltage of the first smoothing capacitor is always kept equal to or less than the second predetermined voltage of the second conduction regulating portion, and consequently the concern that a voltage equal to or greater than the rated voltage wilt be applied to the first smoothing capacitor can be avoided.

A voltage smoothing circuit pertaining to a sixth aspect of the invention is the voltage smoothing circuit pertaining to any of the second aspect to the fifth aspect, further comprising either of a first auxiliary resistor and a second auxiliary resistor. The first auxiliary resistor is connected in parallel to the second conduction regulating portion. The second auxiliary resistor is connected in parallel to the first smoothing capacitor and the second smoothing capacitor connected in series to each other.

According to this voltage smoothing circuit, the current that has flowed through the second conduction regulating portion in the circuit configuration where the first auxiliary resistor or the second auxiliary resistor was not disposed branches and flows to the first auxiliary resistor or the second auxiliary resistor and the second conduction regulating portion. Because of this, the amount of current flowing to the second conduction regulating portion becomes smaller, so the operating voltage and the rated power of the second conduction regulating portion can be set low, and a portion whose rated current is relatively small can be used for the second conduction regulating portion. Consequently, costs pertaining to the voltage smoothing circuit can be reduced (in particular, the cost of the second conduction regulating portion can be cut).

A voltage smoothing circuit pertaining to a seventh aspect of the invention is the voltage smoothing circuit pertaining to the first aspect, further comprising a second balancing resistor and a first conduction regulating portion. The second balancing resistor is connected on the current path in such a way as to become in parallel with the second smoothing capacitor and in series with the second conduction regulating portion. The first conduction regulating portion is connected in series to the first balancing resistor and conducts current in one direction to the first balancing resistor in a case where a voltage equal to or greater than a predetermined first voltage has been applied. Additionally, current flows in one direction to the second balancing resistor in a case where a voltage equal to or greater than the second predetermined voltage has been applied to the second conduction regulating portion.

In this voltage smoothing circuit, in a case where a voltage equal to or greater than the first predetermined voltage has been applied to the first conduction regulating portion, current flows to the first balancing resistor, and the current flows to the second smoothing capacitor without flowing to the second balancing resistor, for example. In a case where a voltage equal to or greater than the second predetermined voltage has been applied to the second conduction regulating portion, current flows to the second balancing resistor, whereby current flows also to the first smoothing capacitor, for example. In a case where current has flowed to the first smoothing capacitor, the end-to-end voltage of the first smoothing capacitor rises, and in a case where current has flowed to the second smoothing capacitor, the end-to-end voltage of the second smoothing capacitor arises, so a balance between the voltages applied to the smoothing capacitors can be maintained with a simple configuration.

A voltage smoothing circuit pertaining to an eighth aspect of the invention is the voltage smoothing circuit pertaining to the seventh aspect, further comprising a third auxiliary resistor and a fourth auxiliary resistor. The third auxiliary resistor is connected in parallel to both ends of the first conduction regulating portion. The fourth auxiliary resistor is connected in parallel to both ends of the second conduction regulating portion.

Current flowing on the current path including the first balancing resistor branches and flows to the first conduction regulating portion and the third auxiliary resistor, and current flowing on the current path including the second balancing resistor branches and flows to the second conduction regulating portion and the fourth auxiliary resistor. Because of this, the amounts of current flowing to the first and second conduction regulating portions become smaller, so the operating voltages and the rated power of the first and second conduction regulating portions can be set low, and portions whose rated currents are relatively small can be used for the first and second conduction regulating portions. Consequently, costs pertaining to the voltage smoothing circuit can be reduced (in particular, the cost of the first and second conduction regulating portions can be cut).

A voltage smoothing circuit pertaining to a ninth aspect of the invention is the voltage smoothing circuit pertaining to the seventh aspect or the eighth aspect, wherein a voltage equal to or greater than the second predetermined voltage is not applied to the second conduction regulating portion in a case where a voltage equal to or greater than the first predetermined voltage has been applied to the first conduction regulating portion. A voltage equal to or greater than the first predetermined voltage is not applied to the first conduction regulating portion in a case where a voltage equal to or greater than the second predetermined voltage has been applied to the second conduction regulating portion.

In this voltage smoothing circuit, in a case where a voltage equal to or greater than the first predetermined voltage has been applied to the first conduction regulating portion, current that has flowed through the first balancing resistor flows to the second smoothing capacitor without flowing to the second balancing resistor. In a case where a voltage equal to or greater than the second predetermined voltage has been applied to the second conduction regulating portion, current flows to the second balancing resistor, whereby current flows also to the first smoothing capacitor, but current does not flow to the first balancing resistor. That is, in this voltage smoothing circuit, a voltage equal to or greater than the first predetermined voltage or equal to or greater than the second predetermined voltage is applied only to either one of the first conduction regulating portion and the second conduction regulating portion, so current does not always flow to the first and second balancing resistors. For that reason, resistors whose dimensions are relatively small can be utilized for the first and second balancing resistors, and the amounts of heat emitted in the first and second balancing resistors can be alleviated. Consequently, the printed board on which the first and second balancing resistors are mounted can be made smaller.

A voltage smoothing circuit pertaining to a tenth aspect of the invention is the voltage smoothing circuit pertaining to the ninth aspect, wherein the first conduction regulating portion is configured by a first Zener diode. The second conduction regulating portion is configured by a second Zener diode. The first predetermined voltage and second predetermined voltage are decided, on the basis of the value of the voltage that the power supply portion outputs, in such a way that current flows only to either one of the first Zener diode and the second Zener diode.

For example, in a case supposing that the value of the voltage that the power supply portion outputs is "718 V", the first predetermined voltage and the second predetermined voltage that are the Zener voltages of the Zener diodes are both decided as "360 V". Because of this, current flows only to either one of the first Zener diode and the second Zener diode, so the amounts of heat emitted in the first and second balancing resistors can be alleviated with a simple configuration.

A voltage smoothing circuit pertaining to an eleventh aspect of the invention is the voltage smoothing circuit pertaining to the tenth aspect, wherein the first predetermined voltage and the second predetermined voltage are equal to or less than the rated voltages of the first smoothing capacitor and the second smoothing capacitor.

Because of this, voltages that are larger than the values of the first predetermined voltage and the second predetermined voltage that are Zener voltages are applied to the first and second smoothing capacitors.

A voltage smoothing circuit pertaining to a twelfth aspect of the invention is the voltage smoothing circuit pertaining to the seventh aspect or the eighth aspect, wherein a voltage equal to or greater than the first predetermined voltage is applied to the first conduction regulating portion and a voltage equal to or greater than the second predetermined voltage is applied also to the second conduction regulating portion.

According to this voltage smoothing circuit, a voltage equal to or greater than the first predetermined voltage is applied to the first conduction regulating portion and a voltage equal to or greater than the second predetermined voltage is applied also to the second conduction regulating portion, so currents are applied to both of the first conduction regulating portion and the second conduction regulating portion.

A voltage smoothing circuit pertaining to a thirteenth aspect of the invention is the voltage smoothing circuit pertaining to the twelfth aspect, wherein the voltage smoothing circuit can take either of a first state and a second state. The first state is a state where a voltage equal to or greater than the first predetermined voltage is applied to the first conduction regulating portion and thereafter a voltage equal to or greater than the second predetermined voltage is applied also to the second conduction regulating portion. The second state is a state where a voltage equal to or greater than the second predetermined voltage is applied to the second conduction regulating portion and thereafter a voltage equal to or greater than the first predetermined voltage is applied also to the first conduction regulating portion.

According to this voltage smoothing circuit, a voltage equal to or greater than a predetermined voltage is applied to either one of the conduction regulating portions and that conduction regulating portion starts operating, whereby a voltage equal to or greater than a predetermined voltage is applied also the other of the conducting regulating portions and that conduction regulating portion also starts operating, and a balance between the voltages applied to the smoothing capacitors is maintained.

A voltage smoothing circuit pertaining to a fourteenth aspect of the invention is the voltage smoothing circuit pertaining to the twelfth aspect or the thirteenth aspect, wherein the first conduction regulating portion is configured by a first Zener diode, and the second conduction regulating portion is configured by a second Zener diode.

According to this voltage smoothing circuit, current flows to the first Zener diode as a result of a voltage equal to or greater than the first predetermined voltage that is a Zener voltage being applied to the first Zener diode. Current flows to the second Zener diode as a result of a voltage equal to or greater than the second predetermined voltage that is a Zener voltage being applied to the second Zener diode. The voltages in the first Zener diode and the second Zener diode are respectively clipped to the first predetermined voltage and the second predetermined voltage. For that reason, a difference voltage between the end-to-end voltage of the first smoothing capacitor and the first predetermined voltage is applied to the first balancing resistor, and a difference voltage between the end-to-end voltage of the second smoothing capacitor and the second predetermined voltage is applied to the second balancing resistor. Consequently, the values of the currents flowing to the first and second balancing resistors can be made smaller than conventionally with a simple configuration, and thus the amounts of heat emitted in the first and second balancing resistors can be alleviated.

A voltage smoothing circuit pertaining to a fifteenth aspect of the invention is the voltage smoothing circuit pertaining to the fourteenth aspect, wherein the first predetermined voltage and the second predetermined voltage are equal to or less than the rated voltages of the first smoothing capacitor and the second smoothing capacitor.

Because of this, voltages that are larger than the values of the first predetermined voltage and the second predetermined voltage that are Zener voltages are applied to the first and second smoothing capacitors.

A voltage smoothing circuit pertaining to a sixteenth aspect of the invention is the voltage smoothing circuit pertaining to any of the third aspect to the fifteenth aspect, wherein the first balancing resistor has a resistance value that is smaller than the value of an internal resistor of the first smoothing capacitor. The second balancing resistor has a resistance value that is smaller than the value of an internal resistor of the second smoothing capacitor.

Because of this, the amounts of current flowing to the first balancing resistor and the second balancing resistor become larger than the amounts of current flowing to the internal resistors of the first smoothing capacitor and the second smoothing capacitor, so the amounts of current flowing to the first smoothing capacitor and the second smoothing capacitor can be controlled. Consequently, the voltages applied to the first smoothing capacitor and the second smoothing capacitor can be made lower.

Advantageous Effects of Invention

According to the voltage smoothing circuit pertaining to the first aspect of the invention, the end-to-end voltage of the second smoothing capacitor can be lowered with a simple configuration regardless of variations between the internal resistors of the smoothing capacitors.

According to the voltage smoothing circuit pertaining to the second aspect of the invention, at least a voltage equal to or greater than the rated voltage can be prevented from being applied to the second smoothing capacitor.

According to the voltage smoothing circuit pertaining to the third aspect of the invention, adverse effects resulting from power loss in the second conduction regulating portion ending up exceeding the rating and heat being emitted to parts near the second conduction regulating portion can be controlled. Further, the second predetermined voltage can be freely set, and it becomes possible to adjust the voltages applied to the first and second smoothing capacitors. Consequently, even if inexpensive capacitors whose rated voltages are low, for example, are used for the first and second smoothing capacitors, this voltage smoothing circuit is applicable also to devices where the operating range of the voltage from the power supply portion is relatively large. Moreover, by setting the second predetermined voltage to an optimum value, it also becomes possible to make the heat emission amounts of configural parts of the voltage smoothing circuit other than the second conduction regulating portion smaller and to make the power loss lower.

According to the voltage smoothing circuit pertaining to the fourth aspect of the invention, even if the first end-to-end voltage rises due to a rise in the voltage from the power supply portion, the first end-to-end voltage of the first smoothing capacitor does not exceed the rated voltage of that capacitor.

According to the voltage smoothing, circuit pertaining to the fifth aspect of the invention, the first end-to-end voltage of the first smoothing capacitor is always kept equal to or less than the second predetermined voltage of the second conduction regulating portion, so the concern that a voltage equal to or greater than the rated voltage will be applied to the first smoothing capacitor can be avoided.

According to the voltage smoothing circuit pertaining to the sixth aspect of the invention, costs pertaining to the voltage smoothing circuit can be reduced (in particular, the cost of the second conduction regulating portion can be cut).

According to the voltage smoothing circuit pertaining to the seventh aspect of the invention, a balance between the voltages applied to the smoothing capacitors can be maintained with a simple configuration.

According to the voltage smoothing circuit pertaining to the eighth aspect of the invention, the operating voltages and the rated power of the first and second conduction regulating portions can be set low, and portions whose rated currents are relatively small can be used for the first and second conduction regulating portions. Consequently, costs pertaining to the voltage smoothing circuit can be reduced (in particular, the cost of the first and second conduction regulating portions can be cut).

According to the voltage smoothing circuit pertaining to the ninth aspect of the invention, current does not always flow to both of the first and second balancing resistors, so resistors whose dimensions are relatively small can be utilized for the first and second balancing resistors, and the amounts of heat emitted in the first and second balancing resistors can be alleviated. Consequently, the printed board on which the first and second balancing resistors are mounted can be made smaller.

According to the voltage smoothing circuit pertaining to the tenth aspect of the invention, the amounts of heat emitted in the first and second balancing resistors can be alleviated with a simple configuration.

According to the voltage smoothing circuit pertaining to the eleventh aspect of the invention, voltages that are larger than the values of the first predetermined voltage and the second predetermined voltage that are Zener voltages are applied to the first and second smoothing capacitors.

According to the voltage smoothing circuit pertaining to the twelfth aspect of the invention, currents are flowed to both of the first conduction regulating portion and the second conduction regulating portion.

According to the voltage smoothing circuit pertaining to the thirteenth aspect of the invention, a balance between the voltages applied to the smoothing capacitors is maintained.

According to the voltage smoothing circuit pertaining to the fourteenth aspect of the invention, the values of the currents flowing to the first and second balancing resistors can be made smaller than conventionally with a simple configuration, and thus the amounts of heat emitted in the first and second balancing resistors can be alleviated.

According to the voltage smoothing circuit pertaining to the fifteenth aspect of the invention, voltages that are larger than the values of the first predetermined voltage and the second predetermined voltage that are Zener voltages are applied to the first and second smoothing capacitors.

According to the voltage smoothing circuit pertaining to the sixteenth aspect of the invention, the amounts of current flowing to the first smoothing capacitor and the second smoothing capacitor can be controlled, and the voltages applied to the first smoothing capacitor and the second smoothing capacitor can be made lower.

DESCRIPTION OF EMBODIMENTS

A voltage smoothing circuit pertaining to the present invention will be described in detail below using the drawings.

First Embodiment (1) Brief

Figure 1:
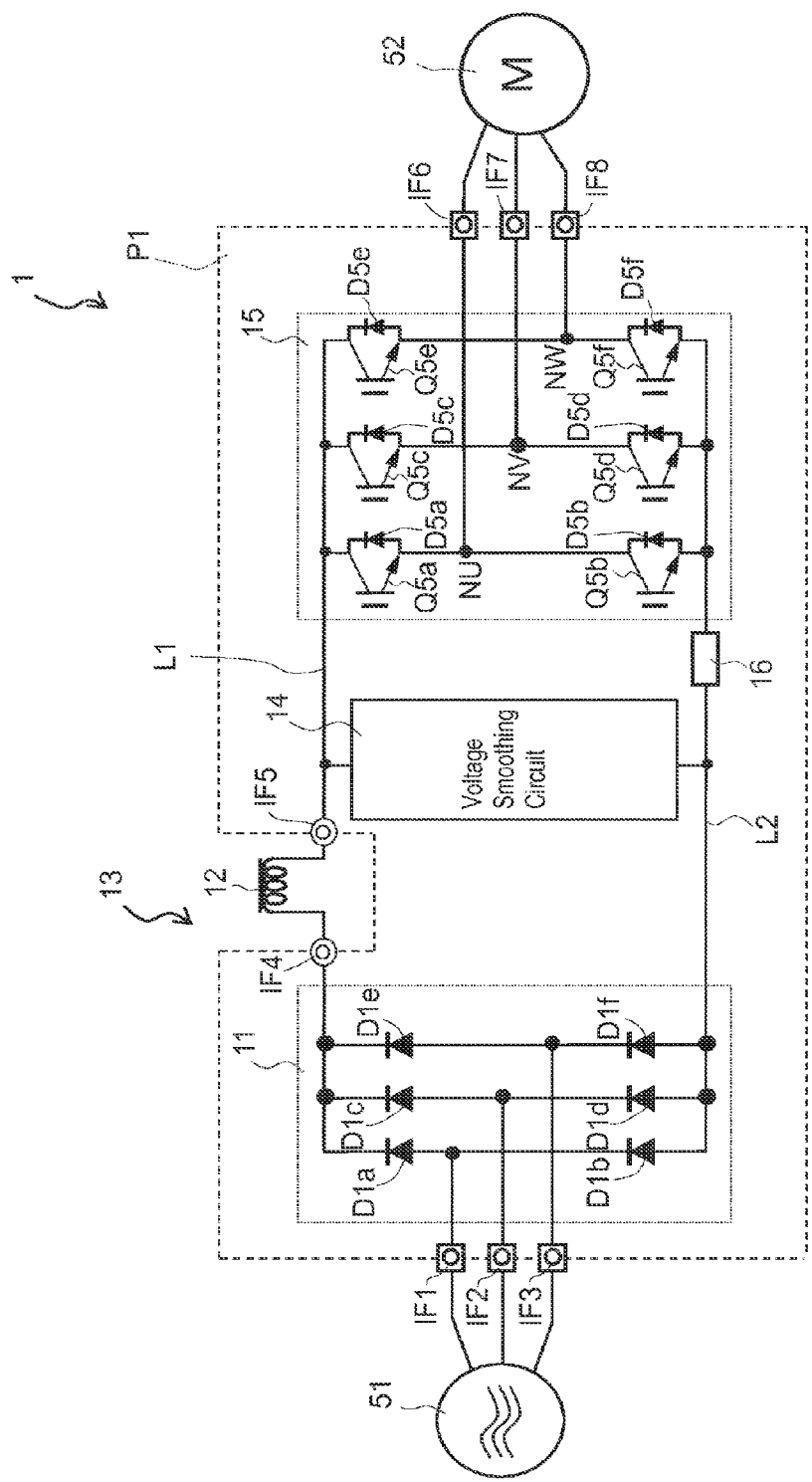
FIG. 1 is a configuration diagram of a motor driver that is equipped with a voltage smoothing circuit pertaining to a first embodiment.

FIG. 1 is a configuration diagram of a motor driver 1 that is equipped with a voltage smoothing circuit 14 pertaining to the present embodiment. The motor driver 1 is utilized for driving a compressor-use motor 52 that is a drive source of a compressor of an air conditioning apparatus, for example. Examples of types of the compressor-use motor 52 include a 3-phase brushless DC motor.

The motor driver 1 is mainly equipped with a power supply portion 13, the voltage smoothing circuit 14, an inverter portion 15, and a current detecting portion 16. The power supply portion 13 has a diode bridge 11 and a reactor 12, and the diode bridge 11, the voltage smoothing circuit 14, the inverter portion 15, and the current detecting portion 16 are configured on a single printed board P1. The reactor 12 is externally connected to the printed board P1 via interfaces IF4 and IF5 of the printed board P1.

The diode bridge 11 is configured by six diodes D1$a$, D1$b$, D1$c$, D1$d$, D1$e$, and D1$f$. The diodes D1$a$ and D1$b$, D1$e$ and D1$d$, and D1$e$ and D1$f$ are respectively connected in series to each other, and these are connected so as to become in parallel with each other. Points-of-connection between the diodes D1$a$ and D1$b$, D1$e$ and D1$d$, and D1$e$ and D1$f$ that are connected in series are connected to a 3-phase commercial power supply 51 via interfaces IF1, IF2, and IF3 on the printed board P1. An AC voltage outputted from the commercial power supply 51 is rectified by the diode bridge 11. The reactor 12 is connected in series on a power supply line L1 to which the cathodes of the diodes D1$a$, D1$c$, and D1$e$ are connected. The voltage rectified by the diode bridge 11 comes to have a waveform close to a DC voltage because of the reactor 12 and is applied to the voltage smoothing circuit 14. The anodes of the diodes D1$b$, D1$d$, and D1$f$ are connected to a GND line L2.

The voltage smoothing circuit 14 is a circuit for smoothing the voltage outputted from the power supply portion 13 and is placed between the power supply portion 13 and the inverter portion 15. Details of the voltage smoothing circuit 14 will be described later.

The inverter portion 15 is configured by insulated gate bipolar transistors Q5$a$, Q5$b$, Q5$c$, Q5$d$, Q5$e$, and Q5$f$ (below, simply called "transistors") and reflux-use diodes D5$a$, D5$b$, D5$c$, D5$d$, D5$e$, and D5$f$. The transistors Q5$a$ and Q5$b$, Q5$c$ and Q5$d$, and Q5$e$ and Q5$f$ are connected in series between the power supply line L1 and the GND line L2. Points-of-connection NU, NV, and NW between the transistors Q5$a$ and Q5$b$, Q5$c$ and Q5$d$, and Q5$e$ and Q5$f$ are connected to the compressor-use motor 52 via interfaces IF6, IF7, and IF8 on the printed board P1. The diodes D5$a$ to D5$f$ have the characteristic that they conduct current in a case where a reverse voltage has been applied to the transistors Q5$a$ to Q5$f$, and the diodes D5$a$ to D5$f$ are connected in parallel to the transistors Q5$a$ to Q5$f$. The inverter portion 15 having this configuration generates a drive voltage for driving the compressor-use motor 52 when the transistors Q5$a$ to Q5$f$ are switched ON and OFF on the basis of a gate control voltage sent from a microcomputer (not shown in the drawings). The compressor-use motor 52 is driven to rotate by the drive voltage.

The current detecting portion 16 detects a motor current that has flowed to the compressor-use motor 52. The current detecting portion 16 is mainly configured by a shunt resistor, which is connected in series on the GND line L2 between the voltage smoothing circuit 14 and the inverter portion 15, and a microcomputer (not shown in the drawings), which computes the motor current on the basis of the end-to-end voltage of the shunt resistor.

(2) Configuration of Voltage Smoothing Circuit

Figure 2:
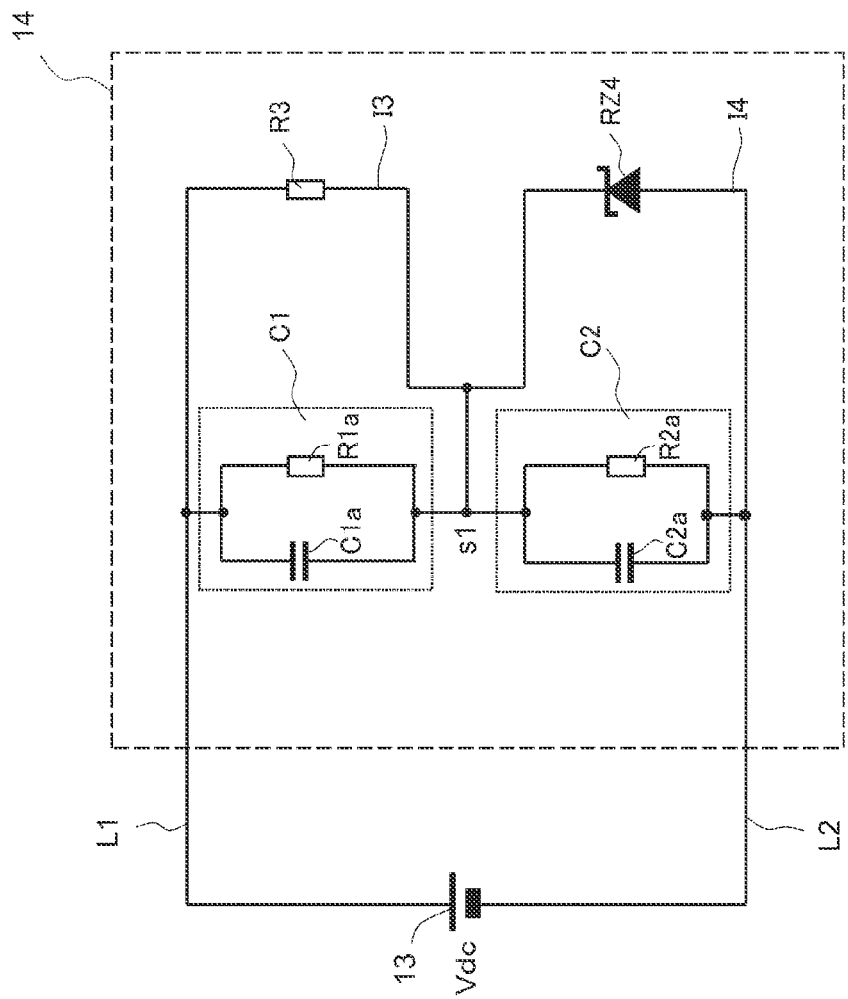
FIG. 2 is a circuit diagram of the voltage smoothing circuit pertaining to the first embodiment.
Figure 3:
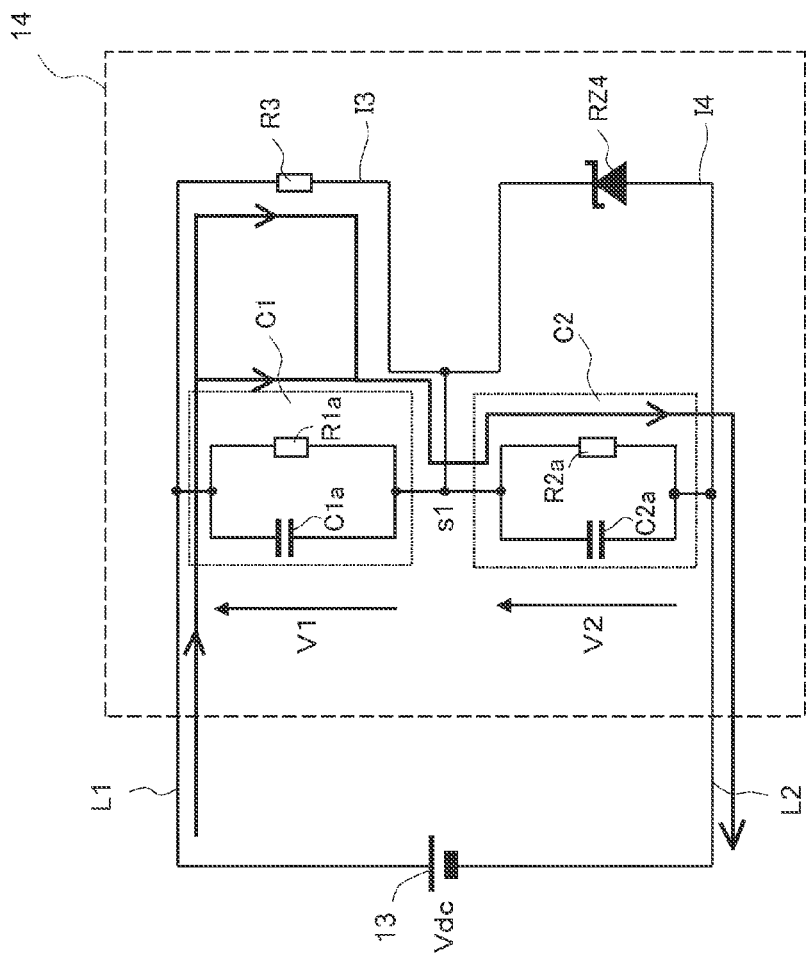
FIG. 3 is a diagram showing paths of currents flowing in the voltage smoothing circuit in a case where the end-to-end voltage of a second smoothing capacitor is lower than a. Zener voltage in the voltage smoothing circuit of FIG. 2.
Figure 4:
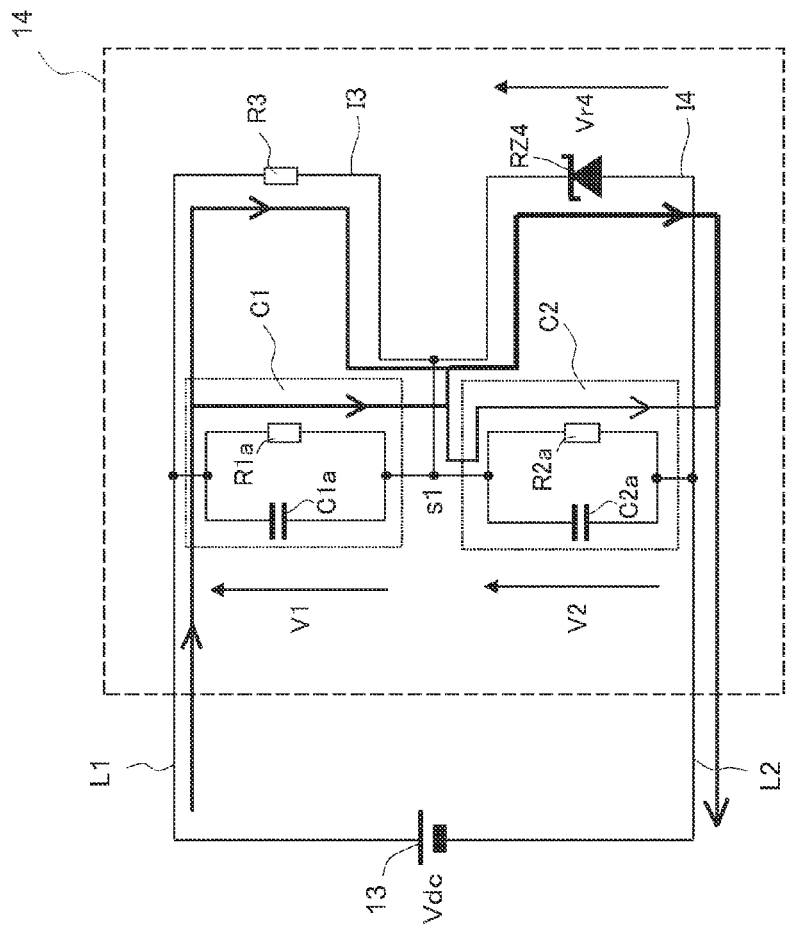
FIG. 4 is a diagram showing paths of currents flowing in the voltage smoothing circuit in a case where the end-to-end voltage of the second smoothing capacitor is equal to or greater than the Zener voltage in the voltage smoothing circuit of FIG. 2.

Next, the configuration of the voltage smoothing circuit 14 pertaining to the present embodiment will be specifically described using FIGS. 2 to 4. In FIGS. 2 to 4, for the sake of simplifying the drawings, only the power supply portion 13 and the voltage smoothing circuit 14 are extracted from FIG. 1 and shown. Further, as has already been described, because the voltage from the commercial power supply 51 that has come to have a waveform close to a DC voltage is applied by the power supply portion 13 via the power supply line L1 to the voltage smoothing circuit 14, the power supply portion 13 is represented as a "DC power supply". In FIGS. 2 to 4, the value of the DC voltage outputted from the power supply portion 13 is represented as "Vdc". Supposing, thr example, that the AC voltage outputted from the commercial power supply 51 is a voltage within a range whose upper limit is about 470 V±10% and whose lower limit is about 380 V−10%, the voltage Vdc can be a voltage within a range of about 731 V to about 483 V.

The voltage smoothing circuit 14 is equipped with a first smoothing capacitor C1, a second smoothing capacitor C2, a balancing resistor R3 (which corresponds to a first balancing resistor), and a Zener diode RZ4 (which corresponds to a second conduction regulating portion).

(2-1) First Smoothing Capacitor and Second Smoothing Capacitor

The first smoothing capacitor C1 and the second smoothing capacitor C2 are connected in series to each other and are connected in parallel to the power supply portion 13. Specifically, one end of the first smoothing capacitor C1 is connected to the power supply line L1, and one end of the second smoothing capacitor C2 is connected to the GND line L2. The other ends of the first smoothing capacitor C1 and the second smoothing capacitor C2 are connected to each other. The first smoothing capacitor C1 and the second smoothing capacitor C2 further smooth the voltage outputted from the power supply portion 13.

Here, generally, the equivalent circuit of a capacitor is configured by a capacitance component and a resistance component (below, called an "internal resistor") that are connected in parallel to each other and also by an inductance component that is connected in series to these components. In FIG. 2, for the sake of simplifying the description, the inductance component is omitted and the first and second smoothing capacitors C1 and C2 are respectively represented by internal resistors R1$a$ and R2$a$ and capacitance components C1$a$ and C2$a$. The internal resistor R1$a$ and the capacitance component C1$a$ of the first smoothing capacitor C1 are connected in parallel to each other. The internal resistor R2$a$ and the capacitance component C2$a$ of the second smoothing capacitor C2 are connected in parallel to each other.

The first smoothing capacitor C1 and the second smoothing capacitor C2 have the same capacitance values; as an example, 1920 μC and 2880 μC can be given. Supposing that the capacitance values of the smoothing capacitors C1 and C2 are 2880 μC, for example, values in a range whose upper limit is 1075 kΩ and whose lower limit is 420 kΩ can be given for the resistance values of the internal resistors R1$a$ and R2$a$.

Moreover, supposing that the voltage Vdc is "718 V", for example, smoothing capacitors whose rated voltages Vrt1 and Vrt2 are about 400 V to about 450 V, for example, are utilized for the first smoothing capacitor C1 and the second smoothing capacitor C2. That is, it can be said that the rated voltages Vrt1 and Vrt2 of the smoothing capacitors C1 and C2 are values that are around about 1.1 times to about 1.3 times about one-half of the value of the voltage Vdc. Further, examples of types of capacitors that may be used for the first smoothing capacitor C1 and the second smoothing capacitor C2 include electrolytic capacitors, tantalum capacitors, ceramic capacitors, and so forth, but in the present embodiment, electrolytic capacitors are used for the first smoothing capacitor C1 and the second smoothing capacitor C2.

(2-2) Balancing Resistor

The balancing resistor R3 is connected on a current path I3 in parallel with the first smoothing capacitor C1. Specifically, one end of the current path I3 is connected to the power supply line L1, the other end of the current path I3 is connected to a point-of-connection s1 between the first smoothing capacitor C1 and the second smoothing capacitor C2, and the balancing resistor R3 is connected in series on this current path I3.

The balancing resistor R3 has a resistance value that is smaller than the value of the internal resistor R1$a$ of the first smoothing capacitor C1. This is to control the amount of current flowing to the first smoothing capacitor C1. That is, this is because the amount of current flowing to the balancing resistor R3 becomes larger than the amount of current flowing to the internal resistor R1$a$ of the first smoothing capacitor C1, and the more the resistance value of the balancing resistor R3 is decided to be a small value, the more the controllability of the amount of current flowing to the first smoothing capacitor C1 improves.

Moreover, the resistance value of the balancing resistor R3 pertaining to the present embodiment is decided in such a way as to not only satisfy the above-described condition (that is, the value of the balancing resistor R3 is smaller than the value of the internal resistor R1$a$ of the first smoothing capacitor C1) but also satisfy other conditions, but a detailed method of deciding the resistance value of the balancing resistor R3 will be described later.

(2-3) Zener Diode

The Zener diode RZ4 is connected on a current path I4 in parallel with the second smoothing capacitor C2 to which the balancing resistor R3 is not connected in parallel. More specifically, the anode of the Zener diode RZ4 is connected to the GND line L2 side and the cathode of the Zener diode RZ4 is connected to the point-of-connection s1 side between the first smoothing capacitor C1 and the second smoothing capacitor C2; because of this, the current path I4 is formed.

The voltage applied to the Zener diode RZ4 is, terms of the circuit configuration, equal to an end-to-end voltage V2 (which corresponds to a second end-to-end voltage) of the second smoothing capacitor C2 connected in parallel to the Zener diode RZ4. Thus, if the end-to-end voltage V2 is lower than a Zener voltage Vr4 (which corresponds to a second predetermined voltage) (V2<Vr4), a voltage less than the Zener voltage Vr4 is applied to the Zener diode RZ4 and the Zener diode RZ4 does not operate (see FIG. 3). Conversely, if the end-to-end voltage V2 is equal to or greater than the Zener voltage Vr4 (V2≥Vr4), a voltage equal to or greater than the Zener voltage Vr4 is applied to the Zener diode RZ4, current flows in one direction on the current path I4 including the Zener diode RZ4, and the voltage between the anode and the cathode of the Zener diode RZ4 (below, called an "interterminal voltage") is maintained at the Zener voltage Vr4 (see FIG. 4). The one direction referred to here is a direction from the cathode to the anode of the Zener diode RZ4.

Here, in the present embodiment, the Zener voltage Vr4 is decided in such a way as to become lower than the rated voltage Vrt2 of the second smoothing capacitor C2 (Vr4<Vrt2). This is so that when a voltage equal to or greater than the Zener voltage Vr4 is applied to the Zener diode RZ4, the characteristic whereby the end-to-end voltage V2 of the second smoothing capacitor C2 is clipped to the Zener voltage Vr4 by the operation of the Zener diode RZ4 is utilized to prevent the end-to-end voltage V2 of the second smoothing capacitor C2 that is clipped from becoming equal to or greater than the rated voltage Vrt2 of that capacitor C2. Moreover, the Zener voltage Vr4 may also be decided on the basis of the voltage Vdc from the power supply portion 13. As an example, supposing that the rated voltage Vrt2 of the second smoothing capacitor C2 is 400 V, for example, and the voltage Vdc is 718 V, the Zener voltage Vr4 is decided as "376 V" in such a way as to become smaller than the rated voltage of the second smoothing capacitor C2 and equal to or less than the voltage Vdc and larger than one-half of the voltage Vdc. Because of this, when a voltage equal to or greater than 376 V is applied to the Zener diode RZ4 due to, for example, variations between the internal resistors R1$a$ and R2$a$ of the first smoothing capacitor C1 and the second smoothing capacitor C2, the Zener diode RZ4 operates and the end-to-end voltage V2 of the second smoothing capacitor C2 is clipped to 376 V. In this case, a voltage obtained by subtracting the end-to-end voltage V2 of the second smoothing capacitor C2 from the voltage Vdc of the power supply portion 13 (V1=Vdc−V2, and specifically 718 V−376 V=342 V) becomes an end-to-end voltage V1 of the first smoothing capacitor C1.

Further, the value of the Zener voltage Vr4 may also be decided considering not only the rated voltage Vrt2 of the second smoothing capacitor C2, the voltage Vdc from the power supply portion 13, and so forth but also the rated voltage Vrt1 of the first smoothing capacitor C1, the value of the balancing resistor R3, and so forth. An example where the Zener voltage Vr4 is decided also considering the rated voltage Vrt2, the value of the balancing resistor R3, and so forth will be described below together with a method of deciding the resistance value of the balancing resistor R3.

(3) Method of Deciding Resistance Value of Balancing Resistor and Zener Voltage First, a case will be considered where the Zener diode RZ4 is switched ON by a voltage equal to or greater than the Zener voltage Vr4 being applied to the Zener diode RZ4 and current flows in the one direction on the current path I4. In this case, as described above, the end-to-end voltage V2 of the second smoothing capacitor C2 is held at a constant voltage (the Zener voltage Vr4).

Therefore, the balancing resistor R3 pertaining to the present embodiment is decided in such a way as to satisfy a condition where the end-to-end voltage V1 (which corresponds to a first end-to-end voltage) of the first smoothing capacitor C1 becomes lower than the rated voltage Vrt1 of that capacitor C1 (V1<Vrt1) and the end-to-end voltage V2 of the second smoothing capacitor C2 becomes lower than the rated voltage Vrt2 of that capacitor C2 (V2<Vrt2). Because of this, even if the end-to-end voltage V2 of the second smoothing capacitor C2 rises, the value of that end-to-end voltage V2 does not exceed the rated voltage Vrt2 of that capacitor C2, and in particular a rise in the end-to-end voltage V2 equal to or greater than the rated voltage Vrt2 is avoided because of the Zener diode RZ4. Additionally, although there is the potential for the end-to-end voltage V1 of the first smoothing capacitor C1 to rise due to a rise in the voltage Vdc from the power supply portion 13 even while the end-to-end voltage V2 of the second smoothing capacitor C2 is being clipped to the Zener voltage Vr4 (V2≈Vr4), the value of the balancing resistor R3 is decided in such a way as to satisfy the condition described above, so a voltage equal to or greater than the rated voltage Vrt1 can be prevented from being applied to the first smoothing capacitor C1.

This will be specifically described below. In terms of the circuit configuration of the voltage smoothing circuit 14, the inter-terminal voltage of the Zener diode RZ4 is always equal to the end-to-end voltage V2 of the second smoothing capacitor C2. Additionally, the voltage Vdc from the power supply portion 13 is equal to the sum of the end-to-end voltage V1 of the first smoothing capacitor C1 and the end-to-end voltage V2 of the second smoothing capacitor C2 (see the following equation (1)).

<Equation 1>

$$Vdc = V1 + V2 \quad (1)$$

From the above equation (1) and the relationship between the end-to-end voltage V2 and the inter-terminal voltage of the Zener diode RZ4, the end-to-end voltage V2 of the second smoothing capacitor C2 takes a maximum value in a case where the internal resistor R1$a$ of the first smoothing capacitor C1 and the balancing resistor R3 are both minimum values and the internal resistor R2$a$ of the second smoothing capacitor C2 is a maximum value. Thus, as a first condition for deciding the Zener voltage Vr4 and the balancing resistor R3, the maximum value of the end-to-end voltage V2 becoming lower than the rated voltage Vrt2 of the second smoothing capacitor can be given (see the following equation (2)).

<Equation 2>

$$V2(\max) \approx Vr4 < Vrt2 \quad (2)$$

"V2(max)" represents the maximum value of the end-to-end voltage V2 of the second smoothing capacitor C2.

Conversely, the end-to-end voltage V2 of the second smoothing capacitor C2 takes a minimum value in a case where the internal resistor R1$a$ of the first smoothing capacitor C1 and the balancing resistor R3 are both maximum values and the internal resistor R2$a$ of the second smoothing capacitor C2 is a minimum value. At a time when the end-to-end voltage V2 of the second smoothing capacitor C2 takes a minimum value, the end-to-end voltage V1 of the first smoothing capacitor C1 takes a maximum value. Therefore, as a second condition for deciding the Zener voltage Vr4 and the balancing resistor R3, the maximum value of the end-to-end voltage V1 of the first smoothing capacitor C1 becoming lower than the rated voltage Vrt1 of the first smoothing capacitor C1 can be given (see the following equation (3)).

<Equation 3>

$$V1(\max) = Vdc(\max) - V2(\min) < Vrt1 \quad (3)$$

"V1(max)" represents the maximum value of the end-to-end voltage V1 of the first smoothing capacitor C1, and "Vdc (max)" represents the maximum value of the voltage Vdc from the power supply portion 13. "V2(min)" represents the minimum value of the end-to-end voltage V2 of the second smoothing capacitor C2.

The Zener voltage Vr4 and the resistance value of the balancing resistor R3 are decided on the basis of the above equations (2) and (3) and in such a way that the resistance value of the balancing resistor R3 becomes smaller than the internal resistor R1a of the first smoothing capacitor C1. The internal resistors R1a and R2a and the rated voltages Vrt1 and Vrt2 of the smoothing capacitors C1 and C2 are values unique to capacitors and are known values, and the range of the value of the voltage Vdc from the power supply portion 13 is decided, so what becomes variables in the above equations (2) and (3) are the Zener voltage Vr4 and the value of the balancing resistor R3. For that reason, the Zener voltage Vr4 and the resistance value of the balancing resistor R3 can be decided from the above equations (2) and (3) and the conditions of the balancing resistor R3 and the internal resistor Ma.

The resistance value of the balancing resistor R3 that has been decided by the method described above may also be adjusted considering the lower limit value of variations between the internal resistors R1a and R2a of the smoothing capacitors C1 and C2. Further, considering also power loss in the balancing resistor R3 and the Zener diode RZ4, it is preferred that the resistance value of the balancing resistor R3 be decided in such a way that that power loss becomes a target power loss amount.

Here, as an example of the resistance value of the balancing resistor R3 that has been decided by the method described above, the resistance value of the balancing resistor R3 may be "350 kΩ" in a case supposing that the internal resistor R1a of the first smoothing capacitor C1 is "1075 kΩ". In this way, the voltage applied to the balancing resistor R3 pertaining to the present embodiment can be made significantly lower compared to the value of the balancing resistor in the conventional techniques, so loss can be made smaller and a relatively small-sized resistor like a chip resistor can be used. In contrast, in the conventional techniques, the balancing resistor had a relative large value, like "3 series of 5.6 kΩ (10 W)", for example, so using a cement resistor whose dimensions are large has been predominant.

(4) Operation of Voltage Smoothing Circuit

Next, the operation of the voltage smoothing circuit 14 will be described using FIGS. 3 and 4.

First, the same capacitors are used for the smoothing capacitors C1 and C2, on ideally there should be substantially no variations between the internal resistors R1a and R2a or any variations should be small (R1a≈R2a), and thus the end-to-end voltage V1 of the first smoothing capacitor C1 and the end-to-end voltage V2 of the second smoothing capacitor C2 should be in a state in which they become equal to or less than the rated voltages Vrt1 and Vrt2 of the smoothing capacitors C1 and C2, respectively, and become substantially equal. In this ideal state, the end-to-end voltage V2 of the second smoothing capacitor C2—that is, the inter-terminal voltage of the Zener diode RZ4—becomes lower than the Zener voltage Vr4 (V2<Vr4) and current does not flow to the current path I4. In this ideal state, as shown in FIG. 3, current flows from the power supply portion 13 via the power supply line L1 and branches to the internal resistor R1a side of the first smoothing capacitor C1 and the current path I3 side, the branch currents merge at the point-of-connection s1, and thereafter the current flows via the internal resistor R2a of the second smoothing capacitor C2 to the GND line L2. In this case, the first and second smoothing capacitors C1 and C2 take a state where a balance between their end-to-end voltages is maintained.

However, if there are variations between the internal resistor R1a of the first smoothing capacitor C1 and the internal resistor R2a of the second smoothing capacitor C2, the balance between the end-to-end voltages V1 and V2 of the smoothing capacitors C1 and C2 becomes disrupted and a magnitude relation arises between the end-to-end voltages V1 and V2. In particular, depending on the values of the end-to-end voltages V1 and V2, there is also the concern that they will exceed the rated voltages Vrt1 and Vrt2 of the smoothing capacitors C1 and C2, so in the present embodiment, considering such variations between the internal resistors R1a and R2a, the Zener voltage Vr4 and the value of the balancing resistor R3 are decided in such a way that the end-to-end voltages V1 and V2 never exceed the rated voltages Vrt1 and Vrt2 of the smoothing capacitors C1 and C2.

If the end-to-end voltage V2 of the second smoothing capacitor C2—that is, the inter-terminal voltage of the Zener diode RZ4—is equal to or greater than the Zener voltage Vr4, the Zener diode RZ4 operates as shown in FIG. 4. When this happens, the end-to-end voltage V2 is clipped to a constant voltage—that is, the Zener voltage Vr4. As indicated by the bold arrow in FIG. 4, part of the sum of the currents that have flowed on the internal resistor R1a of the first smoothing capacitor C1 and the balancing resistor R3 flows on the current path I4. Between the current path I4 and the second smoothing capacitor C2 side, impedance is lower on the current path I4 side, so much of the current that has flowed on the internal resistor R1a of the first smoothing capacitor C1 and the balancing resistor R3 flows through the current path I4 side. At this time, the Zener voltage Vr4 is decided in such a way as to become equal to or less than the rated voltage Vrt2 of the second smoothing capacitor C2, so a voltage equal to or greater than the rated voltage Vrt2 can be prevented from being applied to the second smoothing capacitor C2. Further, the balancing resistor R3 is decided in such a way that the end-to-end voltages V1 and V2 become equal to or less than the rated voltages Vrt1 and Vrt2 of the smoothing capacitors C1 and C2, so, for example, even if the voltage Vdc rises in a state where the end-to-end voltage V2 has been clipped to the Zener voltage Vr4 and the end-to-end voltage V1 rises, the end-to-end voltage V1 does not exceed the rated voltage Vrt1 of the first smoothing capacitor C1.

(5) Characteristics (A)

In the voltage smoothing circuit 14 pertaining to the present embodiment, when a voltage equal to or greater than the Zener voltage Vr4 that is a second predetermined voltage is applied to the Zener diode RZ4 that is a second conduction regulating portion, currents flow from the power supply portion 13 to the internal resistor a of the first smoothing capacitor C1 and the first balancing resistor R3. The currents thereafter flow mainly on the current path I4 (that is, the Zener diode RZ4) whose impedance is lower than that on the internal resistor R2a of the second smoothing capacitor C2. Consequently, the end-to-end voltage V2 of the second smoothing capacitor C2 can be lowered with a simple configuration regardless of variations between the internal resistors R1a and R2a of the smoothing capacitors C1 and C2, and a voltage equal to or greater than the rated voltage Vrt2 can be prevented from being applied to the second smoothing capacitor C2.

(B)

In particular, when a voltage equal hour greater than the Zener voltage Vr4 is applied to the Zener diode RZ4, the Zener diode RZ4 operates. Current flows in the Zener diode RZ4 in a direction heading from the point-of-connection s1 to the GND line L2, and the end-to-end voltage V2 of the second smoothing capacitor C2 is clipped to the Zener voltage Vr4. The Zener voltage Vr4 is lower than the rated voltage Vrt2 of the second smoothing capacitor C2, so the end-to-end voltage V2 of the second smoothing capacitor C2 connected in parallel to the Zener diode RZ4 is clipped to the Zener voltage Vr4 that is lower than the rated voltage Vrt2 of the second smoothing capacitor C2. Consequently, with a simple configuration a voltage equal to or greater than the rated voltage Vrt2 can be reliably prevented from being applied to the second smoothing capacitor C2 to which the Zener diode RZ4 is connected in parallel.

(C)

Incidentally, as described above, when the voltage Vdc from the power supply portion 13 rises in a state where the end-to-end voltage V2 of the second smoothing capacitor C2 is being clipped to the Zener voltage Vr4, in terms of the circuit configuration there is the concern that the end-to-end voltage V1 of the first smoothing capacitor C1 will rise and end up exceeding the rated voltage Vrt1 of the first smoothing capacitor C1.

However, in this voltage smoothing circuit 14, the resistance value of the balancing resistor R3 is decided in such a way that the end-to-end voltage V1 of the first smoothing capacitor C1 becomes lower than the rated voltage Vrt1 of that capacitor C1 (V1<Vrt1) and the end-to-end voltage V2 of the second smoothing capacitor C2 becomes lower than the rated voltage Vrt2 of that capacitor C2 (V2<Vrt2). Additionally, the Zener voltage Vr4 is substantially the same as the end-to-end voltage V2 of the second smoothing capacitor C2. Consequently, even if the end-to-end voltage V1 rises, the end-to-end voltage V1 does not exceed the rate age Vrt1 of the first smoothing capacitor C1.

(D)

Further, according to the voltage smoothing circuit 14 pertaining to the present embodiment, the amount of current flowing to the balancing resistor R3 becomes larger than the amount of current flowing to the internal resistor R1a of the first smoothing capacitor C1, so the amount of current flowing to the first smoothing capacitor C1 can be controlled.

(6) Modifications (a)

Figure 5:
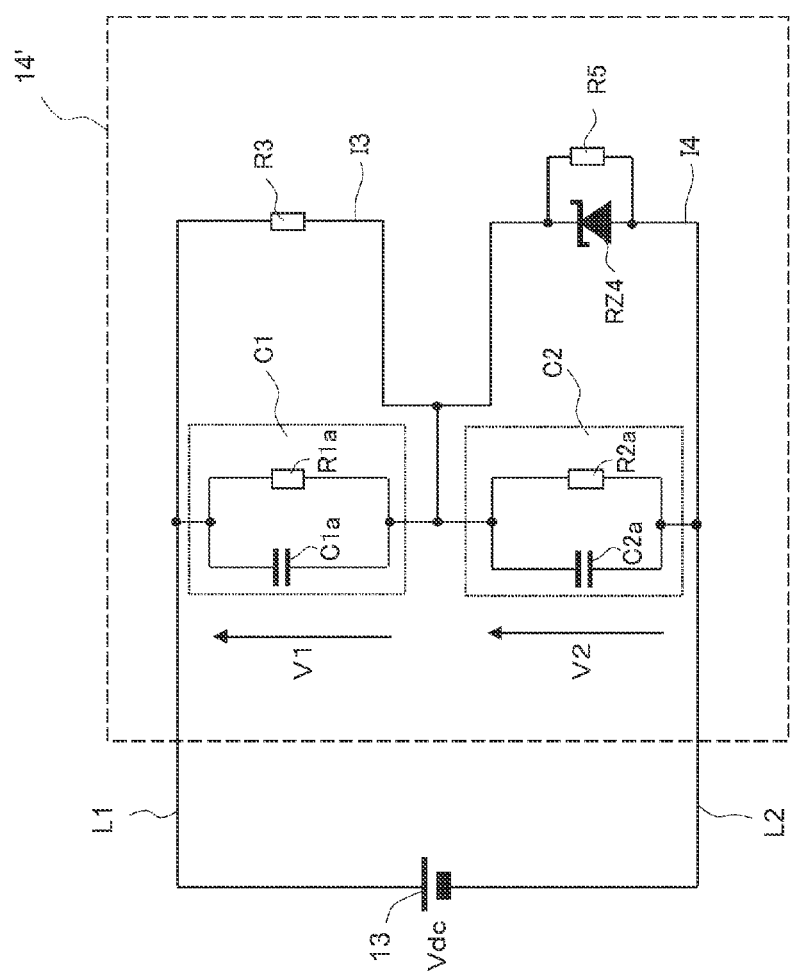
FIG. 5 is a circuit diagram of a voltage smoothing circuit pertaining to modification (a) of the first embodiment and shows a case where an auxiliary resistor is connected in parallel to the Zener diode.

In the present embodiment, a case where the voltage smoothing circuit 14 has the configuration shown in FIGS. 2 to 4 has been described. However, the voltage smoothing circuit 14 may also have the configuration shown in FIG. 5. A voltage smoothing circuit 14' in FIG. 5 is further equipped with an auxiliary resistor R5 (which corresponds to a first auxiliary resistor) in addition to the configuration of the voltage smoothing circuit 14 already described. The auxiliary resistor R5 is connected in parallel to both ends of the Zener diode RZ4.

According to the voltage smoothing circuit 14' in FIG. 5, when the end-to-end voltage V2 of the second smoothing capacitor C2 becomes equal to or greater than the Zener voltage Vr4 (V2≥Vr4), the current flowing on the current path I4 branches and flows to the Zener diode RZ4 and the auxiliary resistor R5. Because of this, the amount of current flowing to the Zener diode RZ4 can be reduced, so the operating voltage and the rated power of the Zener diode RZ4 can be set low, and a diode whose rated current is relatively small can be used for the Zener diode RZ4. Consequently, costs pertaining to the voltage smoothing circuit 14' can be reduced (in particular, the cost of the Zener diode RZ4 can be cut).

Further, the auxiliary resistor R5 can also function as a discharge circuit of the first smoothing capacitor C1 and the second smoothing capacitor C2 at the time of power shutdown of the motor driver 1. Consequently, it is not necessary to separately dispose a discharge circuit of the first smoothing capacitor C1 and the second smoothing capacitor C2.

Figure 6:
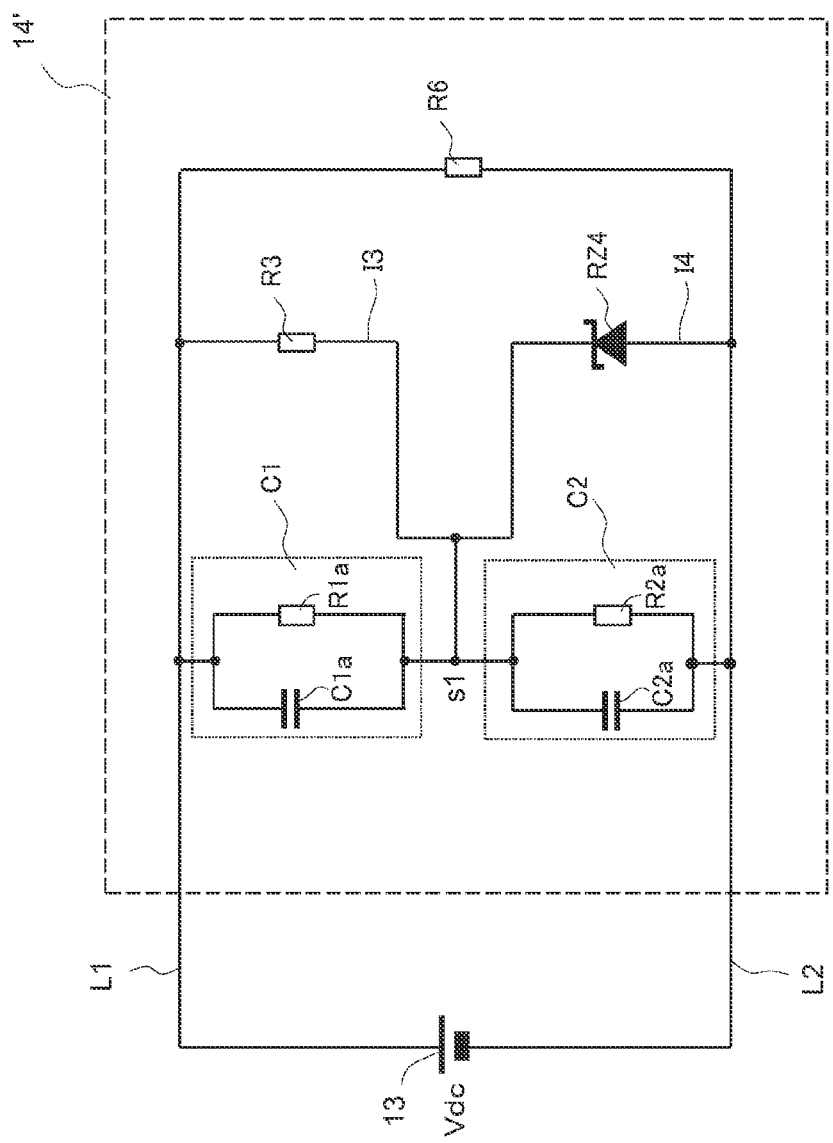
FIG. 6 is a circuit diagram of the voltage smoothing circuit pertaining to modification (a) of the first embodiment and shows a case where an auxiliary resistor is connected in parallel to first and second smoothing capacitors.

Further, the auxiliary resistor is not limited to FIG. 5 and may also be disposed like in FIG. 6 (which corresponds to a second auxiliary resistor). An auxiliary resistor R6 pertaining to FIG. 6 is connected in parallel to the first and second smoothing capacitors C1 and C2 connected in series to each other. In this configuration also, the same effects as FIG. 5 can be provided.

(b)

Figure 7:
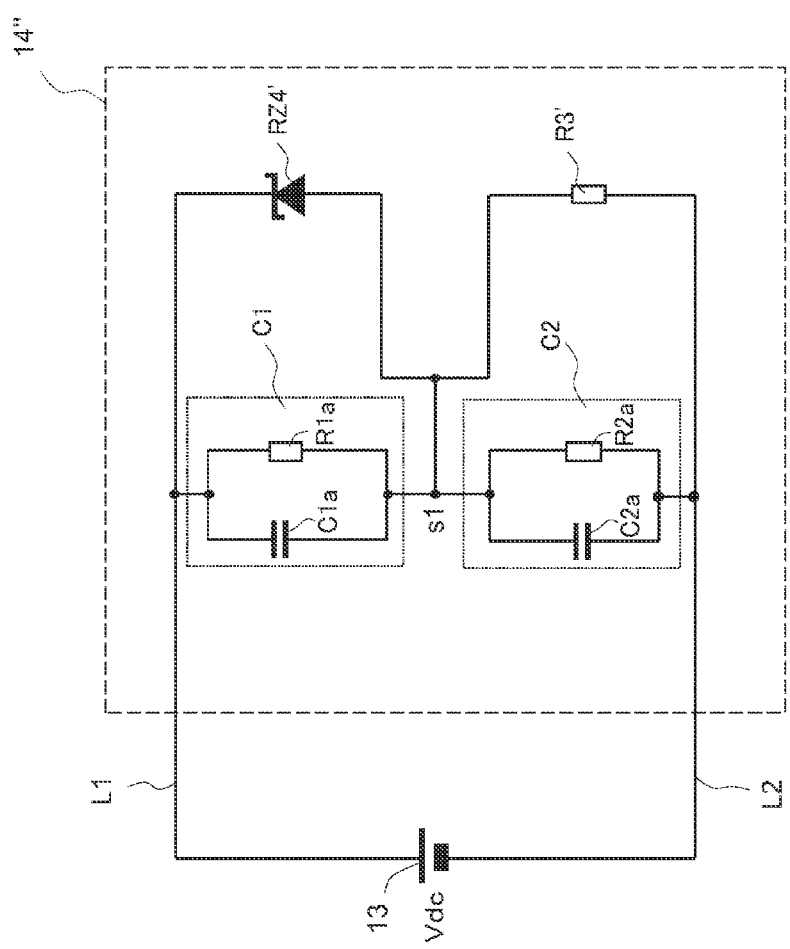
FIG. 7 is a circuit diagram of a voltage smoothing circuit pertaining to modification (b) of the first embodiment and shows a case where the positions of a Zener diode and a balancing resistor are the opposite of the positions shown in FIG. 2.

In the present embodiment, a case where, as shown in FIG. 2 to FIG. 4, the balancing resistor R3 is disposed on the power supply line L1 side and the Zener diode RZ4 is disposed on the GND line L2 side with respect to the point-of-connection s1 between the first and second smoothing capacitors C1 and C2 has been described. However, the positions where the balancing resistor R3 and the Zener diode RZ4 are disposed are not limited to FIGS. 2 to 4 and may also, as shown in FIG. 7, be mutually opposite with respect to the point-of-connection s1. In a voltage smoothing circuit 14" in FIG. 7, a Zener diode RZ4' is disposed on the power supply line L1 side and a balancing resistor R3' is disposed on the GND line L2 side with respect to the point-of-connection s1 between the first and second smoothing capacitors C1 and C2.

That is, it suffices for the Zener diode to be disposed in such a way as to become in parallel with either one of the smoothing capacitors C1 and C2 and for the balancing resistor to be disposed in such a way as to become in parallel with the other of the smoothing capacitors C1 and C2.

Further, in this case also, an auxiliary resistor (not shown in the drawings) may also be disposed in parallel with the Zener diode RZ4', or an auxiliary resistor (not shown in the drawings) may also be disposed in parallel with the first and second smoothing capacitors connected in series to each other.

Second Embodiment

In the first embodiment, a case where the resistance value of the balancing resistor R3 is decided as described in "(3) Method of Deciding Resistance Value of Balancing Resistor and Zener Voltage" was described. In the present embodiment, a case where the resistance value of the balancing resistor R3 is decided by a method differing from the above deciding method will be described.

(1) Configuration of Voltage Smoothing Circuit

Figure 8:
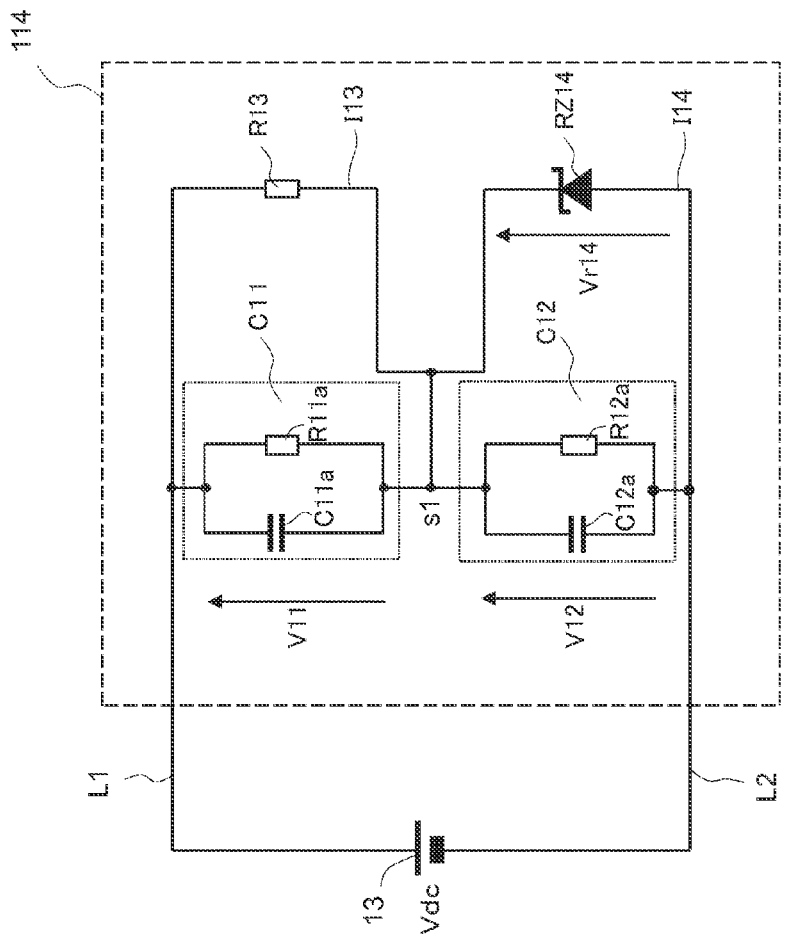
FIG. 8 is a circuit diagram of a voltage smoothing circuit pertaining to a second embodiment.

FIG. 8 is a circuit diagram of a voltage smoothing circuit 114 pertaining to the present embodiment. The configuration of the voltage smoothing circuit 114 is the same as that of the voltage smoothing circuit 14 of the above-described first embodiment except that the method of deciding the resistance value of the balancing resistor R3 differs. In the present embodiment, configural elements other than the configural elements configuring the voltage smoothing circuit 114 are the same as those in the first embodiment, so reference signs that are the same as those in the first embodiment will be given to configural elements (specifically, the power supply portion 13) other than the configural elements of the voltage smoothing circuit 114.

That is, the voltage smoothing circuit 114 is equipped with a first smoothing capacitor C11, a second smoothing capacitor C12, a balancing resistor R13 (which corresponds to a first balancing resistor), and a Zener diode RZ14 (which corresponds to a second conduction regulating portion). The first smoothing capacitor C11 and the second smoothing capacitor C12 are connected in series to each other and are connected in parallel to the power supply portion 13. The first smoothing capacitor C11 and the second smoothing capacitor C12 are respectively configured by capacitance elements C11a and C12a and internal resistors R11a and R12a. The balancing resistor R13 is connected on a current path I13 in parallel with the first smoothing capacitor. The Zener diode RZ14 is connected on a current path I14 in parallel with the second smoothing capacitor C12. The Zener diode RZ14 conducts current in one direction on the current path I14 in a case where a voltage equal to or greater than a Zener voltage Vr14 (which corresponds to a second predetermined voltage) that is lower than a rated voltage Vrt12 of the second smoothing capacitor C12 has been applied and maintains its inter-terminal voltage at the Zener voltage Vr14.

(2) Method of Deciding Resistance Value of Balancing Resistor

In the method of deciding the resistance value of the balancing resistor R3 pertaining to the first embodiment, it was assumed that a voltage equal to or greater than the Zener voltage Vr4 is applied to the first smoothing capacitor C1, the Zener diode RZ4 operates, and current flows in one direction on the current path I4. However, due to factors such as the difference between the resistance values of the internal resistors R1a and R2a of the smoothing capacitors C1 and C2 being larger than a predetermined difference due to variations between those internal resistors R1a and R2a or the voltage Vdc from the power supply portion 13 being low, depending on the case there is the concern that a voltage equal to or greater than the Zener voltage Vr4 will not be applied to the Zener diode RZ4. The Zener diode RZ4 not operating means that a voltage equal to or greater than the rated voltage Vrt2 is not applied to the second smoothing capacitor C2, and there is no problem regarding the second smoothing capacitor C2. However, the potential for the end-to-end voltage V1 of the first smoothing capacitor C1 to end up becoming equal to or greater than the rated voltage Vrt1 cannot be denied.

Therefore, the balancing resistor R13 pertaining to the present embodiment is decided to be a resistance value that is smaller than the value of the internal resistor R11a of the first smoothing capacitor C11 and is decided in such a way that an end-to-end voltage V11 of the first smoothing capacitor C11 becomes equal to or less than an end-to-end voltage V12 of the second smoothing capacitor C12 (V11≤V12) and is decided in such a way as to satisfy a condition where the end-to-end voltage V12 of the second smoothing capacitor C12 is lower than the rated voltage Vrt12 of the second smoothing capacitor C12 (V12<Vrt12). That is, the balancing resistor R13 pertaining to the present embodiment is decided in such a way as to satisfy relative conditions of the end-to-end voltage V11 of the first smoothing capacitor C11 and the end-to-end voltage V12 of the second smoothing capacitor C12.

This will be specifically described below. If the Zener diode RZ14 does not operate, in terms of the circuit configuration of the voltage smoothing circuit 114 the end-to-end voltages V11 and V12 of the smoothing capacitors C11 and C12 become values obtained by dividing the voltage Vdc supplied from the power supply portion 13 by the combined resistance value of the balancing resistor R13 and the internal resistor R11a of the first smoothing capacitor C11 (that is, the combined resistance value of the resistors R13 and R11a connected in parallel) and by the resistance value of the internal resistor R12a of the second smoothing capacitor C12 (see the following equations (4) and (5)).

<Equation 4>

$$V11 = \frac{\frac{R11a \times R13}{R11a + R13}}{\frac{R11a \times R13}{R11a + R13} + R12a} \times Vdc \quad (4)$$

<Equation 5>

$$V12 = \frac{R12a}{\frac{R11a \times R13}{R11a + R13} + R12a} \times Vdc \quad (5)$$

In the above equations (4) and (5), reference signs are used as is for the resistance values of the resistors R11a, R12a, and R13.

In this case also, the Zener voltage Vr14 of the Zener diode RZ14 is decided to be a value that is smaller than the rated voltage Vrt12 of the second smoothing capacitor C12. Consequently, the end-to-end voltage V12 of the second smoothing capacitor C12 to which the Zener diode RZ14 is connected in parallel is protected by the Zener diode RZ14. That is, in the present embodiment, a voltage equal to or greater than the Zener voltage Vr14 is not applied to the Zener diode RZ14 and the Zener diode RZ14 does not operate, so the end-to-end voltage V12 of the second smoothing capacitor C12 always becomes equal to or less than the Zener voltage Vr14, and a voltage equal to or greater than the rated voltage Vrt12 of the second smoothing capacitor C12 is not applied to that capacitor C12.

Otherwise, the end-to-end voltage V11 of the first smoothing capacitor C11 to which the Zener diode RZ14 is not connected in parallel is represented by a value decided by the division of the voltage Vdc as described above—that is, a value obtained by subtracting the end-to-end voltage V12 of the second smoothing capacitor C12 from the voltage Vdc (V11=Vdc−V12)—so there is the concern that the end-to-end voltage of the first smoothing capacitor C11 will end up exceeding the rated voltage Vrt11 of the capacitor C11 because of the value of the voltage Vdc or the values of the internal resistors R11a and R12a.

In order to prevent this, the balancing resistor R13 is decided in such a way as to satisfy the condition of the following equation (6).

<Equation 6>

$$\frac{R13(\max) \times R11a(\max)}{R13(\max) + R11a(\max)} \leq R12a(\min) \quad (6)$$

In the above equation (6), "R13(max)" represents the maximum value of the resistance value of the balancing resistor R13. "R11a(max)" represents the maximum value of the resistance value of the internal resistor R11a of the first smoothing capacitor C11. "R12a(min)" represents the minimum value of the resistance value of the internal resistor R12a of the second smoothing capacitor C12. In the above equation (6), the reason the minimum value is utilized for the internal resistor R12a of the second smoothing capacitor C12 and maximum values are utilized for the internal resistor R11a of the first smoothing capacitor C11 and the balancing resistor R13 is to ensure that the resistance value of the balancing resistor R13 satisfies the strictest condition in light of the fact that voltage is proportional to resistance value. That is, the larger the resistance values of the internal resistor R11a of the first smoothing capacitor C11 and the balancing resistor R13 in parallel to each other are, the larger the end-to-end voltage V11 of the first smoothing capacitor C11 becomes, and the smaller the resistance value of the internal resistor R11a of the second smoothing capacitor C12 is, the smaller the end-to-end voltage V12 of the second smoothing capacitor C12 becomes. Consequently, a case where the Zener diode RIM does not operate and the end-to-end voltage of the first smoothing capacitor C11 becomes a maximum voltage equal to or greater than the rated voltage Vrt11 of the capacitor C11 is considered to be a case where the resistance values of the internal resistor R11a of the first smoothing capacitor C11 and the balancing resistor R13 become maximum values and the resistance value of the internal resistor R12a of the second smoothing capacitor C12 becomes a minimum value.

By deciding the resistance value of the balancing resistor R13 in such a way as to satisfy the above equation (6), the following equation (7) is always satisfied.

<Equation 7>

$$V11 \leq V12 \leq Vr14 < Vrt12 \qquad (7)$$

That is, the resistance value of the balancing resistor R13 is decided in such a way that the end-to-end voltage of the first smoothing capacitor C11 becomes equal to or less than the end-to-end voltage V12 of the second smoothing capacitor C12 and the Zener voltage Vr14 and in such a way that the end-to-end voltage V12 of the second smoothing capacitor C12 becomes equal to or less than the rated voltage Vrt12 of the second smoothing capacitor C12. Because of this, even if the end-to-end voltage V12 of the second smoothing capacitor C12 does not exceed the Zener voltage Vr14 and the Zener diode RZ14 does not operate, the end-to-end voltage V11 of the first smoothing capacitor C11 always becomes substantially the same as or lower than the end-to-end voltage V12 of the second smoothing capacitor C12. Consequently, the end-to-end voltage V11 of the first smoothing capacitor C11 does not become equal to or greater than the rated voltage Vrt11 of the first smoothing capacitor C11 comprising the same capacitor as the second smoothing capacitor C12.

(3) Characteristics (A)

The voltage smoothing circuit 114 pertaining to the present embodiment has the same configuration as that of the voltage smoothing circuit 14 of the first embodiment, but the resistance value of the balancing resistor R13 is decided in such a way as to satisfy a condition where the end-to-end voltage V11 of the first smoothing capacitor C11 to which the Zener diode RZ14 is not connected in parallel becomes equal to or less than the end-to-end voltage V12 of the second smoothing capacitor C12 to which the Zener diode RZ14 is connected in parallel (V11≤V12) and the end-to-end voltage V12 of the second smoothing capacitor C12 is lower than the rated voltage Vrt12 of that capacitor C12(V12<Vrt12). Because of this, even in a case where the Zener diode RZ14 does not operate due to there being a factor such as a voltage equal to or greater than the Zener voltage Vr14 not being applied to the Zener diode RZ14, the end-to-end voltage V12 of the second smoothing capacitor C12 connected in parallel to the Zener diode RZ14 is always kept equal to or less than the Zener voltage Vr14 that is lower than the rated voltage Vrt12 of the second smoothing capacitor C12. Additionally, the end-to-end voltage V11 of the first smoothing capacitor C11 becomes a voltage obtained by subtracting the end-to-end voltage V12 of the second smoothing capacitor C12 from the voltage Vdc, but that end-to-end voltage is always kept equal to or less than the Zener voltage Vr14 of the Zener diode RZ14.

Consequently, with a simple configuration the concern that voltages equal to or greater than the rated voltages Vrt11 and Vrt12 will be applied to the smoothing capacitors C11 and C12 can be avoided.

In a case where there is no concern that the end-to-end voltages of the first and second smoothing capacitors C11 and C12 will exceed the rated voltages Vrt11 and Vrt12 even considering the range of Vdc and variations between the resistance values of the internal resistors R11a and R12a, the resistance value of the balancing resistor R13 does not have to be decided by the deciding method of the present embodiment. In this case, it suffices for the resistance value of the balancing resistor R13 to be decided by the deciding method of the first embodiment.

(B)

Further, according to the voltage smoothing circuit 114 pertaining to the present embodiment, the balancing resistor R13 has a value that is smaller than the value of the internal resistor R11a of the first smoothing capacitor C11, so the amount of current flowing to the internal resistor R11a of the first smoothing capacitor C11 can be controlled.

(4) Modifications (a)

The method of deciding the resistance value of the balancing resistor R13 described in the present embodiment can be applied also to a configuration of a voltage smoothing circuit where an auxiliary resistor is disposed like in FIGS. 5 and 6 pertaining to the first embodiment.

(b)

Further, in the method of deciding the resistance value of the balancing resistor R13 described in the present embodiment, the positions where the Zener diode RZ14 and the balancing resistor R13 are disposed may also be mutually opposite with respect to the point-of-connection s1 like in FIG. 7 pertaining to the first embodiment. That is, it suffices for the Zener diode RZ14 to be disposed in such a way as to become in parallel with either one of the smoothing capacitors C11 and C12 and for the balancing resistor R13 to be disposed in such a way as to become in parallel with the other of the smoothing capacitors C11 and C12.

Moreover, in this case also, an auxiliary resistor (not shown in the drawings) may also be disposed in parallel with the Zener diode, or an auxiliary resistor (not shown in the drawings) may also be disposed in parallel with the first and second smoothing capacitors C11 and C12 connected in series to each other.

Third Embodiment

In the first and second embodiments, it was described that only the Zener diodes RZ4 and RZ14 are connected on the current paths I4 and I14. However, in the voltage smoothing circuits 14 and 114 pertaining to the first and second embodiments, depending on the amount of current flowing on the Zener diodes RZ4 and RZ14, there is a concern about effects resulting from power loss in the Zener diodes RZ4 and RZ14 ending up exceeding the rating and heat being emitted to other parts near the Zener diodes RZ4 and RZ14. Therefore, a balancing resistor may also be disposed on the current path.

(1) Configuration of Voltage Smoothing Circuit

Figure 9:
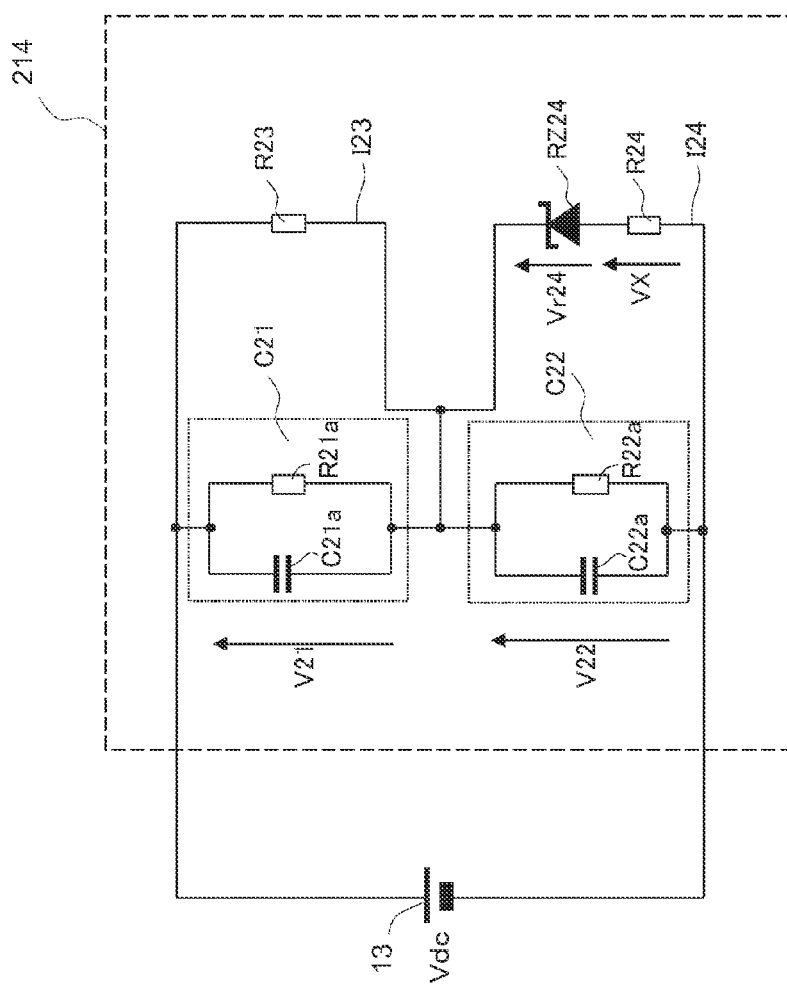
FIG. 9 is a circuit diagram of a voltage smoothing circuit pertaining to a third embodiment.

FIG. 9 is a circuit diagram of a voltage smoothing circuit 214 pertaining to the present embodiment. Configural elements other than the configural elements configuring the voltage smoothing circuit 214 are the same as those in the first embodiment, on reference signs that are the same as those in the first embodiment will be given to configural elements (specifically, the power supply portion 13) other than the configural elements of the voltage smoothing circuit 214. The voltage smoothing circuit 214 is further equipped with one more balancing resistor in addition to the configurations of the voltage smoothing circuits 14 and 114 pertaining to the first and second embodiments.

That is, the voltage smoothing circuit 214 is equipped with a first smoothing capacitor C21, a second smoothing capacitor C22, a first balancing resistor R23, a Zener diode RZ24 (which corresponds to a second conduction regulating portion), and a second balancing resistor R24. The first smoothing capacitor C21 and the second smoothing capacitor C22 are connected in series to each other and are connected in parallel to the power supply portion 13. The first smoothing capacitor C21 and the second smoothing capacitor C22 are respectively configured by capacitance elements C21a and C22a and internal resistors R21a and R22a. The first balancing resistor R23 is connected on a current path I23 in parallel with the first smoothing capacitor C211. The Zener diode RZ24 is connected on a current path I24 in parallel with the second smoothing capacitor C22. The Zener diode RZ24 conducts current in one direction on the current path I24 in a case where a voltage equal to or greater than a Zener voltage Vr24 (which corresponds to a second predetermined voltage) has been applied and maintains its inter-terminal voltage at the Zener voltage Vr24. The second balancing resistor R24 is connected on the current path I24 in such a way as to become in parallel with the second smoothing capacitor C22 and in series with the Zener diode RZ24. The second balancing resistor R24 is a resistor for deciding a bias point of the Zener diode RZ24, and current flows in one direction to the second balancing resistor R24 when a voltage equal to or greater than the Zener voltage Vr24 is applied between the terminals of the Zener diode RZ24.

(2) Method of Deciding Resistance Values of Balancing Resistors and Zener Voltage A method of deciding the resistance values of the balancing resistors 823 and Z24 and the Zener voltage Vr24 in the voltage smoothing circuit 214 of FIG. 9 in a case where it is supposed that the Zener diode always operates will be described below. Here, in the present embodiment, the resistance value of the first balancing resistor R23 is decided in such a way as to become smaller than that the internal resistor R21a of the first smoothing capacitor C21, and the resistance value of the second balancing resistor R24 is decided in such a way as to become smaller than that of the internal resistor R22a of the second smoothing capacitor C22. Further, the Zener voltage Vr24 is decided in such a way as to become lower than a rated voltage Vrt22 of the second smoothing capacitor C22.

(2-1) Overview

The Zener voltage Vr24, the resistance values of the first balancing resistor R23 and the second balancing resistor R24 are decided by further considering a condition in regard to the second balancing resistor R24 in addition to the condition of the case described in the first embodiment.

Specifically, in terms of the circuit configuration of the voltage smoothing circuit 214, an end-to-end voltage V22 of the second smoothing capacitor C22 is equal to the sum of the inter-terminal voltage of the Zener diode RZ24 and an end-to-end voltage VX of the second balancing resistor R24. Additionally, the voltage Vdc from the power supply portion 13 is equal to the sum of an end-to-end voltage V21 of the first smoothing capacitor C21 and the end-to-end voltage V22 of the second smoothing capacitor C22.

From these relations, the end-to-end voltage V22 of the second smoothing capacitor C22 takes a maximum value in a case where the internal resistor R21a of the first smoothing capacitor C21 and the first balancing resistor R23 are both minimum values and the internal resistor R22a of the second smoothing capacitor C22 is a maximum value. Thus, as a first condition for deciding the Zener voltage Vr24 and the balancing resistors R23 and R24, the maximum value of the end-to-end voltage V22 becoming lower than the rated voltage Vrt22 of the second smoothing capacitor C22 can be given (see the following equation (8)).

<Equation 8>

$$V22(\max) < Vrt22 \qquad (8)$$

"V22(max)" represents the maximum value of the end-to-end voltage V22 of the second smoothing capacitor C22. Additionally, supposing that the Zener diode RZ24 is operating at the maximum value of the end-to-end voltage V22, the following condition can be given (see the following equation (9)).

<Equation 9>

$$V22(\max) = Vr24 + VX \qquad (9)$$

That is, the above equation (9) represents, in contrast to (2) equation of the first embodiment, the Zener voltage Vr24 being equal to or less than the end-to-end voltage V22.

Conversely, the end-to-end voltage V22 of the second smoothing capacitor C22 takes a minimum value in a case where the internal resistor R21a of the first smoothing capacitor C21 and the first balancing resistor R23 are both maximum values and the internal resistor R22a of the second smoothing capacitor C22 is a minimum value. At a time when the end-to-end voltage V22 of the second smoothing capacitor C22 takes a minimum value, the end-to-end voltage V21 of the first smoothing capacitor C21 takes a maximum value. Therefore, as a second condition for deciding the Zener voltage Vr24 and the balancing resistors R23 and R24, the maximum value of the end-to-end voltage V21 of the first smoothing capacitor C21 becoming lower than a rated voltage Vrt21 of the first smoothing capacitor C21 can be given (see the following equation (10)).

<Equation 10>

$$V21(\max) = Vdc(\max) - V22(\min) < Vrt21 \qquad (10)$$

"V21(max)" represents the maximum value of the end-to-end voltage V21 of the first smoothing capacitor C21, and "Vdc(max)" represents the maximum value of the voltage Vdc from the power supply portion 13. "V22(min)" represents the minimum value of the end-to-end voltage V22 attic second smoothing capacitor C22.

Moreover, as a condition of the balancing resistors R23 and R24, the resistance values of the balancing resistors R23 and R24 being respectively smaller than those of the internal resistors R21a and R22a of the smoothing capacitors C21 and C22 can be given. Further, as a condition of the Zener voltage Vr24, the Zener voltage Vr24 being lower than the rated voltage Vrt22 of the second smoothing capacitor C22 can be given.

On the basis of the above equations (8) to (10) and the conditions described above, the voltage value of the Zener voltage Vr24 and the resistance values of the balancing resistors R23 and R24 are decided.

The resistance values of the balancing resistors R23 and R24 that have been decided by the method described above may also be adjusted considering the lower limit value of variations between the internal resistors R21a and R22a of the smoothing capacitors C21 and C22. Further, considering also power loss in the balancing resistors R23 and R24 and the Zener diode RZ24, it is preferred that the resistance values of the balancing resistors R23 and R24 be decided in such a way that that power loss becomes a target power loss amount.

To summarize, the balancing resistors R23 and R24 are decided in such a way as to satisfy a condition where the end-to-end voltage V21 of the first smoothing capacitor C21 becomes lower than the rated voltage Vrt21 of that capacitor C21 (V21<Vrt21) and the end-to-end voltage V22 of the second smoothing capacitor C22 becomes lower than the rated voltage Vrt22 of that capacitor C22 (V22<Vrt22). Because of this, even if the end-to-end voltage V22 of the second smoothing capacitor C22 rises, the value of that end-to-end voltage V22 does not exceed the rated voltage Vrt22 of that capacitor C22. In particular, the end-to-end voltage V22 is kept substantially constant at the sum of the Zener voltage Vr24 and the inter-terminal voltage VX of the second balancing resistor R24 (V22≈Vr24+VX), so a rise in the end-to-end voltage V22 to become equal to or greater than the rated voltage Vrt22 is avoided. Further, although there is the potential for the end-to-end voltage V21 of the first smoothing capacitor C21 to rise due to arise in the voltage Vdc from the power supply portion 13 even while the end-to-end voltage V22 is being kept constant, the value of the first balancing resistor R23 is, as has already been described, decided in such a way as to become smaller than the value of the internal resistor R21a of the first smoothing capacitor C21 and in such a way that the end-to-end voltage V21 of the first smoothing capacitor C21 becomes lower than the rated voltage Vrt21 of that capacitor C21, so a voltage equal to or greater than the rated voltage Vrt21 can be prevented from being applied to the first smoothing capacitor C21.

(2-2) Specific Example

Next, a specific example of the method described above will be described below using FIG. 10 and FIG. 11.

To begin, the voltage Vdc of the power supply portion 13 (below, called the power supply voltage Vdc), the values of the internal resistors R21a and R22a of the smoothing capacitors C21 and C22, the end-to-end voltages V21 and V22 of the smoothing capacitors C21 and C22, and the value of the Zener voltage Vr24 of the Zener diode RZ24 are decided as a precondition before deciding the first and second balancing resistors R23 and R24.

Specifically, it will be supposed that the power supply voltage Vdc is a maximum value in an operating range having the potential to fluctuate. Here, as an example, it will be supposed that the power supply voltage Vdc is 700 V. The resistance values of the internal resistors R21a and R22a of the smoothing capacitors C21 and C22 are known values that have been decided from types and capacitance values of capacitors that are actually used. For that reason, it will be supposed that the resistance values of the internal resistors R21a and R22a are maximum values or minimum values of a range resulting from variations between capacitors that are actually used. Here, as an example, it will be supposed that the internal resistors R21a and R22a can take resistance values in the range of 400 kΩ to 1000 kΩ, from variations between the capacitors.

Further, the end-to-end voltages V21 and V22 of the smoothing capacitors C21 and C22 are, here, as a guide, hypothetically decided in such a way as to become equal to or less than "Vdc/2±X %" on the basis of the power supply voltage Vdc. In particular, even if the end-to-end voltages V21 and V22 take the maximum value of "Vdc/2+X %", this maximum value is decided in such a way as to become equal to or less than the rated voltages Vrt21 and Vrt22 of the smoothing capacitors C21 and C22. Here, "±X %" represents the operating range of the end-to-end voltages V21 and V22 and is appropriately decided by desktop calculation, simulation, experiment, or the like depending on the characteristics and so forth of the power supply portion 13, for example. Specifically, in a case supposing that the internal resistor R21a of the first smoothing capacitor C21 is the maximum value "1000 kΩ" and the internal resistor R22a of the second smoothing capacitor C22 is the minimum value "400 kΩ", the end-to-end voltage V21 of the first smoothing capacitor C21 that is proportional to the value of the internal resistor R21a becomes higher and the end-to-end voltage V22 of the second smoothing capacitor C22 that is proportional to the value of the internal resistor R22a becomes lower. In this case, as an example, supposing that the rated voltages of the smoothing capacitors C21 and C22 are 450 V the end-to-end voltage V21 is decided as "380 V" and the end-to-end voltage V22 is decided as "320 V". Conversely, in a case supposing that the internal resistor R21a of the first smoothing capacitor C21 is the minimum value "400 kΩ" and the internal resistor R22a of the second smoothing capacitor C22 is the maximum value "1000 kΩ", the end-to-end voltage V21 of the first smoothing capacitor C21 that is proportional to the value of the internal resistor R21a becomes lower and the end-to-end voltage V22 of the second smoothing capacitor C22 that is proportional to the value of the internal resistor R22a becomes higher. In this case, as an example, supposing that the rated voltages of the smoothing capacitors C21 and C22 are 450 V, the end-to-end voltage V21 is decided as "320 V" and the end-to-end voltage V22 is decided as "380 V".

Further, the Zener voltage Vr24 of the Zener diode RZ24 is decided as a value that is about half the power supply voltage Vdc. For example, since the power supply voltage Vdc is 700 V, the Zener voltage Vr24 can be decided as about 350 V. However, in the marketplace, it is not always the case that a Zener diode whose Zener voltage is 350 V is commercially available. For that reason, in a case where a Zener diode whose Zener voltage is 350 V is not commercially available, it is best for a Zener diode whose Zener voltage is a value close to 350 V to be used. Here, as an example, a case where a Zener diode whose Zener voltage is 300 V is used because there was not a Zener diode whose Zener voltage is 350 V will be taken as an example.

—Case where Internal Resistor R21a is Maximum Value and Internal Resistor R22a is Minimum Value—

Figure 10:
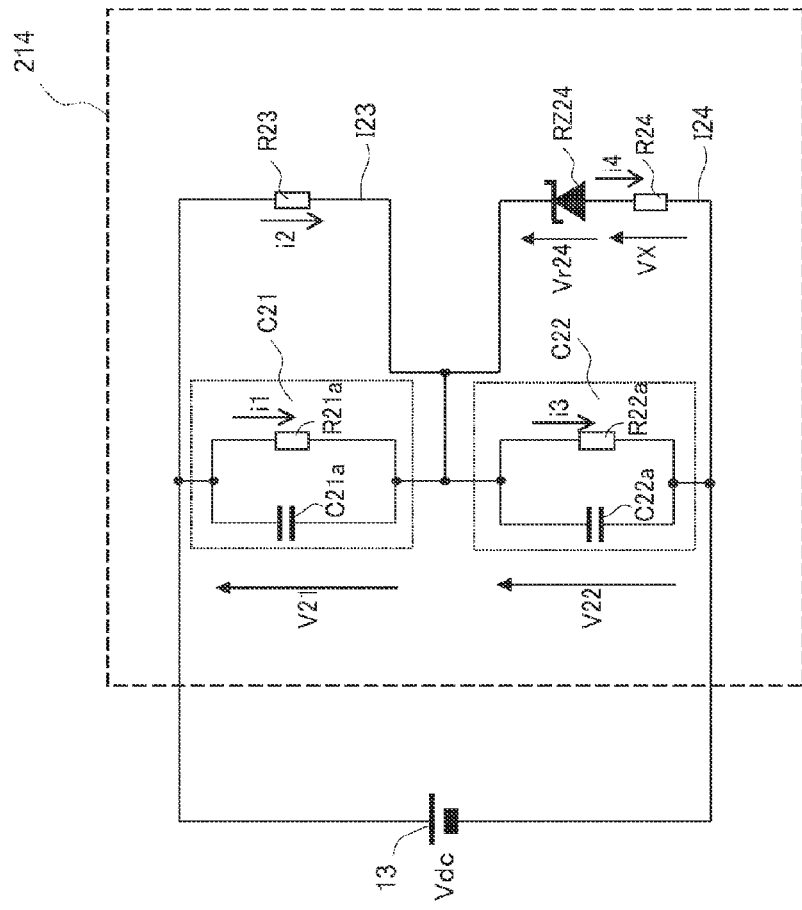
FIG. 10 is a circuit diagram of the voltage smoothing circuit pertaining to the third embodiment and shows flows of currents used when deciding the resistance values of balancing resistors.

In a case supposing that the internal resistor R21a of the first smoothing capacitor C21 is the maximum value "1000 kΩ" and the internal resistor R22a of the second smoothing capacitor C22 is the minimum value "400 kΩ", the following equation (11) is true assuming that i1 represents the current flowing through the internal resistor R21a and i2 represents the current flowing through the first balancing resistor R23 (FIG. 10).

<Equation 11>

$$i1 \times 1000 = i2 \times R23 = V21 = 380 \quad (11)$$

In the above equation (11), the reference sign is used as is for the resistance value of the first balancing resistor R23.

Because the end-to-end voltage V22 of the second smoothing capacitor C22 is lower than the Zener voltage Vr24 (V22>Vr24, and specifically 320 V>300 V), the next equations (12) and (13) are true. In the next equations (12) and (13), i3 represents the current flowing through the internal resistor R22a, i4 represents the current flowing through the second balancing resistor R24, and the reference sign is used as is thr the resistance value of the internal resistor R22a.

<Equation 12>

$$i3 \times 400 = i4 \times R24 + 300 = V22 = 320 \quad (12)$$

<Equation 13>

$$i1 + i2 = i3 + i4 \quad (13)$$

—Case where Internal Resistor R21a is Minimum Value and Internal Resistor R22a, is Maximum Value—

Figure 11:
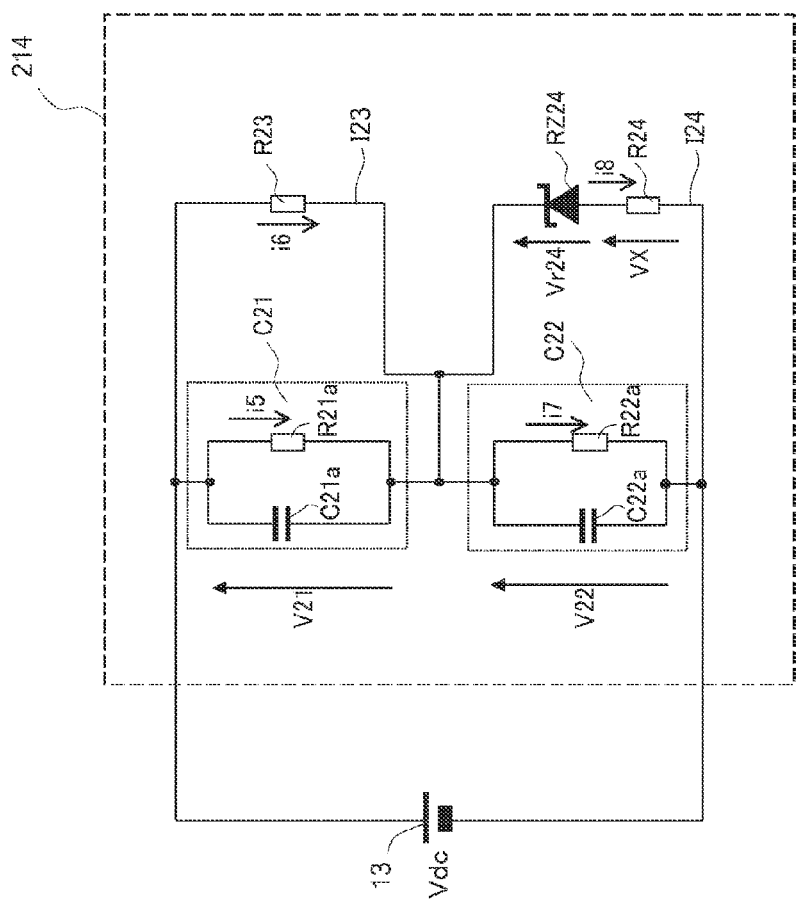
FIG. 11 is a circuit diagram of the voltage smoothing circuit pertaining to the third embodiment and shows flows of currents used when deciding the resistance values of the balancing resistors.

In a case supposing that the internal resistor R21a of the first smoothing capacitor C21 is the minimum value "400 kΩ" and the internal resistor R22a of the second smoothing capacitor C22 is the maximum value "1000 kΩ", the next equations (14) to (16) are true assuming that i5 represents the current flowing through the internal resistor 21a, i6 represents the current flowing through the first balancing resistor R23, i7 represents the current flowing through the internal resistor R22a, and i8 represents the current flowing through the second balancing resistor R24 (FIG. 11).

<Equation 14>

$$i5 \times 400 = i6 \times R23 = V21 = 320 \quad (14)$$

<Equation 15>

$$i7 \times 1000 = i8 \times R24 + 300 = V22 = 380 \quad (15)$$

<Equation 16>

$$i5 + i6 = i7 + i8 \quad (16)$$

By calculating the above equations (11) to (16), the first balancing resistor R23 can be decided as "571 kΩ" and the second balancing resistor R24 can be decided as "81.6 kΩ". In this way, the resistance values of the balancing resistors R23 and R24 pertaining to the present embodiment are respectively equal to or less than those of the internal resistors R21a and R22a.

(3) Operation of Voltage Smoothing Circuit

The balancing resistors R23 and R24 and the Zener voltage Vr24 are decided by the method described above. It will be supposed that, in this state, the end-to-end voltage V22 of the second smoothing capacitor C22 rises due to variations between the internal resistor R21a of the first smoothing capacitor C21 and the internal resistor R22a of the second smoothing capacitor C22.

Even if the end-to-end voltage V22 rises, the Zener diode ZR24 does not operate if the inter-terminal voltage of the Zener diode RZ24 is lower than the Zener voltage Vr24. For that reason, the current that has flowed from the power supply portion 13 and branched to the internal resistor R21a side of the first smoothing capacitor C21 and the current path I23 does not flow to the current path I24 but all flows into the internal resistor R22a of the second smoothing capacitor C22. From the minimum value (e.g., 420 kΩ) of variations in the internal resistor R21a of the first smoothing capacitor C21 also, the current flowing to the current path I23 is larger than the current flowing through that internal resistor R21a because that internal resistor B214 is larger than the first balancing resistor R23.

However, if the inter-terminal voltage of the Zener diode RZ24 becomes equal to or greater than the Zener voltage Vr24, the Zener diode RZ24 operates and the inter-terminal voltage of the Zener diode RZ24 is clipped to the Zener voltage Vr24. The current that has flowed from the power supply portion 13 and branched to the internal resistor R21a side of the first smoothing capacitor C21 and the current path I23 is divided and flows to the current path I24 and the internal resistor R22a of the second smoothing capacitor C22. From the minimum value (e.g., 420 kΩ) of variations in the internal resistor R22a of the second smoothing capacitor C22 also, the current flowing to the current path I24 is larger than the current flowing through that internal resistor R22a because that internal resistor R22 is larger than the second balancing resistor R24. Moreover, the end-to-end voltage V22 of the second smoothing capacitor C22 is equal to the sum of the inter-terminal voltage of the Zener diode RZ24 that has been clipped (that is, the Zener voltage Vr24) and the end-to-end voltage VX of the second balancing resistor R24, so the larger the difference (that is, the voltage VX) between the end-to-end voltage V22 and the Zener voltage Vr24 becomes, the more the current flows to the current path I24 side. Because of this, the current flowing to the internal resistor R22a of the second smoothing capacitor C22 becomes lesser and the end-to-end voltage V22 drops, so the end-to-end voltage V22 can be kept equal to or less than the rated voltage Vrt22 of the second smoothing capacitor C22.

The first balancing resistor R23 is decided in such a way that the end-to-end voltages V21 and V22 become equal to or less than the rated voltages Vrt21 and Vrt22 of the smoothing capacitors C21 and C22, on even if the end-to-end voltage V21 rises, the end-to-end voltage V21 does not exceed the rated voltage Vrt21 of the first smoothing capacitor C21.

(4) Characteristics (A)

In a case where only the Zener diodes RZ4 and RZ14 are disposed on the current paths I4 and I14 like in the voltage smoothing circuits 14 and 114 pertaining to the first embodiment and the second embodiment, Zener diodes where the values of the Zener voltages Vr4 and Vr14 are desired values are selected from among commercially available Zener diodes and used for the Zener diodes RZ4 and RZ14. However, it is not always the case that Zener diodes where the Zener voltages Vr4 and Vr14 are desired values are commercially available. Depending on the values of the Zener voltages Vr4 and Vr14, sometimes cases arise where the voltages V2 and V12 applied to the second smoothing capacitors C2 and C12 connected in parallel to the Zener diodes RZ4 and RZ14 become lower and the voltages V1 and V11 applied to the first smoothing capacitors C1 and C11 become higher or where, conversely, the voltages applied to the second smoothing capacitors C2 and C12 become higher than the desired values. In particular, if only the Zener diodes RZ4 and RZ14 are disposed on the current paths I4 and I14, there is the concern that the currents flowing to the Zener diodes RZ4 and RZ14 will end up becoming larger in a case where the internal resistors R1a, R11a, R2a, and R12a of the smoothing capacitors C1, C11, C2, and C12 take maximum values or minimum values due to variations. In this case, there are the concerns that the amount of heat emitted in the Zener diodes RZ4 and RZ14 will increase or that the end-to-end voltages V2 and V12 cannot be made into optimum values because the end-to-end voltages V2 and V12 of the second smoothing capacitors C2 and C12 are fixed to the Zener voltages Vr4 and Vr14. For this reason, cases arise where the values of the end-to-end voltages V1, V11, V2, and V12 of the smoothing capacitors C1, C11, C2, and C12 greatly differ due to which of maximum values and minimum values the internal resistors R1a, R11a, R2a, and R12a take, the operating range of the voltage from the power supply portion 13 resultantly ends up becoming narrower, and there becomes no other choice but to select capacitors whose rated voltages Vrt1, Vrt11, Vrt2, and Vrt12 are high as the first and second smoothing capacitors C1, C11, C2, and C12.

However, in the voltage smoothing circuit 214 pertaining to the present embodiment, the second balancing resistor R24 is disposed in series with the Zener diode RZ24. For that reason, when a voltage equal to or greater than the Zener voltage Vr24 that is lower than the rated voltage Vrt22 of the second smoothing capacitor C22 is applied to the Zener diode RZ24, current flows also to the second balancing resistor R24. Because of this, adverse effects resulting from power loss in the Zener diode RZ24 ending up exceeding the rating and heat being emitted to other parts near the Zener diode RZ24 can be controlled with a simple configuration.

Further, the end-to-end voltage V22 of the second smoothing capacitor C22 pertaining to the present embodiment is, in terms of the circuit configuration, equal to the sum of the inter-terminal voltage of the Zener diode RZ24 and the end-to-end voltage VX of the second balancing resistor R24. For this reason, the Zener voltage Vr24 can be set while considering the voltage applied to the second balancing resistor R24, and in correspondence thereto the options for the Zener diode expand. Thus, the Zener voltage Vr24 can be freely set such as making the Zener voltage Vr24 of the Zener diode RZ24 lower compared to the Zener voltage in a case where the second balancing resistor R24 is not disposed and it becomes possible to adjust the voltages applied to the first and second smoothing capacitors C21 and C22. Consequently, even if inexpensive capacitors whose rated voltages are low, for example, are used for the first and second smoothing capacitors C21 and C22, this voltage smoothing circuit 214 is applicable also to devices where the operating range of the voltage Vdc from the power supply portion 13 is relatively large. Moreover, by setting the Zener voltage Vr24 to an optimum value, it also becomes possible to make the heat emission amounts of configural parts of the voltage smoothing circuit 214 other than the Zener diode RZ24 smaller and to make the power loss lower.

(B)

Further, in a case where a voltage equal to or greater than the Zener voltage Vr24 is applied to the Zener diode RZ24 and current is flowing on the current path I24, a rise in the end-to-end voltage V22 of the second smoothing capacitor C22 is controlled by the Zener diode RZ24 connected in parallel to the second smoothing capacitor C22. However, if the voltage Vdc from the power supply portion 13 rises in this state, in terms of the circuit configuration there is the concern that the end-to-end voltage V21 of the first smoothing capacitor C21 will rise and end up exceeding the rated voltage Vrt21 of that capacitor C21.

However, in this voltage smoothing circuit 214, the resistance values of the balancing resistors R23 and R24 are decided in such a way that the end-to-end voltage V21 becomes lower than the rated voltage Vrt21 of the first smoothing capacitor C21 (V21<Vrt21) and the end-to-end voltage V22 becomes lower than the rated voltage Vrt22 of the second smoothing capacitor (V22<Vrt22). Additionally, the Zener voltage Vr24 becomes equal to or less than the end-to-end voltage V22 of the second smoothing capacitor C22. Consequently, even if the end-to-end voltage V21 of the first smoothing capacitor C21 rises, the end-to-end voltage V21 does not exceed the rated voltage Vrt21 of the first smoothing capacitor C21.

(C)

Further, according to this voltage smoothing circuit 214, the amounts of current flowing to the balancing resistors R23 and R24 become larger than the amounts of current flowing to the internal resistors R21a and R22a of the smoothing capacitors C21 and C22, on the amounts of current flowing to the first and second smoothing capacitors C21 and C22 can be controlled.

(5) Modifications (a)

Figure 12:
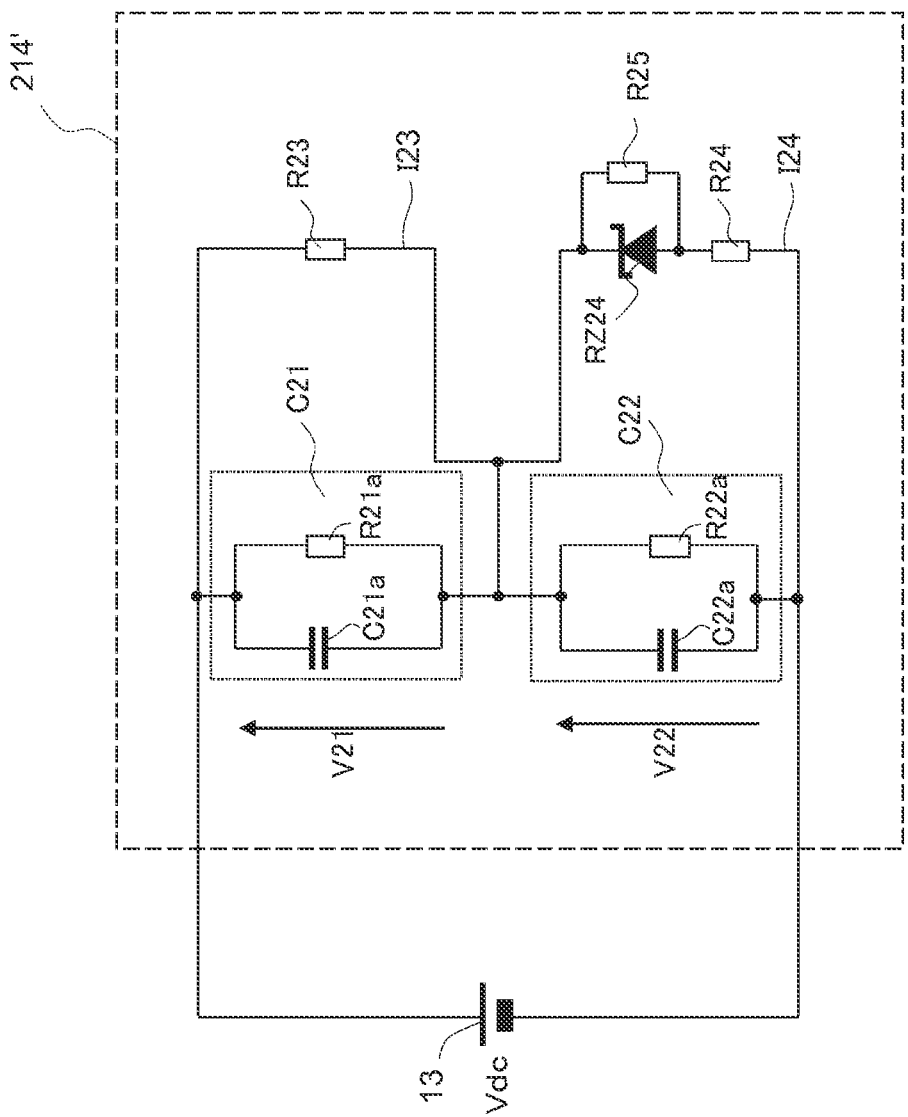
FIG. 12 is a circuit diagram of a voltage smoothing circuit pertaining to modification (a) of the third embodiment and shows a case where an auxiliary resistor is connected in parallel to a Zener diode.

In the voltage smoothing circuit 214 pertaining to the present embodiment also, an auxiliary resistor may also be disposed like in the first and second embodiments. FIG. 12 shows a voltage smoothing circuit 214' where an auxiliary resistor R25 is connected in parallel to both ends of the Zener diode RZ24, and FIG. 13 shows a voltage smoothing circuit 214' where an auxiliary resistor R26 is connected in parallel to the Zener diode RZ24 and the second balancing resistor R24 (both of the auxiliary resistors R25 and R26 correspond to a first auxiliary resistor).

Figure 13:
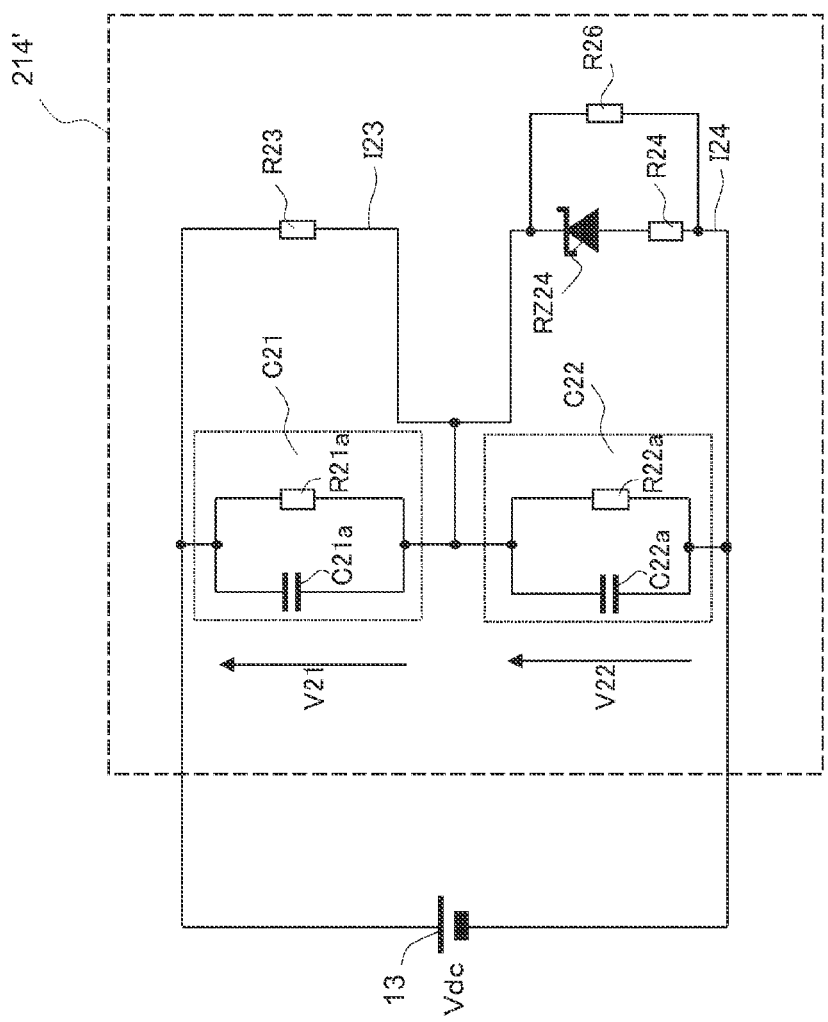
FIG. 13 is a circuit diagram of the voltage smoothing circuit pertaining to modification (a) of the third embodiment and shows a case where an auxiliary resistor is connected in parallel to the Zener diode and a second smoothing capacitor.

In both of the voltage smoothing circuits 214' of FIGS. 12 and 13 also, if the end-to-end voltage V22 of the second smoothing capacitor C22 becomes equal to or greater than the Zener voltage Vr24 (V22≥Vr24), the current flowing on the current path I24 branches and flows to the Zener diode RZ24 side and the auxiliary resistors R25 and R26 side, so the amount of current flowing to the Zener diode RZ24 can be made smaller. For that reason, the operating voltage and the rated power of the Zener diode RZ24 can be set low, and a Zener diode whose rated current is relatively small can be used for the Zener diode RZ24. Consequently, costs pertaining to the voltage smoothing circuits 214' can be reduce particular, the cost of the Zener diode RZ24 can be cut).

Further, the auxiliary resistors R25 and R26 can also function as a discharge circuit of the first smoothing capacitor C21 and the second smoothing capacitor C22 at the time of power shutdown of the motor driver 1. Consequently, it is not necessary to separately dispose a discharge circuit of the first smoothing capacitor C21 and the second smoothing capacitor C22.

Although it is not illustrated, an auxiliary resistor may also, like in FIG. 6 pertaining to the first embodiment, be connected in parallel to the first and second smoothing capacitors C21 and C22 connected in series to each other (second auxiliary resistor).

(b)

Figure 14:
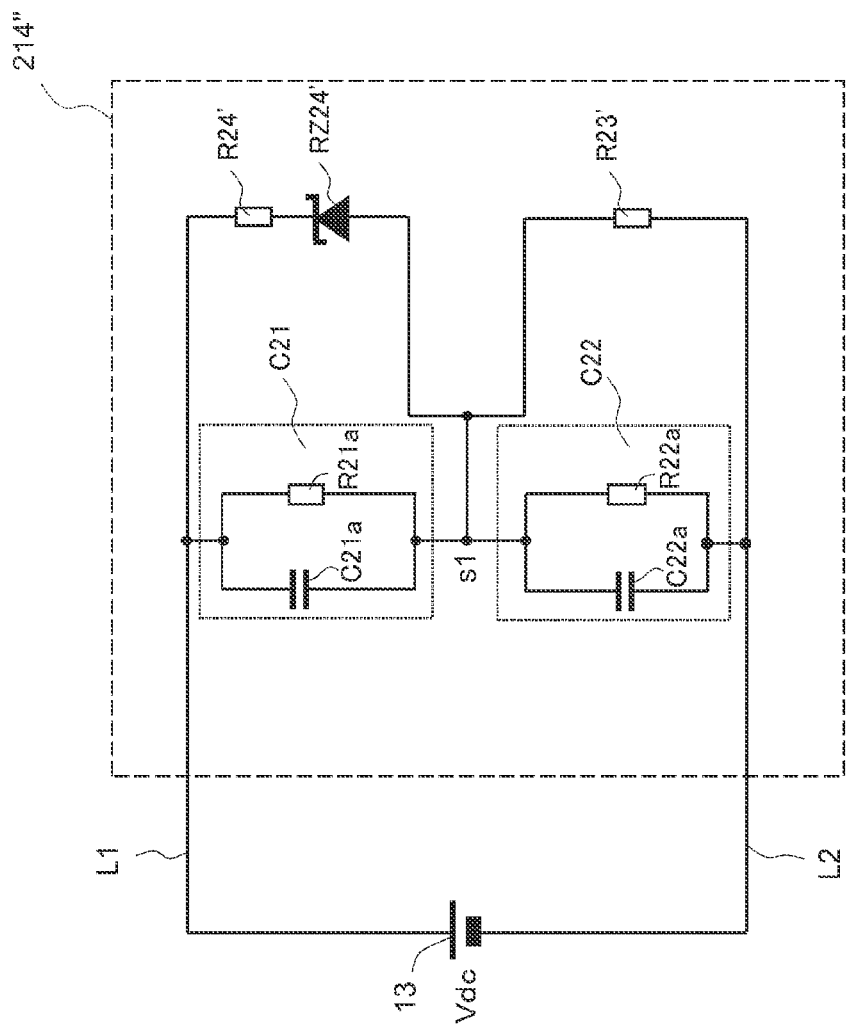
FIG. 14 is a circuit diagram of a voltage smoothing circuit pertaining to modification (b) of the third embodiment and shows a case where the positions of a Zener diode and balancing resistors are the opposite of the positions shown in FIG. 9.

Further, in the voltage smoothing circuit 214 pertaining to the present embodiment also, as shown in FIG. 14, the positions where the balancing resistor and the Zener diode are disposed may also be mutually opposite with respect to the point-of-connection s1. In a voltage smoothing circuit 214" pertaining to FIG. 14, a second balancing resistor R24' and a Zener diode R24' are disposed on the power supply line L1 side and a first balancing resistor R23' is disposed on the GND line L2 side with respect to the point-of-connection s1 between the first and second smoothing capacitors C21 and C22.

That is, it suffices for the Zener diode and the second balancing resistor to be disposed in such a way as to become in parallel with either one of the smoothing capacitors C21 and C22 and for the balancing resistor to be disposed in such a way as to become in parallel with the other of the smoothing capacitors C21 and C22.

Further, in this case also, an auxiliary resistor (not shown in the drawings) may also be disposed in parallel with the Zener diode RZ24', or an auxiliary resistor (not shown in the drawings) may also be disposed in parallel with the first and second smoothing capacitors C21 and C22 connected in series to each other.

Fourth Embodiment

Next, a method of deciding the resistance values of balancing resistors in a case where the voltage smoothing circuit is equipped with two balancing resistors like in the third embodiment and there is also the concern that the Zener diode will not operate like in the second embodiment will be described.

(1) Configuration of Voltage Smoothing Circuit

Figure 15:
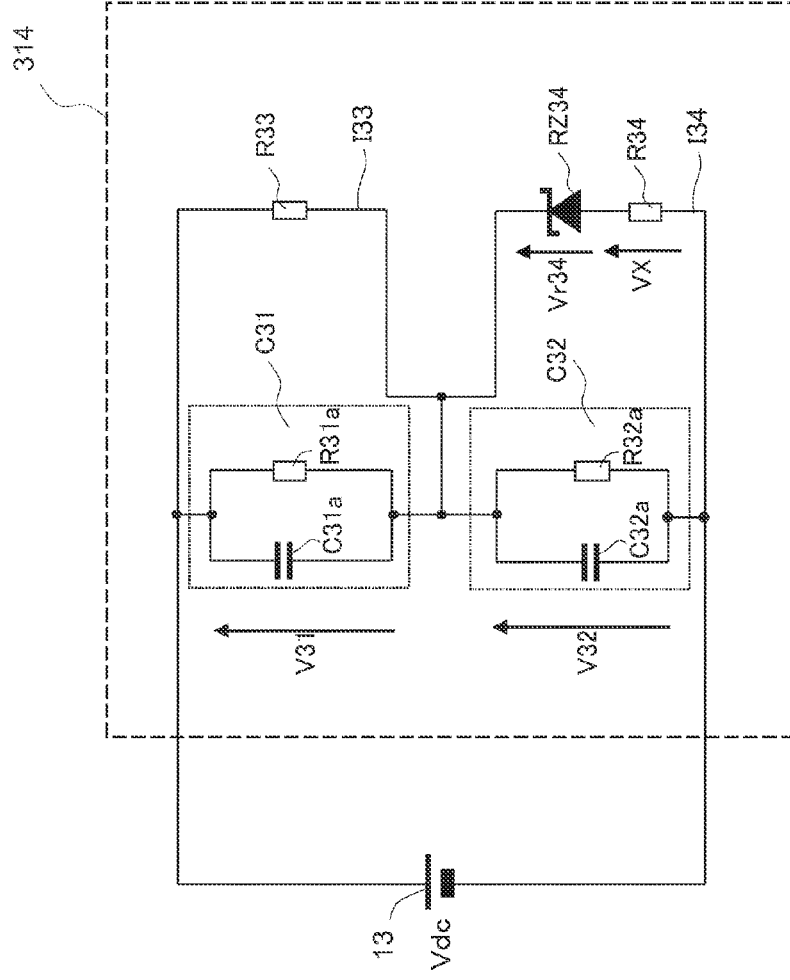
FIG. 15 is a circuit diagram of a voltage smoothing circuit pertaining to a fourth embodiment.

FIG. 15 is a circuit diagram of a voltage smoothing circuit 314 pertaining to the present embodiment. The configuration of the voltage smoothing circuit 314 is the same as that of the voltage smoothing circuit 214 of the third embodiment except that the method of deciding the resistance values of the first and second balancing resistors differs.

That is, the voltage smoothing circuit 314 is equipped with a first smoothing capacitor C31, a second smoothing capacitor C32, a first balancing resistor R33, a second balancing resistor R34, and a Zener diode RZ34 (which corresponds to a second conduction regulating portion). The first smoothing capacitor C31 and the second smoothing capacitor C32 are connected in series to each other and are connected in parallel to the power supply portion 13. The first smoothing capacitor C31 and the second smoothing capacitor C32 are respectively configured by capacitance elements C31a and C32a and internal resistors R31a and R32a. The first balancing resistor R33 is connected on a current path I33 in parallel with the first smoothing capacitor C31. The second balancing resistor R34 and the Zener diode RZ34 are connected in series on a current path I34 in parallel with the second smoothing capacitor C32. The Zener diode RZ34 conducts current in one direction on the current path I34 in a case where a voltage equal to or greater than a Zener voltage Vrt34 (which corresponds to a second predetermined voltage) that is lower than a rated voltage Vrt32 of the second smoothing capacitor C32 has been applied and maintains its inter-terminal voltage at the Zener voltage Vr34.

(2) Method of Deciding Resistance Values of Balancing Resistors and Zener Voltage A method of deciding the balancing resistors R33 and R34 in a case where there is the concern that the Zener diode will not operate will be described below.

In a case where there is the concern that the Zener diode RZ34 will not operate due to factors such as the difference between the resistance values of the internal resistors R31a and R32a, being larger than a predetermined difference due to variations between the smoothing capacitors C31 and C32 or the voltage Vdc from the power supply portion 13 being low, the resistance value of the first balancing resistor R33 can be decided like in the deciding method described in the second embodiment.

That is, in order to avoid the concern that an end-to-end voltage V31 of the first smoothing capacitor C31 will end up exceeding a rated voltage Vrt31 of that capacitor C31 due to the value of the voltage Vdc or the values of the internal resistors R31a and R32a, the first balancing resistor R33 is decided in such a way as to satisfy the condition of the following equation (17).

<Equation 17>

$$\frac{R33(\max) \times R31a(\max)}{R33(\max) + R31a(\max)} \leq R32a(\min) \quad (17)$$

In the above equation (17), "R33(max)" represents the maximum value of the resistance value of the first balancing resistor R33. "R31a(max)" represents the maximum value of the resistance value of the internal resistor R31a of the first smoothing capacitor C31. "R32a(min)" represents the minimum value of the resistance value of the internal resistor R32a of the second smoothing capacitor C32.

The resistance value of the first balancing resistor R33 is decided in such a way as to satisfy the above equation (17) and in such a way that a condition where the resistance value of the first balancing resistor R33 is smaller than that of the internal resistor R31a of the first smoothing capacitor C31 is satisfied, whereby the following equation (18) is satisfied.

<Equation 18>

$$V31 \leq V32 \leq Vr34 < V32 \quad (18)$$

That is, the resistance value of the first balancing resistor R33 is decided in such a way that the end-to-end voltage V31 of the first smoothing capacitor C31 becomes equal to or less than an end-to-end voltage V32 of the second smoothing capacitor C32 and the Zener voltage Vr34 and in such a way that the end-to-end voltage V32 of the second smoothing capacitor C32 becomes equal to or less than the rated voltage Vrt32 of the second smoothing capacitor C32. Because of this, even if the end-to-end voltage V32 of the second smoothing capacitor C32 does not exceed the Zener voltage Vr34 and the Zener diode R234 does not operate, the end-to-end voltage V31 of the first smoothing capacitor C31 always becomes substantially the same as or lower than the end-to-end voltage V32 of the second smoothing capacitor C32. Consequently, the end-to-end voltage V31 of the first smoothing capacitor C31 does not become equal to or greater than the rated voltage Vrt31 of the first smoothing capacitor C31 comprising the same capacitor as the second smoothing capacitor C32.

It suffices for the Zener voltage Vr34 to be decided in such a way as to become equal to or less than the rated voltage Vrt32 of the second smoothing capacitor C32 and for the resistance value of the second balancing resistor R34 to be decided in such a way as to become equal to or less than that of the internal resistor R32a of the second smoothing capacitor C32. This is because as long as the Zener diode RZ34 does not operate, a voltage equal to or greater than the rated voltage Vrt32 of the second smoothing capacitor C32 will not be applied to that capacitor C32. Further, even if the Zener diode RZ34 operates, the end-to-end voltage V32 of the second smoothing capacitor C32 does not exceed the rated voltage Vrt32 of that capacitor C32 due to the Zener diode RZ34.

(3) Operation of Voltage Smoothing Circuit

The balancing resistors R33 and R34 and the Zener voltage Vr34 are decided by the method described above. It will be supposed that, in this state, the end-to-end voltage V32 of the second smoothing capacitor C32 rises due to variations between the internal resistor R31a of the first smoothing capacitor C31 and the internal resistor R32a of the second smoothing capacitor C32.

In this case, the end-to-end voltage V32 of the second smoothing capacitor C32 does not exceed the rated voltage Vrt32 of that capacitor C32 due to the same operation as in (3) of the third embodiment.

Further, the value of the first balancing resistor R33 is decided in such a way that the end-to-end voltage V31 of the first smoothing capacitor C31 always becomes lower than the end-to-end voltage V32 of the second smoothing capacitor C32, so even if the end-to-end voltage V31 rises, the end-to-end voltage V31 does not exceed the rated voltage Vrt31 of the first smoothing capacitor C31.

(4) Effects (A)

In the voltage smoothing circuit 314 pertaining to the present embodiment, the second balancing resistor R34 is disposed in series with the Zener diode RZ34 like in the third embodiment. For that reason, when a voltage equal to or greater than the Zener voltage Vr34 that is lower than the rated voltage Vrt32 of the second smoothing capacitor C32 is applied to the Zener diode RZ34, current flows also to the second balancing resistor R34. Because of this, adverse effects resulting from power loss in the Zener diode RZ34 ending up exceeding the rating and heat being emitted to other parts near the Zener diode RZ34 can be controlled with a simple configuration.

Further, the Zener voltage Vr34 can be set while considering the voltage applied to the second balancing resistor R34, so in correspondence thereto the options for the Zener diode expand. Thus, the Zener voltage Vr34 can be freely set—such as making the Zener voltage Vr34 of the Zener diode RZ34 lower compared to the Zener voltage in a case where the second balancing resistor R34 is not disposed—and it becomes possible to adjust the voltages applied to the first and second smoothing capacitors C31 and C32. Consequently, even if inexpensive capacitors whose rated voltages are low, for example, are used for the first and second smoothing capacitors C31 and C32, this voltage smoothing circuit 314 is applicable also to devices where the operating range of the voltage Vdc from the power supply portion 13 is relatively large. Moreover, by setting the Zener voltage Vr34 to an optimum value, it also becomes possible to make the heat emission amounts of configural parts of the voltage smoothing circuit 314 other than the Zener diode RZ34 smaller and to make the power loss lower.

(B)

In a case where the Zener voltage Vr34 is not applied to the Zener diode RZ34 and the Zener diode RZ34 does not operate due to a factor such as the difference between the internal resistors R31a and R32a of the smoothing capacitors C31 and C32 being large or the voltage Vdc from the power supply portion 13 being low, for example, the end-to-end voltage V32 of the second smoothing capacitor C32 connected in parallel to the Zener diode RZ34 is kept equal or less than the Zener voltage Vr34. However, in terms of the circuit configuration, the end-to-end voltage V31 of the first smoothing capacitor C31 becomes a voltage obtained by subtracting the end-to-end voltage V32 of the second smoothing capacitor C32 from the voltage Vdc from the power supply portion 13, and depending on the case the concern that the end-to-end voltage V31 of the first smoothing capacitor C31 will reach a voltage equal to or greater than the rated voltage Vrt31 of the first smoothing capacitor C31 is also not inconceivable.

However, according to this voltage smoothing circuit 314, the resistance value of the first balancing resistor R33 is decided in such a way that the end-to-end voltage V31 of the first smoothing capacitor C31 becomes lower than the end-to-end voltage V32 of the second smoothing capacitor C32 (V31<V32). For that reason, the end-to-end voltage V31 of the first smoothing capacitor C31 is always kept equal to or less than the Zener voltage Vr34 of the Zener diode RZ34. Consequently, the concern that a voltage equal to or greater than the rated voltage Vrt31 will be applied to the first smoothing capacitor C31 can be avoided.

(C)

Further, according to this voltage smoothing circuit 314, the amounts of current flowing to the balancing resistors R33 and R34 become larger than the amounts of current flowing to the internal resistors R31a and R32a of the smoothing capacitors C31 and C32, so the amounts of current flowing to the first and second smoothing capacitors C31 and C32 can be controlled.

(5) Modifications (a)

In the voltage smoothing circuit 314 pertaining to the present embodiment also, an auxiliary resistor may also be disposed like in FIGS. 12 and 13.

(b)

Further, in the voltage smoothing circuit 314 pertaining to the present embodiment also, the positions where the balancing resistors and the Zener diode are disposed may also be mutually opposite with respect to the point-of-connection s1 like in FIG. 14. Moreover, an auxiliary resistor may also be disposed in parallel with the Zener diode, or an auxiliary resistor may also be disposed in parallel with the first and second smoothing capacitors connected in series to each other.

Fifth Embodiment

In the fourth embodiment, a case where the second balancing resistor R34 is decided in such a way as to become equal to or less than the internal resistor R32a of the second smoothing capacitor C32 was described. Here, a case where the first balancing resistor is decided more simply compared to the fourth embodiment and the second balancing resistor is decided by a method other than the one in the fourth embodiment will be described.

(1) Configuration of Voltage Smoothing Circuit

Figure 16:
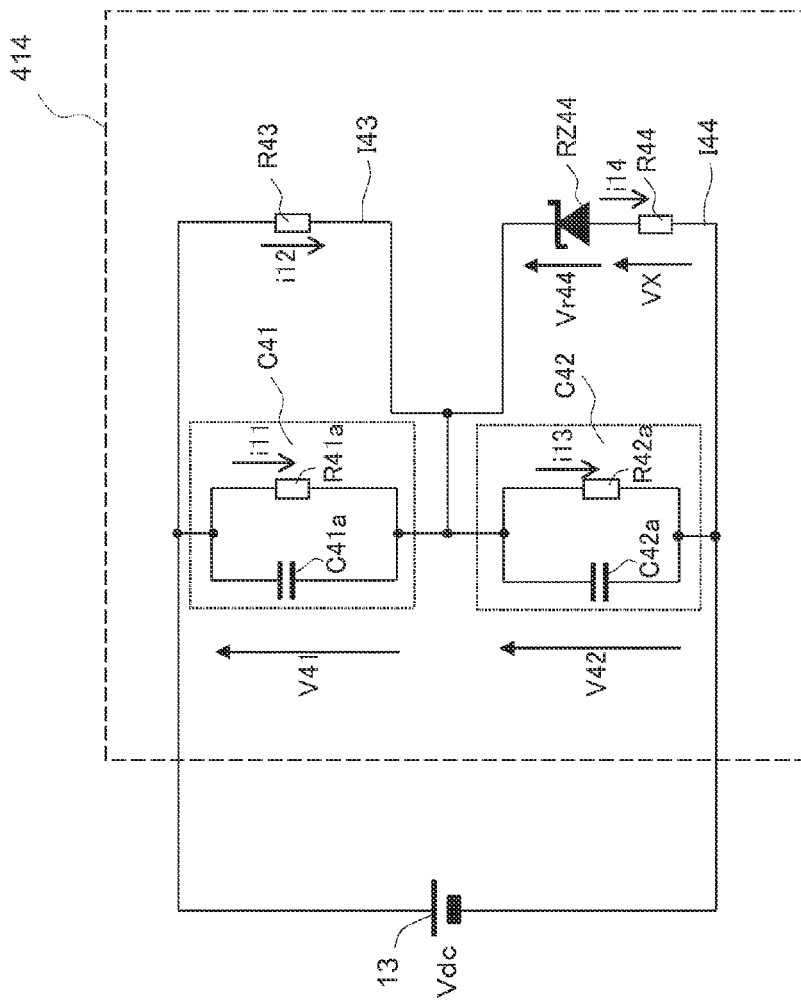
FIG. 16 is a circuit diagram of a voltage smoothing circuit pertaining to a fifth embodiment and shows flows of currents used when deciding the resistance values of balancing resistors.

FIG. 16 is a circuit diagram of a voltage smoothing circuit 414 pertaining to the present embodiment. The configuration of the voltage smoothing circuit 414 is mainly the same as that of the voltage smoothing circuit 314 of the fourth embodiment except that the method of deciding the resistance value of the second balancing resistor differs.

That is, the voltage smoothing circuit 414 is equipped with a first smoothing capacitor C41, a second smoothing capacitor C42, a first balancing resistor R43, a second balancing resistor R44, and a Zener diode RZ44 (which corresponds to a second conduction regulating portion). The first smoothing capacitor C41 and the second smoothing capacitor C42 are connected in series to each other and are connected in parallel to the power supply portion i3. The first smoothing capacitor C41 and the second smoothing capacitor C42 are respectively configured by capacitance elements C41a and C42a and internal resistors R41a and R42a. The first balancing resistor R43 is connected on a current path I43 parallel with the first smoothing capacitor C41. The second balancing resistor R44 and the Zener diode RZ44 are connected in series on a current path I44 in parallel with the second smoothing capacitor C42. The Zener diode RZ44 conducts current in one direction on the current path I44 in a case where a voltage equal to or greater than a Zener voltage Vr44 (which corresponds to a second predetermined voltage) that is lower than a rated voltage Vrt42 of the second smoothing capacitor C42 has been applied to the Zener diode RZ44 and maintains its interterminal voltage at the Zener voltage Vr44.

(2) Method of Deciding Resistance Values of Balancing Resistors and Zener Voltage To begin, the voltage Vdc of the power supply portion 13 (here, below, called the power supply voltage Vdc), the values of the internal resistors R41a and R42a of the smoothing capacitors C41 and C42, end-to-end voltages V41 and V42 of the smoothing capacitors C41 and C42, and the value of the Zener voltage Vr44 of the Zener diode RZ44 are decided as a precondition.

Specifically, it will be supposed that the power supply voltage Vdc is a maximum value in an operating range having the potential to fluctuate. Here, as an example, it will be supposed that the power supply voltage Vdc is 700 V. It will be supposed that the resistance values of the internal resistors R41a and R42a are maximum values or minimum values of a range resulting from variations between capacitors that are actually used. Here, as an example, it will be supposed that the internal resistors R41a and R42a can take resistance values in the range of 400 kΩ to 1000 kΩ from variations between the capacitors.

Further, the end-to-end voltages V41 and V42 of the smoothing capacitors C41 and C42 are hypothetically decided in such a way as to become equal to or less than "Vdc/2±X %" on the basis of the power supply voltage Vdc. In particular, even if the end-to-end voltages V41 and V42 take the maximum value of "Vdc/2+X %", this maximum value is decided in such a way as to become equal to or less than rated voltages Vrt41 and Vrt42 of the smoothing capacitors C41 and C42. Here, "±X %" represents the operating range of the end-to-end voltages V41 and V42 like in the third embodiment. Specifically, in a case supposing that the internal resistor R41a of the first smoothing capacitor C41 is the maximum value "1000 kΩ" and the internal resistor R42a of the second smoothing capacitor C42 is the minimum value "400 kΩ", assuming that the rated voltages of the smoothing capacitors C41 and C42 are 450 V as an example the end-to-end voltage V41 is decided as "420 V" and the end-to-end voltage V42 is decided as "280 V". Conversely, in a case supposing that the internal resistor R41a of the first smoothing capacitor C41 is the minimum value "400 kΩ" and the internal resistor R42a of the second smoothing capacitor C42 is the maximum value "1000 kΩ", the end-to-end voltage V41 is decided as "280 V" and the end-to-end voltage V42 is decided as "420 V".

Further, the Zener voltage Vr44 of the Zener diode RZ44 is decided as a value (specifically, about 350 V) that is about half the power supply voltage Vdc, but here, like in the third embodiment, a case where the Zener voltage Vr44 of the Zener diode RZ44 is decided as 300 V will be taken as an example, —Case where Internal Resistor R41a is Maximum Value and Internal Resistor R42a is Minimum Value—

In a case supposing that the internal resistor R41a of the first smoothing capacitor C41 is the maximum value "1000 kΩ" and the internal resistor R42a of the second smoothing capacitor C42 is the minimum value "400 kΩ", the next equation (19) is true assuming that i11 represents the current flowing through the internal resistor R41a and i12 represents the current flowing through the first balancing resistor R43 (FIG. 16).

<Equation 19>

$$i11 \times 1000 = i12 \times R43 = V41 = 420 \quad (19)$$

In the above equation (19), the reference sign is used as is for the resistance value of the first balancing resistor R43.

Moreover, in this case, because the end-to-end voltage V41 is "420 V" and the end-to-end voltage V42 is "280 V", the end-to-end voltage V42 of the second smoothing capacitor C42 becomes lower than the Zener voltage Vr44 (V42<Vr44, and specifically 280 V<300 V) and the next equation (20) is true. Current does not flow to the second balancing resistor R44 (i14 pertaining to FIG. 16=0 A), so the next equation (21) is true, <Equation 20>

$$i13 \times 400 = 280 \quad (20)$$

<Equation 21>

$$i11 + i12 = i13 \quad (21)$$

—Case where Internal Resistor R41a is Minimum Value and Internal Resistor R42a is Maximum Value—

Figure 17:
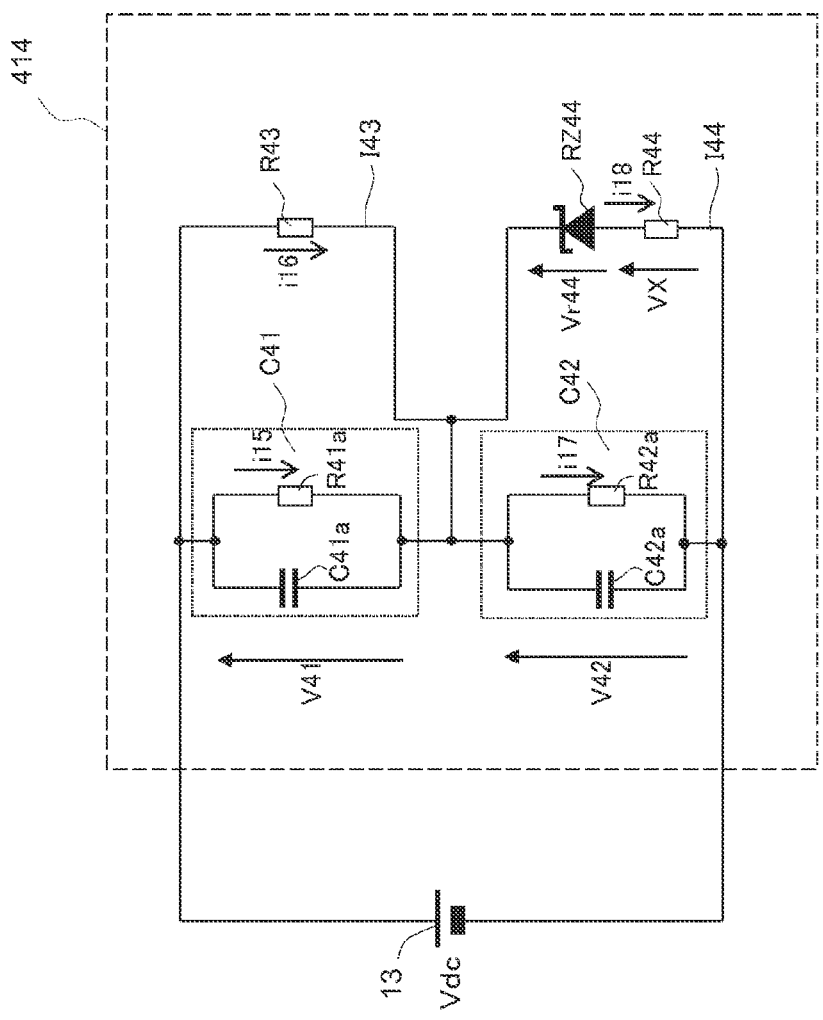
FIG. 17 is a circuit diagram of the voltage smoothing circuit pertaining to the fifth embodiment and shows flows of currents used when deciding the resistance values of the balancing resistors.

In a case supposing that the internal resistor R41a of the first smoothing capacitor C41 is the minimum value "400 kΩ" and the internal resistor R42a of the second smoothing capacitor C42 is the maximum value "1000 kΩ", the end-to-end voltage V41 is "280 V" and the end-to-end voltage V42 is "420 V", so the end-to-end voltage V42 becomes lower than the Zener voltage Vr44 (V42>Vr44). Consequently, the Zener diode RZ44 switches ON and current flows on the current path I44. Assuming that i15 represents the current flowing through the internal resistor R41a, i16 represents the current flowing through the first balancing resistor R43, i17 represents the current flowing through the internal resistor R42a, and 8 represents the current flowing through the second balancing resistor R44 (FIG. 17), the next equations (22) to (24) are true.

<Equation 22>

$$i15 \times 400 = i16 \times R43 = V41 = 280 \quad (22)$$

<Equation 23>

$$i17 \times 1000 = i18 \times R44 + 300 = V42 = 420 \quad (23)$$

<Equation 24>

$$i15 + i16 = i17 + i18 \quad (24)$$

By calculating the above equations (19) to (24), the first balancing resistor R43 can be decided as "1500 kΩ" and the second balancing resistor R44 can be decided as "256 kΩ".

In the method described above, the end-to-end voltages V41 and V42 of the smoothing capacitors C41 and C42 satisfy the condition of being respectively equal to or less than the rated voltages Vrt41 and Vrt42 of the smoothing capacitors C41 and C42, but the obtained second balancing resistor R44 is equal to or less than the internal resistor R42a of the second smoothing capacitor C42 and the first balancing resistor R43 is equal to or greater than the internal resistor R41a of the first smoothing capacitor C41.

(3) Effects

In the method pertaining to the present embodiment, the values of the first and second balancing resistors R43 and R44 are simply decided considering both a case where the Zener diode RZ44 does not operate and a case where the Zener diode RZ44 operates. In the present embodiment, as described in the fourth embodiment, the end-to-end voltage V41 of the first smoothing capacitor C41 does not always satisfy the condition of being equal to or less than the end-to-end voltage V42 of the second smoothing capacitor C42. However, in the present embodiment, the condition that the end-to-end voltage V41 of the first smoothing capacitor C41 is lower than the rated voltage Vrt41 of that capacitor C41 (V41<Vrt41) and the end-to-end voltage V42 of the second smoothing capacitor C42 is lower than the rated voltage Vrt42 of that capacitor C42 (V42<Vrt42) is satisfied, and voltages equal to or greater than the rated voltages Vrt41 and Vrt42 are not applied to the smoothing capacitors C41 and C42.

(4) Modifications (a)

In the voltage smoothing circuit 414 pertaining to the present embodiment also, an auxiliary resistor may also be disposed like in FIGS. 12 and 13.

(b)

Further, in the voltage smoothing circuit 414 pertaining to the present embodiment also, the positions where the balancing resistors and the Zener diode are disposed may also be mutually opposite with respect to the point-of-connection s1 like in FIG. 14. Moreover, an auxiliary resistor may also be disposed in parallel with the Zener diode, or an auxiliary resistor may also be disposed in parallel with the first and second smoothing capacitors connected in series to each other.

Sixth Embodiment

Next, a voltage smoothing circuit 514 that is further equipped with one more Zener diode in contrast to the first embodiment to the fifth embodiment will be described.

(1) Configuration of Voltage Smoothing Circuit

Figure 18:
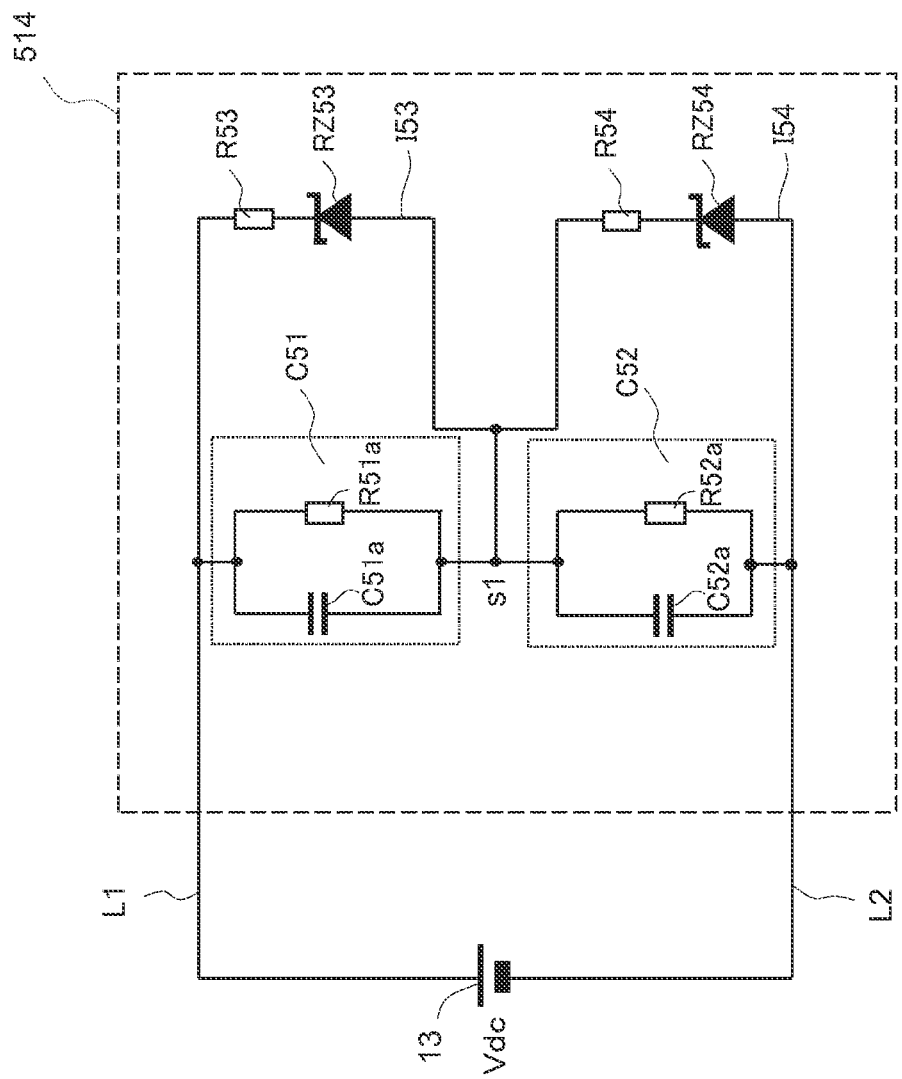
FIG. 18 is a circuit diagram of a voltage smoothing circuit pertaining to a sixth embodiment.

FIG. 18 is a circuit diagram of a voltage smoothing circuit 514 pertaining to the present embodiment. The voltage smoothing circuit 514 is equipped with a first smoothing capacitor C51, a second smoothing capacitor C52, a first balancing resistor R53, a second balancing resistor R54, a first Zener diode RZ53 (which corresponds to a first conduction regulating portion), and a second Zener diode RZ54 (which corresponds to a second conduction regulating portion).

(1-1) First Smoothing Capacitor and Second Smoothing Capacitor

The first smoothing capacitor C51 and the second smoothing capacitor C52 are, like in the first embodiment, connected in series to each other and are connected in parallel to the power supply portion 13. The first smoothing capacitor C51 and the second smoothing capacitor C52 are respectively configured by capacitance elements C51a and C52a and internal resistors R51a and R52a.

The first smoothing capacitor C51 and the second smoothing capacitor C52 pertaining to the present embodiment have the same capacitance values; 1920 μC can be given as an example. Further, examples of types of capacitors that may be used for the first smoothing capacitor C51 and the second smoothing capacitor C52 include, like in the first embodiment, electrolytic capacitors, tantalum capacitors, ceramic resistors, and so forth, but in the present embodiment, electrolytic capacitors are used for the first smoothing capacitor C51 and the second smoothing capacitor C52.

(1-2) First Balancing Resistor and Second Balancing Resistor

The first balancing resistor R53 is connected in parallel to the first smoothing capacitor C51, and the second balancing resistor R54 is connected in parallel to the second smoothing capacitor C52. That is, the first balancing resistor R53 is disposed on the power supply line L1 side (that is, the upper side), and the second balancing resistor R54 is disposed on the GND line L2 side (that is, the lower side). Specifically, one end of the first balancing resistor R53 is connected to the power supply line L1, and the other end of the first balancing resistor R53 is connected to the cathode of the first Zener diode RZ53. One end of the second balancing resistor R54 is connected to the point-of-connection s1 between the first smoothing capacitor C51 and the second smoothing capacitor C52, and the other end of the second balancing resistor R54 is connected to the cathode of the second Zener diode RZ54.

Further, the first balancing resistor R53 has a resistance value that is smaller than the value of the internal resistor R51a of the first smoothing capacitor C51, and the second balancing resistor R54 has a resistance value that is smaller than the value of the internal resistor R52a of the second smoothing capacitor C52. This is because controllability improves the more the resistance values of the first balancing resistor R53 and the second balancing resistor R54 are set to small values, and thus a balance between both of the voltages applied to the first smoothing capacitor C51 and the second smoothing capacitor C52 can be achieved. Therefore, in the present embodiment, the resistance values of the first balancing resistor R53 and the second balancing resistor R54 are decided to be sufficiently small values with respect to the lower limit value of variations between the internal resistor R51a of the first smoothing capacitor C51 and the internal resistor R52a of the second smoothing capacitor C52. As an example, the first balancing resistor R53 and the second balancing resistor R54 are respectively decided to be about $1/10$ to about $1/20$ of the internal resistors R51a and R52a. However, the smaller the values of the first balancing resistor R53 and the second balancing resistor R54 are made, the larger the currents flowing to the first balancing resistor R53 and the second balancing resistor R54 become, so power loss in the balancing resistors R53 and R54 ends up becoming larger. For that reason, in consideration of that power loss, it is preferred that the resistance values of the first balancing resistor R53 and the second balancing resistor R54 be decided in such a way that that power loss becomes a target power loss amount.

As a specific example of the first balancing resistor R53 and the second balancing resistor R54, the resistance values of the first balancing resistor R53 and the second balancing resistor R54 can both be decided as "50 kΩ ($1/8$ W)" in a case supposing that the internal resistor R51a of the first smoothing capacitor C51 is "1075 kΩ" and the internal resistor R52a of the second smoothing capacitor C52 is "420 kΩ". In this way, the voltages applied to the first balancing resistor R53 and the second balancing resistor R54 pertaining to the present embodiment can be made significantly lower compared to the value of the balancing resistor in the conventional techniques, so loss can be made smaller and a relatively small-sized resistor like a chip resistor can be used. In contrast, in the conventional techniques the balancing resistor had a relative large value, like "3 series of 5.6 kΩ (10 W)", for example, so using a cement resistor whose dimensions are large has been predominant.

(1-3) First Zener Diode and Second Zener Diode

The first Zener diode RZ53 is connected in series to the first balancing resistor R53. The anode of the first Zener diode RZ53 is connected to the point-of-connection s1 between the first smoothing capacitor C51 and the second smoothing capacitor C52, and the cathode of the first Zener diode RZ53 is connected to the first balancing resistor R53. The first Zener diode RZ53 conducts current in one direction to the first balancing resistor R53 in a case where a voltage equal to or greater than a first Zener voltage Vr53 (which corresponds to a first predetermined voltage) has been applied to the first Zener diode RZ53 (see FIG. 19). The one direction referred to here is the opposite direction of the first Zener diode RZ53—that is, a direction from the cathode to the anode.

The second Zener diode RZ54 is connected in series to the second balancing resistor R54. More specifically, the anode of the second Zener diode RZ54 is connected to the GND line L2, and the cathode of the second Zener diode RZ54 is connected to the second balancing resistor R54. The second Zener diode RZ54 conducts current in one direction to the second balancing resistor R54 in a case where a voltage equal to or greater than a second Zener voltage Vr54 (which corresponds to a second predetermined voltage) has been applied to the second Zener diode RZ54 (see FIG. 20). The one direction referred to here is the opposite direction of the second Zener diode RZ54—that is, from the cathode to the anode.

In particular, in the present embodiment, in a case supposing that the voltage Vdc is "718 V", for example, the first Zener voltage Vr53 and the second Zener voltage Vr54 are both decided as "360 V" on the basis of the value of the voltage Vdc. The first Zener voltage Vr53 and the second Zener voltage Vr54 are both values equal to or less than the voltage Vdc but are decided in such a way that the total of these becomes equal to or greater than the voltage Vdc. Because of this, voltages that become equal to or greater than the first Zener voltage Vr53 and equal to or greater than the second Zener voltage Vr54 are not applied to both the first Zener diode RZ53 and the second Zener diode RZ54, and a voltage equal to or greater than the first Zener voltage Vr53 or greater than the second Zener voltage Vr54 is applied only to either one of the first Zener diode RZ53 or the second Zener diode RZ54. That is, in a case where a voltage equal to or greater than the first Zener voltage Vr53 has been applied to the first Zener diode RZ53, a voltage equal to or greater than the second Zener voltage Vr54 is not applied to the second Zener diode RZ54. Conversely, in a case where a voltage equal or greater than the second Zener voltage Vr54 has been applied to the second Zener diode RZ54, a voltage equal to or greater than the first Zener voltage Vr53 is not applied to the first Zener diode RZ53.

Consequently, if a voltage equal to or greater than the first Zener voltage Vr53 is applied to the first Zener diode RZ53 due to variations between the internal resistors R51a and R52a of the first smoothing capacitor C51 and the second smoothing capacitor C52, current flows to a current path I53 on the upper side including the first balancing resistor R53, but current does not flow to a current path I54 on the lower side including the second balancing resistor R54. Thus, the current that has flowed on the current path I53 flows into the internal resistor R52a of the second smoothing capacitor C52. Conversely, if a voltage equal to or greater than the second Zener voltage Vr54 is applied to the second Zener diode RZ54 due to variations between the internal resistors R51a and R52a, current flows to the current path I54 on the lower side, but current does not flow to the current path I53 on the upper side. Thus, the current flowing on the current path I54 flows from the internal resistor R51a of the first smoothing capacitor C51. That is, it can be said that the first Zener voltage Vr53 and the second Zener voltage Vr54 are decided in such a way that current flows only to either one of the first Zener diode RZ53 or the second Zener diode RZ54.

Moreover, in the present embodiment, the first Zener voltage Vr53 and the second Zener voltage Vr54 are decided in such a way as to become smaller than the rated voltages of the first smoothing capacitor C51 and the second smoothing capacitor C52. This is to ensure that the voltages applied to the first smoothing capacitor CSI and the second smoothing capacitor C52 become larger than the values of the first Zener voltage Vr53 and the second Zener voltage Vr54. Capacitors whose rated voltages are several hundred volts, such as 400 V, for example, are utilized for the first smoothing capacitor C51 and the second smoothing capacitor C52. The more the first Zener voltage Vr53 and the second Zener voltage Vr54 are decided to be large voltages, the smaller the power loss in the first balancing resistor R53 and the second balancing resistor R54 can be made, so the amounts of heat emitted in the first balancing resistor R53 and the second balancing resistor R54 also become smaller. Therefore, in the present embodiment, as described above, by deciding the Zener voltages Vr53 and Vr54 to be "360 V", which is smaller than the rated voltages of the smoothing capacitors C51 and C52, the power loss in the balancing resistors R53 and R54 is made smaller.

The values of the Zener voltages Vr53 and Vr54 are decided considering also the values of the first balancing resistor R53 and the second balancing resistor R54 in addition to the voltage Vdc and the rated voltages of the first smoothing capacitor C51 and the second smoothing capacitor C52.

(2) Operation of Voltage Smoothing Circuit

Next, the operation of the voltage smoothing circuit 514 will be described using FIGS. 19 and 20.

First, according to the configuration of the voltage smoothing circuit 514, a voltage V51 applied to both ends of the first smoothing capacitor C51 is equal to the voltage applied on the current path I53—that is, from the first balancing resistor R53 to the first Zener diode RZ53. A voltage V52 applied to both ends of the second smoothing capacitor C52 is equal to the voltage applied on the current path I54—that is, from the second balancing resistor R54 to the second Zener diode RZ54.

On the other hand, the same capacitors are used for the smoothing capacitors C51 and C52, so ideally there would be substantially no variations between the internal resistors R51a and R52a or any variations would be small (R51a≈R52a) and thus the voltage V51 applied to both ends of the first smoothing capacitor C51 and the voltage V52 applied to both ends of the second smoothing capacitor C52 would be in a state in which they become equal to or less than the rated voltages of the smoothing capacitors C51 and C52, respectively, and become substantially equal. In this ideal state, the voltages V51 and V52 applied to the current paths I53 and I54 respectively become equal to or less than the first Zener voltage Vr53 and the second Zener voltage Vr54 (V51<Vr53, V52<Vr54). Current does not flow on the current paths I53 and I54, and the first and second smoothing capacitors C51 and C52 take a state where a balance between their voltages is maintained.

However, if there are variations between the internal resistor R51a of the first smoothing capacitor C51 and the internal resistor R52a of the second smoothing capacitor C52, a magnitude relation arises between the voltages V51 and V52 applied to the smoothing capacitors C51 and C52 and the Zener voltages Vr53 and Vr54, and the voltage smoothing circuit takes a state where the balance between the voltages of the first and second smoothing capacitors C51 and C52 is disrupted. On the basis of that magnitude relation, the voltage smoothing circuit 514 takes either of the following operations.

(2-1) Case where Voltage Larger than First Zener Voltage Vr53 has been Applied to Both Ends of First Smoothing Capacitor C51 (V51>Vr53)

In this case, the voltage V51 larger than the first Zener voltage Vr53 is applied not only to both ends of the first smoothing capacitor C51 but also to the first Zener diode RZ53, and the first Zener diode RZ53 operates. When this happens, the end-to-end voltage of the first Zener diode RZ53 is clipped to a constant voltage—that is, the first Zener voltage Vr53—and current flows on the current path I53 in the order of the first balancing resistor R53 and the first Zener diode RZ53 as indicated by the arrows in FIG. 19. The voltage V52 applied to both ends of the second smoothing capacitor C52 is expressed as "Vdc−V51", so that voltage V52 is smaller than the second Zener voltage Vr54. Consequently, the second Zener diode RZ54 does not operate and current does not flow on the current path I54.

The current that has flowed on the current path I53 flows into the internal resistor R52a of the second smoothing capacitor C52 via the point-of-connection s1. The larger the voltage V51 applied to both ends of the first smoothing capacitor C51 is, the more the amount of current flowing into the internal resistor R52a via the current path I53 becomes.

In this way, the current flows into the internal resistor R52a, whereby the voltage V52 applied to both ends of the second smoothing capacitor C52 becomes larger. The voltage V51 is expressed as "Vdc−V52", so it becomes smaller as the voltage V52 becomes larger.

Because of the above operation, before long the voltage V52 and the voltage V51 become substantially equal and current no longer flows to the current path I53. That is, the above operation is continuously performed until the voltage V51 applied to both ends of the first smoothing capacitor C51 becomes substantially equal to the first Zener voltage Vr53 and a state is reached where a balance between the voltages of the first and second smoothing capacitors C51 and C52 is maintained.

(2-2) Case where Voltage Larger than Second Zener Voltage Vr54 has been Applied to Both Ends of Second Smoothing Capacitor C52 (V52>Vr54)

In this case, the voltage V52 larger than the second Zener voltage Vr54 is applied not only to both ends of the second smoothing capacitor C52 but also to the second Zener diode RZ54, and the second Zener diode RZ54 operates. When this happens, the end-to-end voltage of the second Zener diode RZ54 is clipped to a constant voltage—that is, the second Zener voltage Vr54—and a path where current flows on the current path I54 in the order of the second balancing resistor R54 and the second Zener diode RZ54 as indicated by the arrows in FIG. 20 is formed. The voltage V51 applied to both ends of the first smoothing capacitor C51 is expressed as "Vdc−V52", so that voltage V51 is smaller than the first Zener voltage Vr53. Consequently, the first Zener diode RZ53 does not operate and current does not flow on the current path I53.

As described above, the current path I54 becomes able to conduct but the current path I53 is not able to conduct, so current flows through the internal resistor R51a of the first smoothing capacitor C51. That is, the current is drawn from the first smoothing capacitor C51 side by the current path I54, and the current that has flowed through the internal resistor R51a flows to the current path I54 via the point-of-connection s1. The larger the voltage V52 applied to both ends of the second smoothing capacitor C52 is, the more the amount of current flowing to the current path I54 via the internal resistor R51a becomes.

In this way, the current flows to the internal resistor R51a, whereby the voltage V51 applied to both ends of the first smoothing capacitor C51 becomes larger. The voltage V52 is expressed as "Vdc−V51", so it becomes smaller as the voltage V51 becomes larger.

Because of the above operation, before long the voltage V51 and the voltage V52 become substantially equal and current no longer flows to the current path I54. That is, the above operation is continuously performed until the voltage V52 applied to both ends of the second smoothing capacitor C52 becomes substantially equal to the second Zener voltage Vr54 and a state is reached where a balance between the voltages of the first and second smoothing capacitors C51 and C52 is maintained.

(3) Effects (A)

Figure 19:
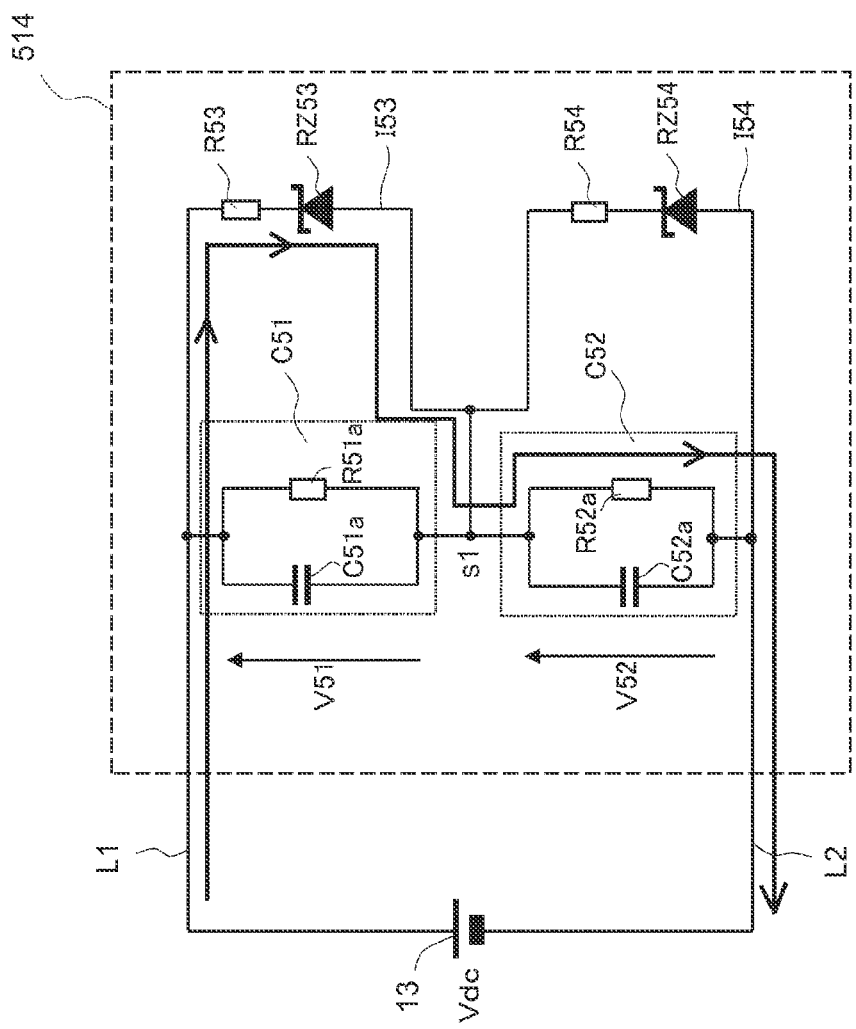
FIG. 19 is a diagram showing paths of currents flowing in the voltage smoothing circuit in a case where a voltage equal to or greater than a first Zener voltage has been applied to both ends of a first smoothing capacitor in the sixth embodiment.

In the voltage smoothing circuit 514 pertaining to the present embodiment, in a case where a voltage equal to or greater than the first Zener voltage Vr53 that is a first predetermined voltage has been applied to the first Zener diode RZ53 that is a first conduction regulating portion, current flows to the first balancing resistor R53, and this current flows, for example, to the internal resistor R52a of the second smoothing capacitor C52 (FIG. 19). Conversely, in a case where a voltage equal to or greater than the second Zener voltage Vr54 that is a second predetermined voltage has been applied to the second Zener diode RZ54 that is a second conduction regulating portion, current flows to the second balancing resistor R54, whereby current also flows, for example, to the internal resistor R51a of the first smoothing capacitor C51 (FIG. 20). In a case where current has flowed to the first smoothing capacitor C51, the end-to-end voltage V51 of the first smoothing capacitor C51 rises, and in a case where current has flowed to the second smoothing capacitor C52, the end-to-end voltage V52 of the second smoothing capacitor C52 rises, so a balance between the voltages applied to the smoothing capacitors C51 and C52 can be maintained with a simple configuration.

In the voltage smoothing circuit 514 pertaining to the present embodiment, depending on the way the voltage equal to or greater than the first Zener voltage Vr53 or equal to or greater than the second Zener voltage Vr54 is applied, current no longer always flows to both of the first and second balancing resistors R53 and R54; for the first and second balancing resistors R53 and R54, it is alright not to use resistors equipped with conventional withstand performance (e.g., cement resistors), and resistors whose dimensions are relatively small (e.g., chip resistors) can be utilized. Consequently, in the printed board P1 on which the first and second balancing resistors R53 and R54 are mounted, the area occupied by the first and second balancing resistors R53 and R54 becomes smaller, so the printed board P1 can be made smaller. Further, if current no longer always flows to both the first and second balancing resistors R53 and R54, the amounts of heat emitted in the first and second balancing resistors R53 and R54 can be alleviated, on the effect on electronic parts near the balancing resistors R53 and R54 can be controlled.

(B)

In particular, in the voltage smoothing circuit 514 pertaining to the present embodiment, a voltage equal to or greater than the first Zener voltage Vr53 or equal to or greater than the second Zener voltage Vr54 is applied only to either one of the first Zener diode RZ53 or the second Zener diode RZ54, so current does not always flow to both of the first and second balancing resistors R53 and R54. Consequently, resistors whose dimensions are relatively small (e.g., chip resistors) can be utilized tier the first and second balancing resistors R53 and R54, and the amounts of heat emitted in the first and second balancing resistors R53 and R54 can be alleviated.

(C)

Further, in the voltage smoothing circuit 514 pertaining to the present embodiment, in a case supposing that the value of the voltage that the power supply portion 13 outputs is "718 V" for example, the Zener voltages Vr53 and Vr54 of the Zener diodes RZ53 and RZ54 are both decided as "360 V". Because of this, current flows only to either one of the first Zener diode RZ53 or the second Zener diode RZ54, so the amounts of heat emitted in the first and second balancing resistors R53 and R54 can be alleviated with a simple configuration.

(D)

Further, in the voltage smoothing circuit 514 pertaining to the present embodiment, the first Zener voltage Vr53 and the second Zener voltage Vr54 are substantially the same as or less than the rated voltages of the first smoothing capacitor C51 and the second smoothing capacitor C52. Because of this, voltages that are the same as or larger than the values of the first Zener voltage Vr53 and the second Zener voltage Vr54 are applied to the first and second smoothing capacitors C51 and C52.

(E)

Further, in the voltage smoothing circuit 514 pertaining to the present embodiment, the first balancing resistor R53 has a resistance value that is smaller than the value of the internal resistor R51a of the first smoothing capacitor C51. The second balancing resistor R54 has a resistance value that is smaller than the value of the internal resistor R52a of the second smoothing capacitor C52. Because of this, the amounts of current flowing to the first balancing resistor R53 and the second balancing resistor R54 become larger than the amounts of current flowing to the internal resistors R51a and R52a of the first smoothing capacitor C51 and the second smoothing capacitor C52, so the amount of currents flowing to the first smoothing capacitor C51 and the second smoothing capacitor C52 can be controlled. Consequently, the voltages applied to the first smoothing capacitor C51 and the second smoothing capacitor C52 can be made lower.

(4) Modification

Figure 20:
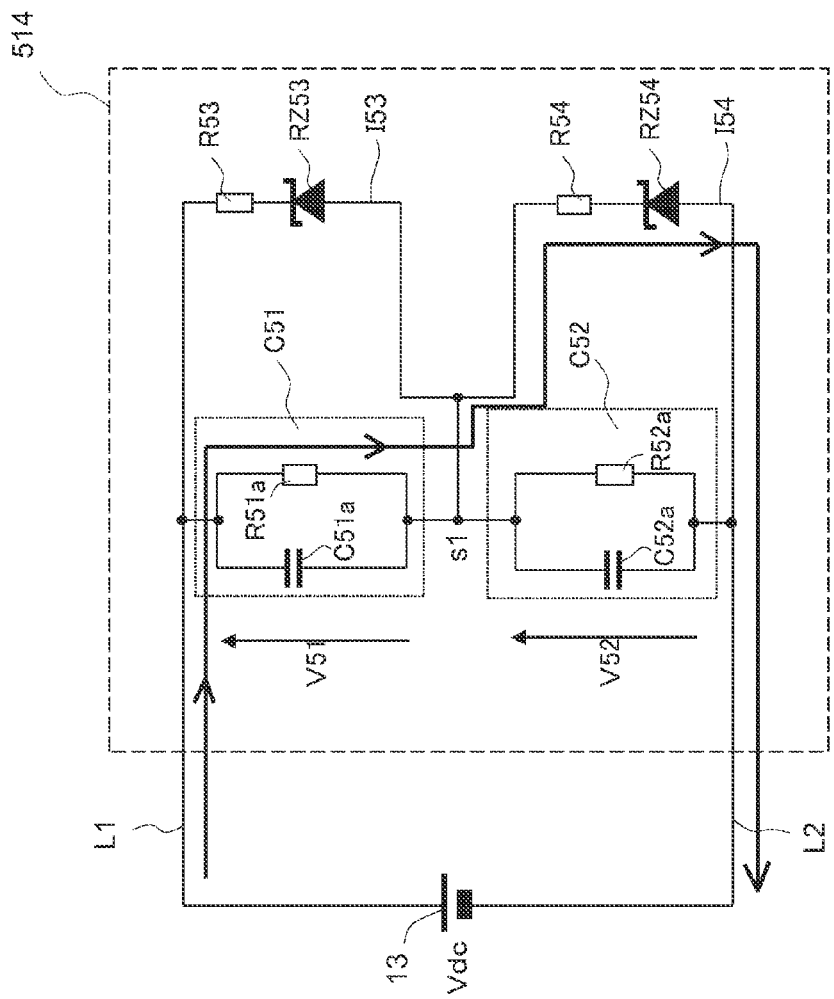
FIG. 20 is a diagram showing paths of currents flowing in the voltage smoothing circuit in a case where a voltage equal to or greater than a second Zener voltage has been applied to both ends of a second smoothing capacitor in the sixth embodiment.
Figure 21:
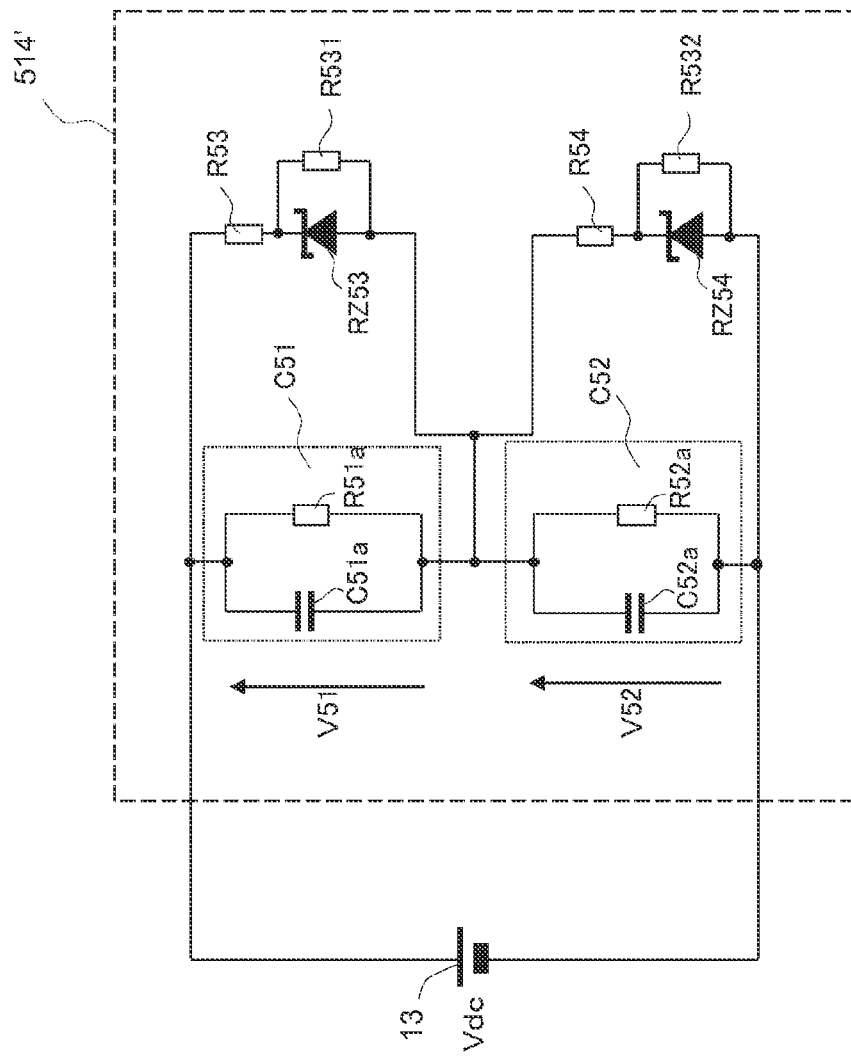
FIG. 21 is a circuit diagram of a voltage smoothing circuit pertaining to modification of the sixth embodiment.

In the present embodiment, a case where the voltage smoothing circuit 514 has the configuration shown in FIGS. 18 to 20 has been described. However, the voltage smoothing circuit may also have the configuration shown in FIG. 21. A voltage smoothing circuit 514' in FIG. 21 is further equipped with a third auxiliary resistor R531 and a fourth auxiliary resistor R532 in addition to the configuration of the voltage smoothing circuit 514 already described. The third auxiliary resistor R531 is connected in parallel to both ends of the first Zener diode RZ53. The fourth auxiliary resistor R532 is connected in parallel to both ends of the second Zener diode RZ54.

According to the voltage smoothing circuit 514' pertaining to FIG. 21, in a case where the voltage V51 larger than the first Zener voltage Vr53 has been applied to the first Zener diode RZ53 (V51>Vr53), the current flowing through the first balancing resistor R53 branches and flows to the first Zener diode RZ53 and the third auxiliary resistor R531. Conversely, in a case where the voltage V52 larger than the second Zener voltage Vr54 has been applied to the second Zener diode RZ54 (V52>Vr54), the current flowing through the second balancing resistor R54 branches and flows to the second Zener diode RZ54 and the fourth auxiliary resistor R532. Because of this, the amounts of current flowing to the first Zener diode RZ53 and the second Zener diode RZ54 become smaller compared to the voltage smoothing circuit 514, so the operating voltages and the rated power of the first Zener diode RZ53 and the second Zener diode RZ54 can be set low, and diodes whose rated currents are relatively small can be used for the first Zener diode RZ53 and the second Zener diode RZ54. Consequently, costs pertaining to the voltage smoothing circuit 514' can be reduced (in particular, the cost of the first Zener diode RZ53 and the second Zener diode RZ54 can be cut).

Further, the third auxiliary resistor R531 and the fourth auxiliary resistor R532 can also function as a discharge circuit of the first smoothing capacitor C51 and the second smoothing capacitor C52 at the time of power shutdown of the motor driver 1. Consequently, it is not necessary to separately dispose a discharge circuit of the first smoothing capacitor C51 and the second smoothing capacitor C52.

The voltage smoothing circuit 514' has the same configuration as FIGS. 18 to 20 excluding the third auxiliary resistor R531 and the fourth auxiliary resistor R532, so in FIG. 21, the same reference signs as in FIGS. 18 to 20 are given excluding the third auxiliary resistor R531 and the fourth auxiliary resistor R532.

Seventh Embodiment

In the sixth embodiment, a case where current flows only to either one of the first Zener diode RZ53 or the second Zener diode RZ54 was described, but in the present embodiment, a voltage smoothing circuit that performs an operation differing from the sixth embodiment will be described.

(1) Configuration of Voltage Smoothing Circuit

Figure 22:
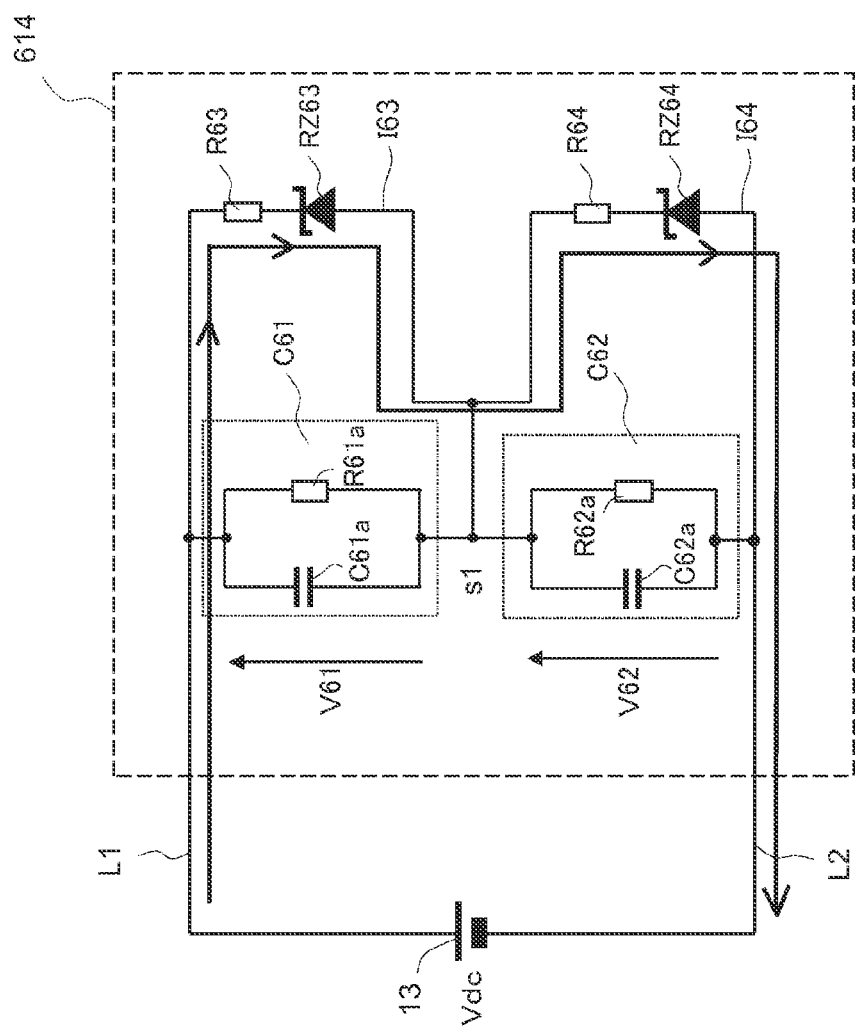
FIG. 22 is a diagram showing paths of currents flowing in a voltage smoothing circuit in a case where a balance between the end-to-end voltage of a first smoothing capacitor and the end-to-end voltage of a second smoothing capacitor is maintained in a seventh embodiment.
Figure 23:
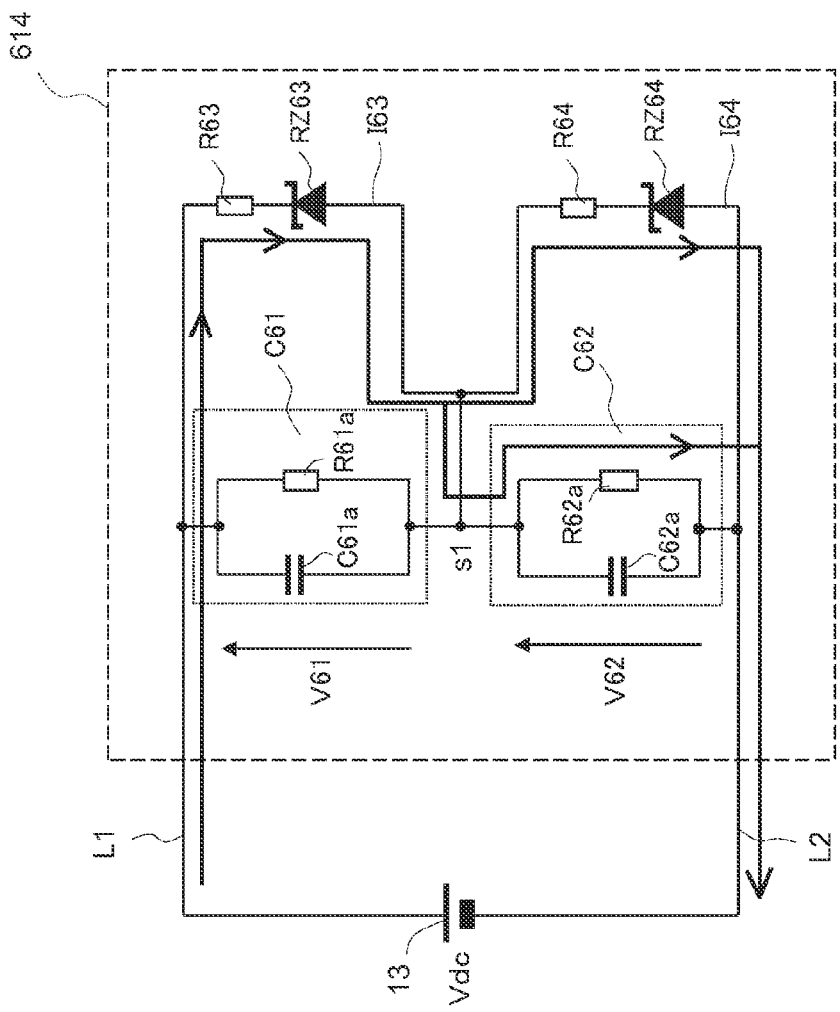
FIG. 23 is a diagram showing paths of currents flowing in the voltage smoothing circuit in a case where the end-to-end voltage of the first smoothing capacitor is larger than the end-to-end voltage of the second smoothing capacitor in the seventh embodiment.
Figure 24:
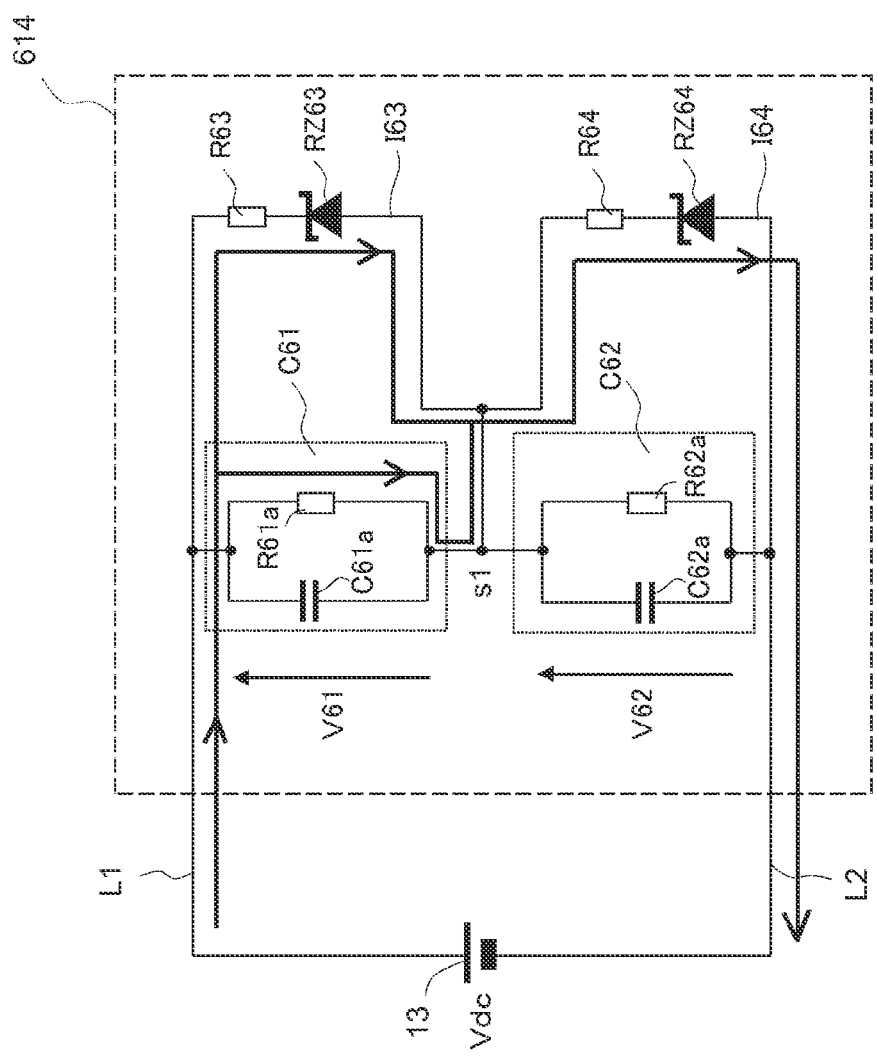
FIG. 24 is a diagram showing paths of currents flowing in the voltage smoothing circuit in a case where the end-to-end voltage of the first smoothing capacitor is smaller than the end-to-end voltage of the second smoothing capacitor in the seventh embodiment.

FIGS. 22 to 24 are circuit diagrams of a voltage smoothing circuit 614 pertaining to the present embodiment. The main circuit configuration of the voltage smoothing circuit 614 is the same as that of the voltage smoothing circuit 514 pertaining to the sixth embodiment. That is, the voltage smoothing circuit 614 is equipped with a first smoothing capacitor C61, a second smoothing capacitor C62, a first balancing resistor R63, a second balancing resistor R64, a first Zener diode RZ63 (which corresponds to a first conduction regulating portion), and a second Zener diode RZ64 (which corresponds to a second conduction regulating portion).

The first smoothing capacitor C61 and the second smoothing capacitor C62 are connected in series to each other and are connected in parallel to the power supply portion 13. The first smoothing capacitor C61 and the second smoothing capacitor C62 respectively have internal resistors R61a and R62a and capacitance elements C61a and C62a and further smooth the voltage outputted from the power supply portion 13.

The first balancing resistor R63 is connected in parallel to the first smoothing capacitor C61, and the second balancing resistor R64 is connected in parallel to the second smoothing capacitor C62. The first balancing resistor R63 has a resistance value that is smaller than the value of the internal resistor R61a of the first smoothing capacitor C61, and the second balancing resistor R64 has a resistance value that is smaller than the value of the internal resistor R62a of the second smoothing capacitor C62.

The first Zener diode RZ63 is connected in series to the first balancing resistor R63, and the second Zener diode RZ64 is connected in series to the second balancing resistor R64. The first Zener diode RZ63 conducts current in one direction (that is, a direction from the cathode to the anode of the first Zener diode R263) to the first balancing resistor R63 in a case where a voltage equal to or greater than a first Zener voltage Vr63 (a first predetermined voltage) has been applied. The second Zener diode RZ64 conducts current in one direction (that is, a direction from the cathode to the anode of the second Zener diode RZ64) to the second balancing resistor R64 in a case where a voltage equal to or greater than a second Zener voltage Vr64 (a second predetermined voltage) has been applied.

Further, the first Zener voltage Vr63 is decided, on the basis of the value of the voltage Vdc of the power supply portion 13, in such a way as to become a value that is lower than a voltage V61 applied to both ends of the first smoothing capacitor C61. The second Zener voltage Vr64 is decided, on the basis of the value of the voltage Vdc of the power supply portion 13, in such a way as to become a value that is lower than a voltage V62 applied to both ends of the second smoothing capacitor C62. As an example, in a case supposing that the voltage Vdc is "718 V", the first Zener voltage Vr63 and the second Zener voltage Vr64 are respectively decided as "240 V", which is equal to or less than the voltage Vdc. That is, in the present embodiment, the first Zener diode RZ63 and the second Zener diode P164 are configured more economically than in the sixth embodiment because Zener diodes whose Zener voltages are low compared to the first Zener diode RZ53 and the second Zener diode RZ54 pertaining to the sixth embodiment described above are utilized.

Because of this, supposing that the smoothing capacitors C61 and C62 have the same capacitances (as an example, 1920 μC), in a case where there are no variations between the internal resistors R61a and R62a of the first smoothing capacitor C61 and the second smoothing capacitor C62, the voltages V61 and V62 that are each 359 V are applied to both ends of the first smoothing capacitor C61 and the second smoothing capacitor C62. In this case, a voltage equal to or greater than the first Zener voltage Vr63 is applied to the first Zener diode R263, and a voltage equal to or greater than the second Zener voltage Vr64 is applied to the second Zener diode RZ64. When this happens, current flows to both a current path I63 on the upper side configured by the first balancing resistor R63 and the first Zener diode RZ63 and a current path I64 on the lower side configured by the second balancing resistor R64 and the second Zener diode RZ64. At this time, current does not flow to the internal resistors R61a and R62a because the end-to-end voltages V61 and V62 of the first smoothing capacitor C61 and the second smoothing capacitor C62 are equal.

On the other hand, also in a case where there are variations between the internal resistors R61a and R62a, sometimes a voltage equal to or greater than the first Zener voltage Vr63 is applied to the first Zener diode RZ63 and equal to or greater than the second Zener voltage Vr64 is applied also to the second Zener diode RZ64. That is, in the present embodiment, sometimes voltages that become equal to or greater than the first Zener voltage Vr63 and equal to or greater than the second Zener voltage Vr64 are applied to both the first Zener diode RZ63 and the second Zener diode RZ64. For example, in a case where the end-to-end voltage V61 of the first smoothing capacitor C61 is 310 V and the end-to-end voltage V62 of the second smoothing capacitor C62 is 408 V, a voltage equal to or greater than the first Zener voltage Vr63 and a voltage equal to or greater than the second Zener voltage Vr64 are respectively applied to the first Zener diode RZ63 and the second Zener diode RZ64, so currents flow to the current path I63 including the first Zener diode RZ63 and the current path I64 including the second Zener diode RZ64. As for the currents that have flowed through the current paths I63 and I64 in this way, the difference between these currents flows to the internal resistor R61a or the internal resistor R62a depending on the magnitudes of the end-to-end voltages V61 and V62 of the first smoothing capacitor C61 and the second smoothing capacitor C62.

Moreover, like in the first embodiment, the first Zener voltage Vr63 is decided in such a way as to become equal to or less than the rated voltage of the first smoothing capacitor C61, and the second Zener voltage Vr64 is decided in such a way as to become equal to or less than the rated voltage of the second smoothing capacitor C62.

Further, the values of the Zener voltages Vr63 and Vr64 are decided considering also the values of the first balancing resistor R63 and the second balancing resistor R64 in addition to the voltage Vdc and the rated voltages of the first smoothing capacitor C61 and the second smoothing capacitor C62.

(2) Operation

Next, the operation of the voltage smoothing circuit 614 will be described using FIGS. 22 and 24. Below, for the sake of simplifying the description, it will be supposed that the resistance values of the balancing resistors R63 and R64 are equal, the first and second Zener voltages Vr63 and Vr64 are both "240 V", and the voltage Vdc of the power supply portion 13 is 718 V.

First, according to the configuration of the voltage smoothing circuit 614, the voltage V61 applied to both ends of the first smoothing capacitor C61 is equal to the voltage applied to the current path I63, and the voltage V62 applied to both ends of the second smoothing capacitor C62 is equal to the voltage applied to the current path I64. On the other hand, the same capacitors are used for the smoothing capacitors C61 and C62, so ideally there would be substantially no variations between the internal resistors R61a and R62a or any variations would be small (R61a≈R62a), and thus the end-to-end voltage V61 of the first smoothing capacitor C61 and the end-to-end voltage V62 of the second smoothing capacitor C62 would be in a state in which they become equal to or less than the rated voltages of the smoothing capacitors C61 and C62, respectively, and become substantially equal. In this ideal state, the voltages V61 and V62 applied to the current paths I63 and I64 are respectively larger than the first Zener voltage Vr63 and the second Zener voltage Vr64 (V61>Vr63, V62>Vr64), current based on the difference voltage between the voltage V61 and the first Zener voltage Vr63 flows on the current path I63, and current based on the difference voltage between the voltage V62 and the second Zener voltage Vr64 flows on the current path I64. Current does not flow on the internal resistors R61a and R62a, and the first and second smoothing capacitors C61 and C62 take a state where a balance between their voltages is maintained (FIG. 22).

However, if there are variations between the internal resistors R61a and R6a, a magnitude relation arises between the voltages V61 and V62 applied to the smoothing capacitors C61 and C62, and the voltage smoothing circuit takes a state where the balance between the voltages of the first and second smoothing capacitors C61 and C62 is disrupted. On the basis of this magnitude relation, the voltage smoothing circuit 614 takes either of the following operations.

(2-1) Case where End-to-End Voltage V61 of First Smoothing Capacitor C61 is Larger than End-to-end Voltage V62 of Second Smoothing Capacitor C62 (V61>V62)

It will be supposed that the end-to-end voltage V61 is 380 V and the end-to-end voltage V62 is 338 V. Because the end-to-end voltages V61 and V62 are equal to or greater than the first and second Zener voltages Vr63 and Vr64, the first and second Zener diodes RZ63 and RZ64 both operate, the end-to-end voltage of the first Zener diodes RZ63 is clipped to the first Zener voltage Vr63, and the end-to-end voltage of the second Zener diode RZ64 is clipped to the second Zener voltage Vr64. When this happens, current flows on the current path I63 in the order of the first balancing resistor R63 and the first Zener diode RZ63 and current flows on the current path I64 in the order from the second balancing resistor R64 to the second Zener diode RZ64 (FIG. 23).

Further, the voltages acting on the balancing resistors R63 and R64 respectively become difference voltages between the end-to-end voltages V61 and V62 and the Zener voltages Vr63 and Vr64 (V61−Vr63, V62−Vr64). Here, the end-to-end voltage V61 is larger than the end-to-end voltage V62 (V61>V62), so the voltage acting on the first balancing resistor R63 is larger than the voltage acting on the second balancing resistor R64. Thus, the current flowing through the first balancing resistor R63 (that is, the current flowing on the current path I63) becomes more than the current flowing through the second balancing resistor R64 (that is, the current flowing on the current path I64). That is, the current flowing on the current path I63 branches and flows on the current path I64 and on the internal resistor R62a of the second smoothing capacitor C62 via the point-of-connection s1. That is, current does not flow to the internal resistor R61a of the first smoothing capacitor C61, but a difference current between the current flowing on the current path I63 and the current flowing on the current path I64 flows to the internal resistor R62a of the second smoothing capacitor C62. Because current flows into the internal resistor R62a in this way, the voltage V62 applied to both ends of the second smoothing capacitor C62 becomes larger. The voltage V61 is expressed as "Vdc−V62", so it becomes smaller as the voltage V62 becomes larger.

Because of the above operation, before long the end-to-end voltages V61 and V62 become substantially equal, and although currents based on the differences between the end-to-end voltages V61 and V62 and the Zener voltages Vr63 and Vr64 flow on the current path I63 and the current path I64, current no longer flows to the internal resistor R62a of the second smoothing capacitor C62 (FIG. 22). In this way, because of the above operation, in a case where the end-to-end voltage V61 is larger than the end-to-end voltage V62, the voltage smoothing circuit 614 works in such a way as to make smaller the end-to-end voltage V61 of the first smoothing capacitor C61 and make larger the end-to-end voltage V62 of the second smoothing capacitor C62, so a state is reached where a balance between the end-to-end voltages V61 and V62 is maintained, and an excessive voltage application to the first smoothing capacitor C61 can be avoided.

(2-2) Case where End-to-End Voltage V61 of First Smoothing Capacitor C61 is Smaller than End-to-End Voltage V62 of Second Smoothing Capacitor C62 (V61<V62)

It will be supposed that the end-to-end voltage V61 is 338 V and the end-to-end voltage V62 is 380 V. Because the end-to-end voltages V61 and V62 are equal to or greater than the first and second Zener voltages Vr63 and Vr64, the first and second Zener diodes RZ63 and RZ64 both operate, the end-to-end voltage of the first Zener diodes RZ63 is clipped to the first Zener voltage Vr63, and the end-to-end voltage of the second Zener diode RZ64 is clipped to the second Zener voltage Vr64. When this happens, current flows on the current path I63 in the order of the first balancing resistor R63 and the first Zener diode RZ63, and current flows on the current path I64 in the order from the second balancing resistor R64 to the second Zener diode RZ64 (FIG. 24).

Further, the voltages acting on the balancing resistors R63 and R64 respectively become difference voltages between the end-to-end voltages V61 and V62 and the Zener voltages Vr63 and Vr64 (V61−Vr63, V62−Vr64). Here, the end-to-end voltage V62 is larger than the end-to-end voltage V61 (V61<V62), so the voltage acting on the second balancing resistor R64 is larger than the voltage acting on the first balancing resistor R63. Thus, conversely from (2-1) described above, the current flowing through the second balancing resistor R64 (that is, the current flowing on the current path I64) becomes more than the current flowing through the first balancing resistor R63 (that is, the current flowing on the current path I63). That is, the current that has flowed from the power supply portion 13 branches and flows to the internal resistor R61a side of the first smoothing capacitor C61 and the current path I63 side, and thereafter the currents merge in the current path I64 via the point-of-connection s1. That is, current does not flow to the internal resistor R62a of the second smoothing capacitor C62, but a difference current between the current flowing on the current path I64 and the current flowing on the current path I63 flows to the internal resistor R61a of the first smoothing capacitor C61. Because current flows into the internal resistor R61a in this way, the voltage V61 applied to both ends of the first smoothing capacitor C61 becomes larger. The voltage V62 is expressed as "Vdc−V61", so it becomes smaller as the voltage V61 becomes larger.

Because of the above operation, before long the end-to-end voltages V61 and V62 become substantially equal, and although currents based on the differences between the end-to-end voltages V61 and V62 and the Zener voltages Vr63 and Vr64 flow on the current path I63 and the current path I64, current no longer flows to the internal resistor R61a of the first smoothing capacitor C61 (FIG. 22). In this way, because of the above operation, in a case where the end-to-end voltage V62 is larger than the end-to-end voltage V61, the voltage smoothing circuit 614 works in such a way as to make smaller the end-to-end voltage V62 of the second smoothing capacitor C62 and make larger the end-to-end voltage V61 of the first smoothing capacitor C61, so a state is reached where a balance between the end-to-end voltages V61 and V62 is maintained, and an excessive voltage application to the second smoothing capacitor C62 can be avoided.

(3) Effects (A)

According to the voltage smoothing circuit 614 pertaining to the present embodiment, a voltage equal to or greater than the first Zener voltage Vr63 is applied to the first Zener diode RZ63, and a voltage equal to or greater than the second Zener voltage Vr64 is applied also to the second Zener diode RZ64, so currents flow to both of the first Zener diode RZ63 and the second Zener diode RZ64—that is, both of the first balancing resistor R63 and the second balancing resistor R64.

In the present embodiment, the above operations are realized by utilizing Zener diodes whose Zener voltages are low compared to the sixth embodiment for the first Zener diode RZ63 and the second Zener diode RZ64. For that reason, it can be said that the voltage smoothing circuit 614 pertaining to the present embodiment is a particularly effective method in a case where one wants to set the operating voltages and rated power of the Zener diodes that are conduction regulating portions low.

(B)

Further, according to the voltage smoothing circuit 614 pertaining to the present embodiment, current flows to the first Zener diode RZ63 as a result of a voltage equal to or greater than the first Zener voltage Vr63 being applied, and current flows to the second Zener diode RZ64 as a result of a voltage equal to or greater than the second Zener voltage Vr64 being applied. The voltages in the first Zener diode RZ63 and the second. Zener diode RZ64 are respectively clipped to the first Zener voltage Vr63 and the second Zener voltage Vr64. For that reason, a difference voltage between the end-to-end voltage of the first smoothing capacitor C61 and the first Zener voltage Vr63 is applied to the first balancing resistor R63, and a difference voltage between the end-to-end voltage of the second smoothing capacitor C62 and the second Zener voltage Vr64 is applied to the second balancing resistor R64. Consequently, with a simple configuration the values of the currents flowing to the first and second balancing resistors R63 and R64 can be made smaller than conventionally, and the amounts of heat emitted in the first and second balancing resistors R63 and R64 can be alleviated, so the effects on electronic parts near the balancing resistors R63 and R64 can be controlled.

Consequently, with a simple configuration a balance between the voltages applied to the smoothing capacitors C61 and C62 can be maintained. Further, resistors whose dimensions are relatively small (e.g., chip resistors) can be utilized for the first balancing resistor R63 and the second balancing resistor R64. In the printed board on which the first and second balancing resistors R63 and R64 are mounted, the area occupied by the first and second balancing resistors R63 and R64 becomes smaller, so the printed board can be made smaller.

(C)

Further, in the voltage smoothing circuit 614 pertaining to the present embodiment, the first Zener voltage Vr63 and the second Zener voltage Vr64 are equal to or less than the rated voltages of the first smoothing capacitor C61 and the second smoothing capacitor C62. Because of this, voltages that are larger than the values of the first Zener voltage Vr63 and the second Zener voltage Vr64 are respectively applied to the first and second smoothing capacitors C61 and C62.

(D)

Further, according to the voltage smoothing circuit 614 pertaining to the present embodiment, the first balancing resistor R63 has a resistance value that is smaller than the value of the internal resistor R61a of the first smoothing capacitor C61, and the second balancing resistor R64 has a resistance value that is smaller than the value of the internal resistor R62a of the second smoothing capacitor C62. Because of this, the amounts of current flowing to the first balancing resistor R63 and the second balancing resistor R64 become more than the amounts of current flowing to the internal resistors R61a and R62a of the first smoothing capacitor C61 and the second smoothing capacitor C62, so the amounts of current flowing to the first smoothing capacitor C61 and the second smoothing capacitor C62 can be controlled. Consequently, the voltages applied to the first smoothing capacitor C61 and the second smoothing capacitor C62 can be made lower.

(4) Modifications (a)

Figure 25:
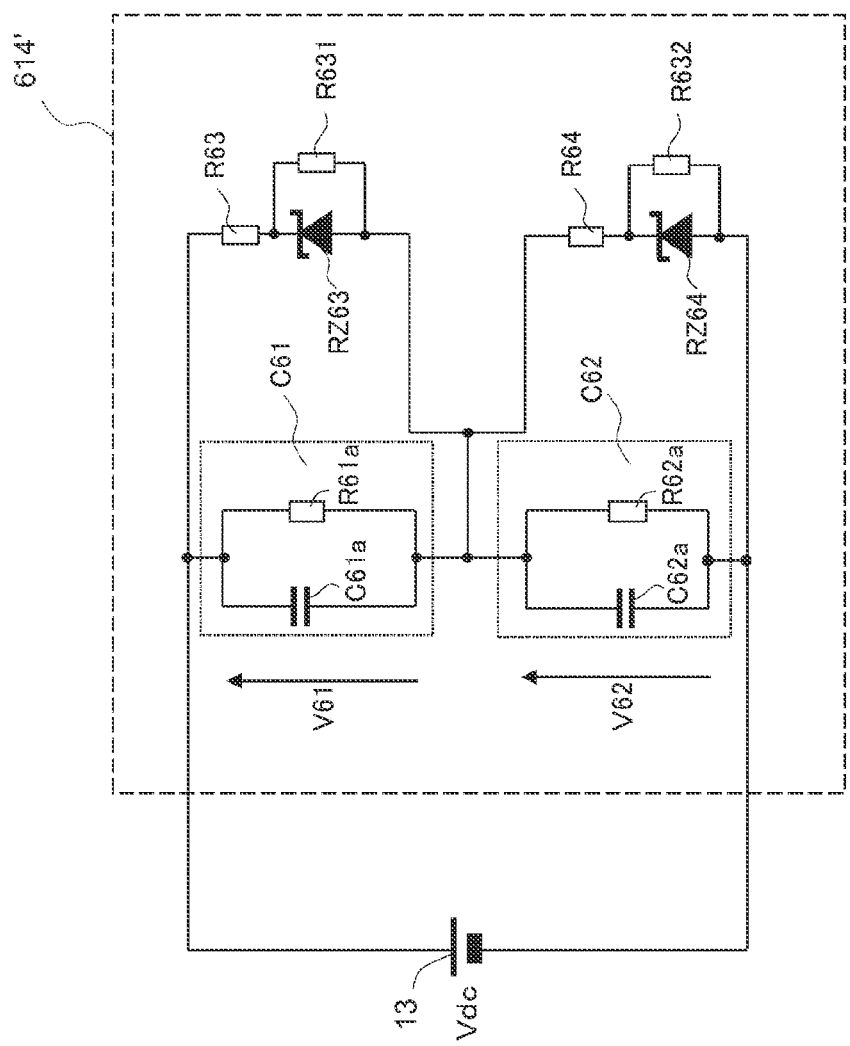
FIG. 25 is a circuit diagram of a voltage smoothing circuit pertaining to modification (a) of the seventh embodiment.

The voltage smoothing circuit pertaining to the present embodiment may also, like the voltage smoothing circuit 614' pertaining to the sixth embodiment (FIG. 21), have the configuration shown in FIG. 25. A voltage smoothing circuit 614' in FIG. 25 is further equipped with a third auxiliary resistor R631 and a fourth auxiliary resistor R632 in addition to the configuration of the voltage smoothing circuit 614 described in FIGS. 22 to 24. The third auxiliary resistor R631 is connected in parallel to both ends of the first Zener diode RZ63. The fourth auxiliary resistor R632 is connected in parallel to both ends of the second Zener diode RZ64.

According to the voltage smoothing circuit 614' pertaining to FIG. 25, in a case where the Zener diodes RZ63 and RZ64 operate, the current flowing through the first balancing resistor R63 branches and flows to the first Zener diode RZ63 and the third auxiliary resistor R631, and the current flowing through the second balancing resistor R64 branches and flows to the second Zener diode RZ64 and the fourth auxiliary resistor R632. Because of this, the amounts of current flowing to the first Zener diode RZ63 and the second Zener diode RZ64 become smaller compared to the voltage smoothing circuit 614, so the operating voltages and the rated power of the first Zener diode RZ63 and the second Zener diode RZ64 can be set low, and diodes whose rated currents are relatively small can be used for the first Zener diode RZ63 and the second Zener diode RZ64. Consequently, costs pertaining to the voltage smoothing circuit 614' can be reduced (in particular, the cost of the first Zener diode RZ63 and the second Zener diode RZ64 can be cut).

Further, the third auxiliary resistor R631 and the fourth auxiliary resistor R632 can also function as a discharge circuit of the first smoothing capacitor C61 and the second smoothing capacitor C62 at the time of power shutdown of the motor driver 1. Consequently, it is not necessary to separately dispose a discharge circuit of the first smoothing capacitor C61 and the second smoothing capacitor C62.

The voltage smoothing circuit 614 has the same configuration as FIGS. 22 to 24 excluding the third auxiliary resistor R631 and the fourth auxiliary resistor R632, so in FIG. 25, the same reference signs as in FIGS. 22 to 24 are given excluding the third auxillary resistor R631 and the fourth auxiliary resistor R632.

(b)

In "(2) Operation" of the present embodiment, a case where currents flow to both the current paths I63 and I64 even if there are variations between the internal resistors R61a and R62a and a magnitude relation arises between the end-to-end voltages V61 and V62 has been described. However, in the voltage smoothing circuit 614 pertaining to FIGS. 22 to 24, in a case where the variations between the internal resistors R61a and R62a are extremely large and the difference between the end-to-end voltages V61 and V62 is large, it is conceivable that either one of the end-to-end voltages V61 or V62 will end up becoming smaller than the first Zener voltage Vr63 or the second Zener voltage Vr64. In this case, first, only either one of the Zener diodes RZ63 or RZ64 to which the voltage equal to or greater than the Zener voltage Vr63 or Vr64 is being applied operates, and at the time when before long the difference between the end-to-end voltages V61 and V62 has become small, a voltage equal to or greater than the Zener voltage is applied also to the other Zener diode, and the Zener diode that was not operating also operates. Thereafter is the same as "(2) Operation" of the present embodiment. That is, the voltage smoothing circuit 614 in this case can take either of the following first state and second state.

First state: a state where a voltage equal to or greater than the first Zener voltage Vr63 is applied to the first Zener diode RZ63 and thereafter a voltage equal to or greater than the second Zener voltage Vr64 is applied also to the second Zener diode RZ64

Second state: a state where a voltage equal to or greater than the second Zener voltage Vr64 is applied to the second Zener diode RZ64 and thereafter a voltage equal to or greater than the first Zener voltage Vr63 is applied also to the first Zener diode RZ63

For the sake of describing a specific example of the first state, it will be supposed that the Zener voltages are "240 V", the voltage Vdc of the power supply portion 13 is "718 V", the end-to-end voltage V61 is "500 V", and the end-to-end voltage V62 is "218 V". In this case, first, only the first Zener diode RZ63 operates and current flows into the internal resistor R62a like in FIG. 19 pertaining to the sixth embodiment. When this happens, the end-to-end voltage V62 gradually becomes larger, so the value of the end-to-end voltage V62 becomes equal to or greater than 240 V, whereby the second Zener diode RZ64 that was not operating until then also starts to operate. Because of this, current flows as shown in FIG. 23 pertaining to the present embodiment, and before long astute is reached where a balance between the end-to-end voltages V61 and V62 is maintained.

Further, for the sake of describing a specific example of the second state, it will be supposed that the end-to-end voltage V61 is "218 V" and the end-to-end voltage V62 is "500 V". In this case, first, only the second Zener diode RZ64 operates and current flows to the internal resistor R61a like FIG. 20 pertaining to the sixth embodiment. When this happens, the end-to-end voltage V61 gradually becomes larger, so the value of the end-to-end voltage V61 becomes equal to or greater than 240 V, whereby the first Zener diode RZ63 that was not operating until then also starts to operate. Because of this, current flows as shown in FIG. 24 pertaining to the present embodiment, and before long a state is reached where a balance between the end-to-end voltages V61 and V62 is maintained.

Other Embodiments

Embodiments of the present invention and modifications thereof have been described on the basis of the drawings, but the specific configurations are not limited these embodiments and their modifications and can be changed without departing from the scope of the invention.

(a)

In the voltage smoothing circuits 14, 114, and 214 pertaining to the first to third embodiments, cases were described where one Zener diode RZ4, RZ14, or RZ24 is disposed and the Zener voltage Vr4, Vr14, or Vr24 is 376 V, for example. However, there are few commonly available Zener diodes whose Zener voltage is relatively large (360 V, etc.). Therefore, plural Zener diodes may be connected in series and utilized for the Zener diodes RZ4, RZ14, and RZ24. For example, in a case where the Zener voltage is to be "376 V", this can be accommodated by connecting in series eight Zener diodes whose Zener voltage is about 47 V.

However, in the case of using plural Zener diodes, parts costs inevitably end up becoming higher. Consequently, it is best to comprehensively consider the cost of the Zener diode to be utilized and the power loss target value of the balancing resistors R3 and R13 (or the first balancing resistor R23 and the second balancing resistor R24) and decide the Zener voltages Vr4, Vr14, and Vr24 and the number of Zener diodes to be utilized.

Likewise, in the sixth embodiment and the seventh embodiment also, plural Zener diodes can be connected in series and utilized for the first Zener diodes RZ53 and RZ63 and the second Zener diodes RZ54 and RZ64.

(b)

Further, in the voltage smoothing circuits 14, 114, and 214 pertaining to the first to third embodiments, cases were described where the "second conduction regulating portion" that conducts current in one direction on the current paths I4, I14, and I24 in a case where a voltage equal to or greater than a predetermined voltage has been applied and maintains its end-to-end voltage at the predetermined voltage is configured by the Zener diodes RZ4, RZ14, and RZ24. However, as long as the second conduction regulating portion can conduct current in one direction to the balancing resistors R3 and R13 (or the first balancing resistor R23) in a case where a voltage equal to or greater than the second predetermined voltage has been applied and maintain its end-to-end voltage at the second predetermined voltage, the second conduction regulating portion may be any kind of portion and may also be configured by something other than a Zener diode.

Likewise, in the sixth and seventh embodiments also, as long as the first conduction regulating portion and the second conduction regulating portion can conduct current in one direction to the first or second balancing resistors R53 or R63 and R54 or R64 in a case where a voltage equal to or greater than a predetermined voltage has been applied, the first conduction regulating portion and the second conduction regulating portion may be any kind of portion and may also be configured by something other than Zener diodes.

(c)

Further, in the first to fourth embodiments, cases satisfying the condition that the value of the balancing resistor is smaller than the value of the internal resistors of the smoothing capacitors have been described. However, this condition is not essential. In particular, in the method described in the third embodiment, the magnitude relation between the first balancing resistor and the internal resistor values of the smoothing capacitors changes depending on what values the various types of values included in the precondition are, such as the value of the Zener voltage, the value of "X %" representing the operating ranges of the end-to-end voltages in the smoothing capacitors, and so forth.

(d)

Further, in the first embodiment, only one method of deciding the balancing resistor R1 and the Zener voltage Vr4 was described in overview. However, the balancing resistor R1 and the Zener voltage Vr4 may also be decided like in "(2-2) Specific Example" of the third embodiment.

Further, as described in the second embodiment, in a case where there is only one balancing resistor, the value of this balancing resistor can be decided like in "(2) Method of Deciding Resistance Values of Balancing Resistors and Zener Voltage" in the fifth embodiment.

(e)

In the third embodiment, as shown in FIGS. 9 to 11, a case where the Zener diode RZ24 and the second balancing resistor R24 are connected in order on the current path I24 beginning with the side whose voltage is high was described. However, the order in which the elements are connected on the current path I24 is not limited to this order; the elements may also be connected in the order of the second balancing resistor R24 and the Zener diode RZ24.

Further, in the fourth to seventh embodiments also, the order in which the elements are connected on the current paths I34, I44, I53, I54, I63, and I64 is not limited to the orders in FIGS. 15 to 20 and 22 to 24.

INDUSTRIAL APPLICABILITY

The voltage smoothing circuit pertaining to the present invention can be utilized as a circuit for smoothing a power supply voltage supplied to an inverter portion in a motor driver tier driving a motor.

What is claimed is:

1. A voltage smoothing circuit configured to smooth a voltage outputted from a power supply portion, the voltage smoothing circuit comprising:
   a first smoothing capacitor and a second smoothing capacitor connected in series to each other, the series connection of the first smoothing capacitor and the second smoothing capacitor being connected in parallel with the power supply portion;
   a first balancing resistor connected in parallel to the first smoothing capacitor; and
   a second conduction regulating portion connected on a current path in parallel with the second smoothing capacitor and conducting current in one direction on the current path in a case where a voltage equal to or greater than a second predetermined voltage has been applied, the second predetermined voltage being lower than a rated voltage of the second smoothing capacitor.

2. The voltage smoothing circuit according to claim 1, wherein
   the second conduction regulating portion maintains an inter-terminal voltage thereof at the second predetermined voltage in a case where a voltage equal to or greater than the second predetermined voltage has been applied.

3. The voltage smoothing circuit according to claim 2, further comprising
a second balancing resistor connected on the current path such that the second balancing resistor is in parallel with the second smoothing capacitor and in series with the second conduction regulating portion,
current flowing in one direction to the second balancing resistor in a case where a voltage equal to or greater than the second predetermined voltage has been applied to the second conduction regulating portion.

4. The voltage smoothing circuit according to claim 3, wherein
a resistance value of at least one of the first balancing resistor and the second balancing resistor is a value such that
a first end-to-end voltage representing end-to-end voltage of the first smoothing capacitor becomes lower than a rated voltage of the first smoothing capacitor and
a second end-to-end voltage representing end-to-end voltage of the second smoothing capacitor becomes lower than the rated voltage of the second smoothing capacitor, and
the second predetermined voltage is substantially the same as or less than the second end-to-end voltage.

5. The voltage smoothing circuit according to claim 3, wherein
the first balancing resistor has a resistance value that is smaller than a resistance value of an internal resistor of the first smoothing capacitor, and
the second balancing resistor has a resistance value that is smaller than a resistance value of an internal resistor of the second smoothing capacitor.

6. The voltage smoothing circuit according to claim 2, further comprising
either of
a first auxiliary resistor connected in parallel to the second conduction regulating portion and
a second auxiliary resistor connected in parallel to the first smoothing capacitor and the second smoothing capacitor connected in series to each other.

7. The voltage smoothing circuit according to claim 2, wherein
a resistance value of the first balancing resistor is a value such that
a first end-to-end voltage representing end-to-end voltage of the first smoothing capacitor becomes equal to or less than a second end-to-end voltage representing end-to-end voltage of the second smoothing capacitor and
the second end-to-end voltage is lower than the rated voltage of the second smoothing capacitor.

8. The voltage smoothing circuit according to claim 1, further comprising
a second balancing resistor connected on the current path such that the second balancing resistor is in parallel with the second smoothing capacitor and in series with the second conduction regulating portion; and
a first conduction regulating portion connected in series to the first balancing resistor and conducting current in one direction to the first balancing resistor in a case where a voltage equal to or greater than a first predetermined voltage has been applied,
current flowing in one direction to the second balancing resistor in a case where a voltage equal to or greater than the second predetermined voltage has been applied to the second conduction regulating portion.

9. The voltage smoothing circuit according to claim 8, wherein
a voltage equal to or greater than the second predetermined voltage is not applied to the second conduction regulating portion in a case where a voltage equal to or greater than the first predetermined voltage has been applied to the first conduction regulating portion, and
a voltage equal to or greater than the first predetermined voltage is not applied to the first conduction regulating portion in a case where a voltage equal to or greater than the second predetermined voltage has been applied to the second conduction regulating portion.

10. The voltage smoothing circuit according to claim 9, wherein
the first conduction regulating portion is a first Zener diode,
the second conduction regulating portion is a second Zener diode, and
the first predetermined voltage and the second predetermined voltage are voltages such that current flows only to either one of the first Zener diode or the second Zener diode, the first and second predetermined voltages being determined based on the voltage that the power supply portion outputs.

11. The voltage smoothing circuit according to claim 10, wherein
the first predetermined voltage and the second predetermined voltage are equal to or less than rated voltages of the first smoothing capacitor and the second smoothing capacitor.

12. The voltage smoothing circuit according to claim 8, wherein
a voltage equal to or greater than the first predetermined voltage is applied to the first conduction regulating portion, and a voltage equal to or greater than the second predetermined voltage is applied also to the second conduction regulating portion.

13. The voltage smoothing circuit according to claim 12, wherein
the voltage smoothing circuit is configured to operate in either of
a first state where a voltage equal to or greater than the first predetermined voltage is applied to the first conduction regulating portion and thereafter a voltage equal to or greater than the second predetermined voltage is applied also to the second conduction regulating portion or
a second state where a voltage equal to or greater than the second predetermined voltage is applied to the second conduction regulating portion and thereafter a voltage equal to or greater than the first predetermined voltage is applied also to the first conduction regulating portion.

14. The voltage smoothing circuit according to claim 12, wherein
the first conduction regulating portion is a first Zener diode, and
the second conduction regulating portion is a second Zener diode.

15. The voltage smoothing circuit according to claim 14, wherein the first predetermined voltage and the second predetermined voltage are equal to or less than rated voltages of the first smoothing capacitor and the second smoothing capacitor.

16. The voltage smoothing circuit according to claim 8, further comprising a third auxiliary resistor connected in parallel to both ends of the first conduction regulating portion; and a fourth auxiliary resistor connected in parallel to both ends of the second conduction regulating portion.

* * * * *